United States Patent
Nakano et al.

(10) Patent No.: US 9,882,915 B2
(45) Date of Patent: Jan. 30, 2018

(54) DEVICE CONTROL METHOD, DEVICE CONTROL SYSTEM

(71) Applicant: Panasonic Intellectual Property Management Co., Ltd., Osaka (JP)

(72) Inventors: Toshihisa Nakano, Osaka (JP); Masayuki Kozuka, Osaka (JP); Masataka Minami, Hyogo (JP); Motoji Ohmori, Osaka (JP); Takeshi Matsuo, Nara (JP); Tsuyoshi Sakata, Kanagawa (JP); Fumiaki Suzuki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 310 days.

(21) Appl. No.: 14/415,295

(22) PCT Filed: Aug. 1, 2013

(86) PCT No.: PCT/JP2013/004673
§ 371 (c)(1),
(2) Date: Jan. 16, 2015

(87) PCT Pub. No.: WO2014/024441
PCT Pub. Date: Feb. 13, 2014

(65) Prior Publication Data
US 2015/0168930 A1   Jun. 18, 2015

Related U.S. Application Data

(60) Provisional application No. 61/680,394, filed on Aug. 7, 2012.

(51) Int. Cl.
*H04L 29/06* (2006.01)
*G08C 17/02* (2006.01)
(Continued)

(52) U.S. Cl.
CPC ............ *H04L 63/107* (2013.01); *G05B 15/02* (2013.01); *G08C 17/02* (2013.01);
(Continued)

(58) Field of Classification Search
CPC . H04L 63/107; H04L 63/0853; H04L 63/105; H04L 12/2807; H04M 1/72533;
(Continued)

(56) References Cited

U.S. PATENT DOCUMENTS

2003/0136827 A1* 7/2003 Kaneko .............. H04L 12/2803
235/375
2006/0282682 A1  12/2006 Masaki et al.
(Continued)

FOREIGN PATENT DOCUMENTS

EP       1 626 330 A1      2/2006
JP       2003-319471       11/2003
(Continued)

OTHER PUBLICATIONS

Nakamura Toshiaki, WO 2010013761 A1, Feb. 2010, [FOR reference provided in IDS, however, examiner retrieved this machine translation version from STIC service within the office.].*
(Continued)

*Primary Examiner* — Darrin Dunn
*Assistant Examiner* — Marzia T Monty
(74) *Attorney, Agent, or Firm* — Wenderoth, Lind & Ponack, L.L.P.

(57) ABSTRACT

Device control method including: operation receiving step of receiving a device control operation for controlling a device; determining step of determining whether an operation terminal is in a first state or a second state; limiting step of, when determined in the determining step that the operation terminal is in the second state, limiting a range of controls of the device made available to the operation terminal when in the second state so as to correspond to part of a range of controls of the device made available to the operation terminal when in the first state; and device controlling step of controlling the device based on the device
(Continued)

control operation. When determined in the determining step that the operation terminal is in the second state, the device is controlled within the range of controls of the device made available to the operation terminal when in the second state.

8 Claims, 44 Drawing Sheets

(51) Int. Cl.
    *G05B 15/02*     (2006.01)
    *H04L 12/28*     (2006.01)
    *H04M 1/725*     (2006.01)

(52) U.S. Cl.
    CPC ...... *H04L 12/2807* (2013.01); *H04L 63/0853* (2013.01); *H04L 63/105* (2013.01); *H04M 1/72533* (2013.01); *G08C 2201/42* (2013.01); *G08C 2201/93* (2013.01)

(58) Field of Classification Search
    CPC .... G05B 15/02; G08C 17/02; G08C 2201/93; G08C 2201/42
    See application file for complete search history.

(56) References Cited

U.S. PATENT DOCUMENTS

| | | | |
|---|---|---|---|
| 2007/0197236 A1* | 8/2007 | Ahn | H04L 12/2809 455/466 |
| 2007/0275709 A1 | 11/2007 | Lei | |
| 2011/0043327 A1* | 2/2011 | Baarman | H02J 5/005 340/5.8 |
| 2011/0264914 A1* | 10/2011 | Bae | H04L 63/06 713/170 |

FOREIGN PATENT DOCUMENTS

| | | |
|---|---|---|
| JP | 2004-192017 | 7/2004 |
| JP | 2006-352355 | 12/2006 |
| JP | 2007-318338 | 12/2007 |
| WO | 2004/104813 | 12/2004 |
| WO | 2010/013761 | 2/2010 |

OTHER PUBLICATIONS

International Search Report dated Sep. 24, 2013 in corresponding International Application No. PCT/JP2013/004673.

* cited by examiner

Operation terminal information 400

| Terminal type | Model number |
|---|---|
| Smartphone | P-06D |

FIG. 10

Device information 1000

| Device type 1010 | Model number 1020 | Function 1030 | Security level 1040 | Command 1050 |
|---|---|---|---|---|
| Air conditioner | CS-X252C | Power ON | 1 | aabbcc |
| | | Power OFF | 2 | ddeeff |
| | | Switch operation | 1 | gghhii |
| | | Set timer | 1 | jjkkll |

FIG. 18

User information 1800

| User name 1810 | User account 1820 | Password (hash value) 1830 | Registration information 1840 | Device type 1850 | Model number 1860 | Security module ID 1870 |
|---|---|---|---|---|---|---|
| User A | xxxyyy... | abcxyz... | Address | Air conditioner | CS-X252C | 0xC63694AD |
| | | | Telephone number | Refrigerator | NR-F456T | 0x50871E32 |
| | | | Date of birth | Recorder | DMR-BZT820 | 0xFEBD41DC |
| | | | ... | Smartphone | P-06D | 0x481DA188 |
| User B | ... | ... | ... | ... | ... | ... |

FIG. 19

Function information 1900

| Device type 1910 | Model number 1920 | Function 1930 | Security level 1940 | Command 1950 |
|---|---|---|---|---|
| Air conditioner | GS-X252C | Power ON | 1 | aabbcc |
| | | Power OFF | 2 | ddeeff |
| | | Switch operation | 1 | gghhii |
| | GS-SX252C | Set timer | 1 | jjkkll |
| | ... | ... | ... | ... |
| | ... | ... | ... | ... |
| Recorder | DMR-BZT820 | Programmed recording | 1 | xxyyzz |
| | ... | ... | ... | ... |
| ... | ... | ... | ... | ... |

FIG. 21

User information 1800

| User name 〜1810 | User account 〜1820 | Password (hash value) 〜1830 | Registration information 〜1840 | Device type 〜1850 | Model number 〜1860 | Security module ID 〜1870 |
|---|---|---|---|---|---|---|
| User A | xxxyyy... | abcxyz... | Address Telephone number Date of birth | Smartphone | P-06D | 0x481DA188 |
| User B | ... | ... | ... | ... | ... | ... |
| ... | ... | ... | ... | ... | ... | ... |

FIG. 23

User information 1800

| User name 1810 | User account 1820 | Password (hash value) 1830 | Registration information 1840 Address Telephone number Date of birth | Device type 1850 | Model number 1860 | Security module ID 1870 |
|---|---|---|---|---|---|---|
| User A | xxxyyy... | abcxyz... | | Smartphone | P-06D | 0xC63694AD |
| User B | ... | ... | ... | ... | ... | 0x481DA188 |
| ... | ... | ... | ... | ... | ... | ... |

FIG. 36

User information 3600

| User name 1810 | User account 1820 | Password (hash value) 1830 | Registration information 1840 | Device type 1850 | Model number 1860 |
|---|---|---|---|---|---|
| User A | xxxyyy... | abcxyz... | Address | Air conditioner | CS-X252C |
| | | | Telephone number | Refrigerator | NR-F456T |
| | | | Date of birth | Recorder | DMR-BZT820 |
| | | | | Smartphone | P-06D |
| User B | ... | ... | ... | ... | ... |
| ... | ... | ... | ... | ... | ... |

FIG. 44

User information 4400

| Group name 4405 | User name 1810 | User account 1820 | Password (hash value) 1830 | Registration information 1840 | Device type 1850 | Model number 1860 | Security module ID 1870 | Class 4480 |
|---|---|---|---|---|---|---|---|---|
| Group A | User A | xxxxyyy... | abcxyz... | Address<br>Telephone number<br>Date of birth | Air conditioner | CS-X252C | 0xC63694AD | Device |
| | | | | | Refrigerator | NR-F456T | 0x50871E32 | Device |
| | | | | | Recorder | DMR-BZT820 | 0xFEBD41DC | Device |
| | User B | aaabbb... | defqrs... | Address<br>Telephone number<br>Date of birth | Smartphone | P-06D | 0x481DA188 | Operation |
| | | | | | Smartphone | P-02D | 0x06BC5D8F | Operation |
| Group B | ... | ... | ... | ... | ... | ... | ... | ... |

DEVICE CONTROL METHOD, DEVICE CONTROL SYSTEM

This application is the National Stage of International Application No. PCT/JP2013/004673, filed Aug. 1, 2013, which claims the benefit of U.S. Provisional Application No. 61/680,394, filed Aug. 7, 2012.

TECHNICAL FIELD

The present invention relates to a method for controlling devices and a system for controlling devices.

BACKGROUND ART

Proposals have been made of device control systems that are capable of controlling devices located inside a house from an operation terminal that is taken outside the house.

For example, Patent Literature 1 discloses a technology of controlling household electric devices located inside a house by performing operations on a portable communication terminal outside the house.

CITATION LIST

Non-Patent Literature

[Patent Literature 1]
Japanese Patent Application Publication No. 2003-319471

SUMMARY

Technical Problem

However, in this conventional device control system disclosed by Patent Literature 1, an unauthorized user may operate the operation terminal without being known by the authorized user of the operation terminal, due to the operation terminal not having a certain level of security. This may lead to unfavourable situations for the authorized user.

For example, an unauthorized person may maliciously put the operation terminal in possession, operate the operation terminal, and execute control that is not desirable for the authorized user, due to the operation terminal not having a certain level of security.

In view of this, the present invention aims to provide a device control system that reduces, compared to the conventional technology described above, the frequency at which unfavourable situations occur due to an operation terminal being operated due to the operation terminal not having a certain level of security.

Solution to Problem

In view of the above, the present invention provides a device control method in a device control system for controlling one or more devices by using one or more operation terminals, the device control method including: an operation receiving step of receiving a device control operation for controlling a given device, the device control operation performed by using a given operation terminal; a determining step of determining whether the given operation terminal is in a first state or a second state, the given operation terminal having higher authority of control when in the first state compared to when in the second state; a limiting step of, when determined in the determining step that the given operation terminal is in the second state, limiting a range of controls of the given device made available to the given operation terminal when in the second state so as to correspond to part of a range of controls of the given device made available to the given operation terminal when in the first state; and a device controlling step of controlling the given device based on the device control operation. In the device controlling step, when determined in the determining step that the given operation terminal is in the second state, the control of the given device is performed within the range of controls of the given device made available to the given operation terminal when in the second state.

Advantageous Effects

The device control method pertaining to the present invention limits the range of controls of a device that is made available for execution from an operation terminal according to the state of the operation terminal Due to this, the frequency at which unfavourable situations occur due to an operation terminal not having a certain level of security being operated can be reduced compared to in conventional technology.

BRIEF DESCRIPTION OF DRAWINGS

FIG. 10 illustrates data structure of device information 1000.

FIG. 18 illustrates data structure of user information 1800.

FIG. 19 illustrates data structure of function information 1900.

FIG. 21 illustrates data structure of user information 1800.

FIG. 23 illustrates data structure of user information 1800.

FIG. 36 illustrates data structure of user information 3600.

FIG. 44 illustrates data structure of user information 4400.

DESCRIPTION OF EMBODIMENTS

Embodiment 1

<Overview>

The following describes one embodiment of the device control method pertaining to the present invention. In specific, the following describes a device control system where devices located inside a house can be controlled by using an operation terminal that is taken outside the house.

In the device control system described in the following, a security module storing its own identifier is attached to the operation terminal in detachable state.

In the device control system described in the following, the operation terminal, when having attached thereto a security module storing therein an identifier registered to the device control system, is capable of executing both device controls associated with a first security level and device controls that are associated with a second security level. The first and second security levels are described in detail later in the present disclosure. Meanwhile, in the device control system described in the following, the operation terminal, when not having attached thereto a security module storing therein an identifier registered in advance to the device control system, is capable of executing only the device controls that are associated with a second security level.

In the device control system described in the following, the security module is provided to only an authorized user of the operation terminal.

The following describes the structure of this device control system, while referring to the accompanying drawings.

<Structure>

Figure 1:
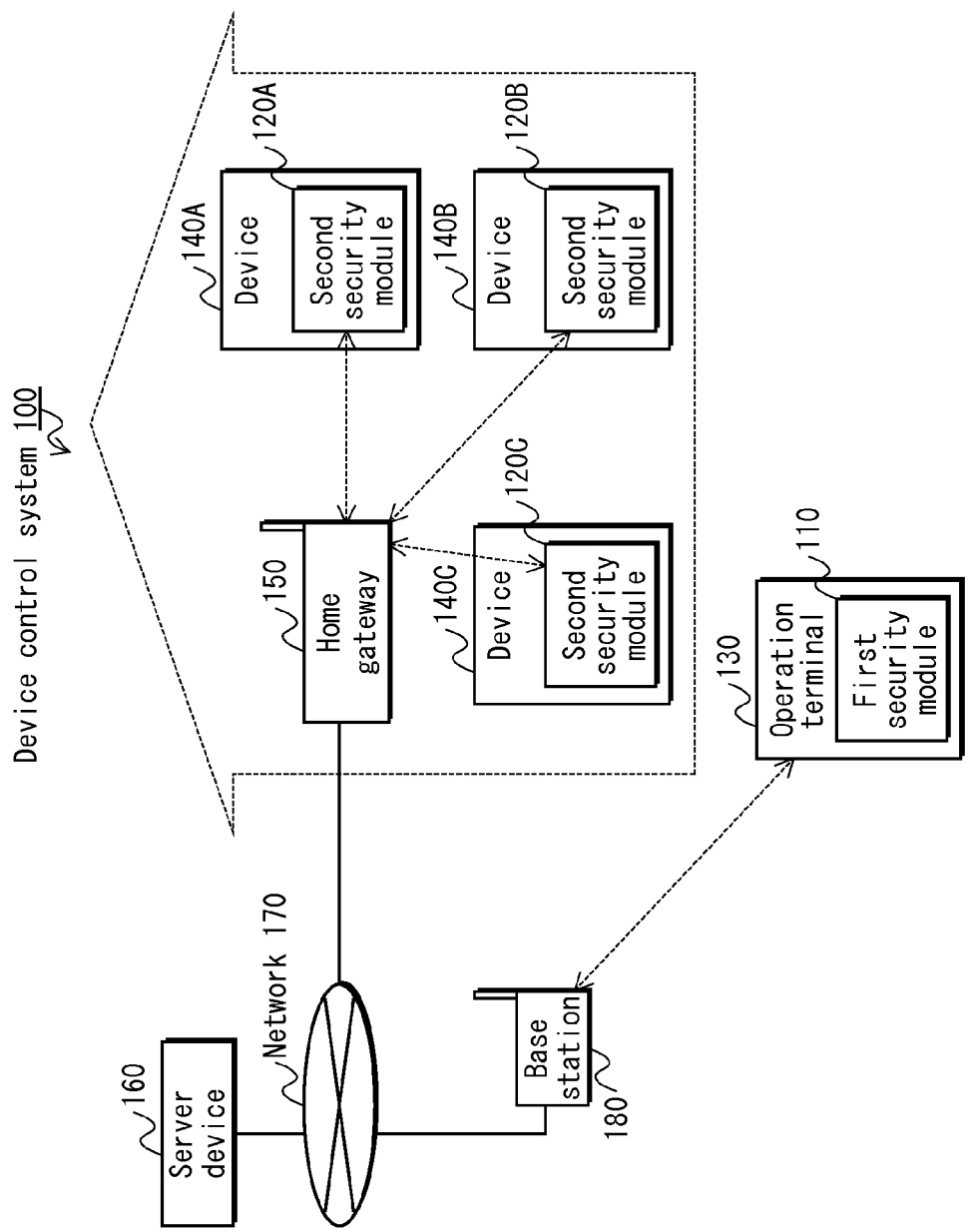
FIG. 1 illustrates system structure of device control system 100.

FIG. 1 illustrates the structure of a device control system 100.

As illustrated in FIG. 1, the device control system 100 includes: an operation terminal 130; a first security module 110; devices 140A through 140C; second security modules 120A through 120C; a home gateway 150; a server device 160, a network 170; and a base station 180.

The following describes such structural elements of the device control system 100 one by one.

The operation terminal 130 is a portable communication terminal, or more specifically, a smartphone. The operation terminal 130 has the first security module 110 attached thereto in detachable state.

Figure 2:
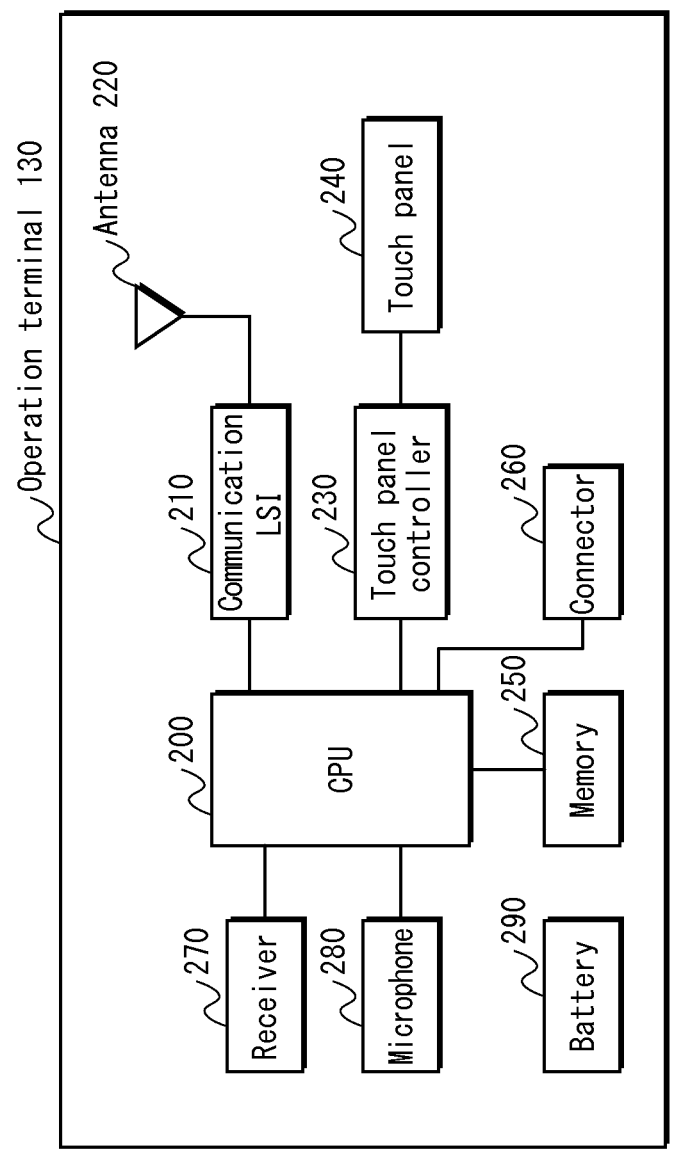
FIG. 2 is a circuit diagram of operation terminal 130.

FIG. 2 is a circuit diagram of the operation terminal 130.

As illustrated in FIG. 2, the operation terminal 130 includes: a central processing unit (CPU) 200; a large scale integration (LSI) 210 for communication (referred to in the following as a "communication LSI 210"); an antenna 220; a touch panel controller 230; a touch panel 240; a memory 250; a connector 260; a receiver 270; a microphone 280; and a battery 290.

The antenna 220 is connected to the communication LSI 210, and is used in the communication performed by the communication LSI 210. For example, the antenna 220 may be a metal monopole antenna.

The communication LSI 210 is connected to the antenna 220 and the CPU 200, and is controlled by the CPU 200. The communication LSI 210 has the following functions: a modulation function of modulating a transmission signal transmitted from the CPU 200; a transmission function of transmitting the modulated signal to the base station 180 by using the antenna 220; a reception function of receiving a signal transmitted from the base station 180 by using the antenna 220; and a demodulation function of demodulating the received signal and transmitting the demodulated signal to the CPU 200.

The communication between the communication LSI 210 and the base station 180 utilizes, for example, a commercial wireless communication line for portable phones that conforms to a communication standard such as Long Term Evolution (LTE).

The touch panel 240 is connected to the touch panel controller 230, and is controlled by the touch panel controller 230. The touch panel 240 has a function of displaying images and a function of converting contact operations made thereon by a user of the operation terminal 130 into electric signals and outputting such electric signals.

The touch panel controller 230 is connected to the CPU 200 and the touch panel 240, and is controlled by the CPU 200. The touch panel controller 230 has a function of causing the touch panel 240 to display images based on image signals transmitted from the CPU 200 and a function of receiving contact operations made on the touch panel 240 by the user of the operation terminal 130 and transmitting signals indicative of the contact operations so received to the CPU 200.

The connector 260 is connected to the CPU 200 and has the three functions described in the following.

Function 1: The connector 260 connects to a connector 560 of the first security module 110. When the connector 260 connects to the connector 560, the first security module 110 is attached to the operation terminal 130 in detachable state. The connector 560 is described in detail later in the present disclosure.

Function 2: The connector 260, when the first security module 110 is attached to the operation terminal 130, realizes wired communication between the operation terminal 130 and the first security module 110.

Function 3: The connector 260, when the first security module 110 is attached to the operation terminal 130, feeds power supplied from the battery 290 to the first security module 110.

The receiver 270 is connected to the CPU 200, and is controlled by the CPU 200. The receiver 270 has a function of converting electric signals transmitted from the CPU 200 into sound and outputs the sound.

The microphone 280 is connected to the CPU 200. The microphone 280 converts sound into electric signals and transmits the electric signals so obtained to the CPU 200.

The memory 250 is connected to the CPU 200. The memory 250 is implemented by using a random access memory (RAM), a read-only memory (ROM), and a flash memory, and stores programs defining operations of the CPU 200 and data used by the CPU 200.

The CPU 200 is connected to the communication LSI 210, the touch panel controller 230, the memory 250, the connector 260, the receiver 270, and the microphone 280. The CPU 200 executes the programs stored in the memory 250 and controls the communication LSI 210, the touch panel controller 230, and the receiver 270, thereby realizing the five functions of the operation terminal 130 described in the following.

Smartphone control function: The CPU 200 controls the operation terminal 130 to provide the operation terminal 130 with functions similar to those typically possessed by conventional smartphones. Such functions include, for example, a telephone call function, an internet website browsing function, a mail transmission/reception function, and a standby function.

Initial registration function A: The CPU 200 controls the operation terminal 130 to provide the operation terminal 130 with a function of realizing an initial registration performed by the device control system 100, through cooperation with other structural elements included in the device control system 100. The initial registration is described in detail later in the present disclosure. In specific, detailed description of the initial registration is provided in the <Initial Registration> section of the present disclosure, with reference to a flowchart.

Second security module issue request function A: The CPU 200 controls the operation terminal 130 to provide the operation terminal 130 with a function of realizing a second security module issue request performed by the device control system 100, through cooperation with other structural elements included in the device control system 100. The second security module issue request is described in detail later in the present disclosure. In specific, detailed description of the second security module issue request is provided in the <Second Security Module Issue Request> section of the present disclosure, with reference to a flowchart.

Device operation function A: The CPU 200 controls the operation terminal 130 to provide the operation terminal 130 with a function of realizing a device operation performed by the device control system 100, through cooperation with other structural elements included in the device control system 100. The device operation is described in detail later in the present disclosure. In specific, detailed description of the device operation is provided in the <Device Operation> section of the present disclosure, with reference to a flowchart.

Information check function A: The CPU 200 controls the operation terminal 130 to provide the operation terminal 130 with a function of realizing an information check performed by the device control system 100, through cooperation with other structural elements included in the device control system 100. The information check is described in detail later in the present disclosure. In specific, detailed description of the information check is provided in the <Information Check> section of the present disclosure, with reference to a flowchart.

The battery 290 is a secondary battery that is repeatedly chargeable, and has a function of suppling power to electronic components of the operation terminal 130.

This concludes description of the circuit structure of the operation terminal 130. The following describes the functional structure of the operation terminal 130.

Figures 3, 4:
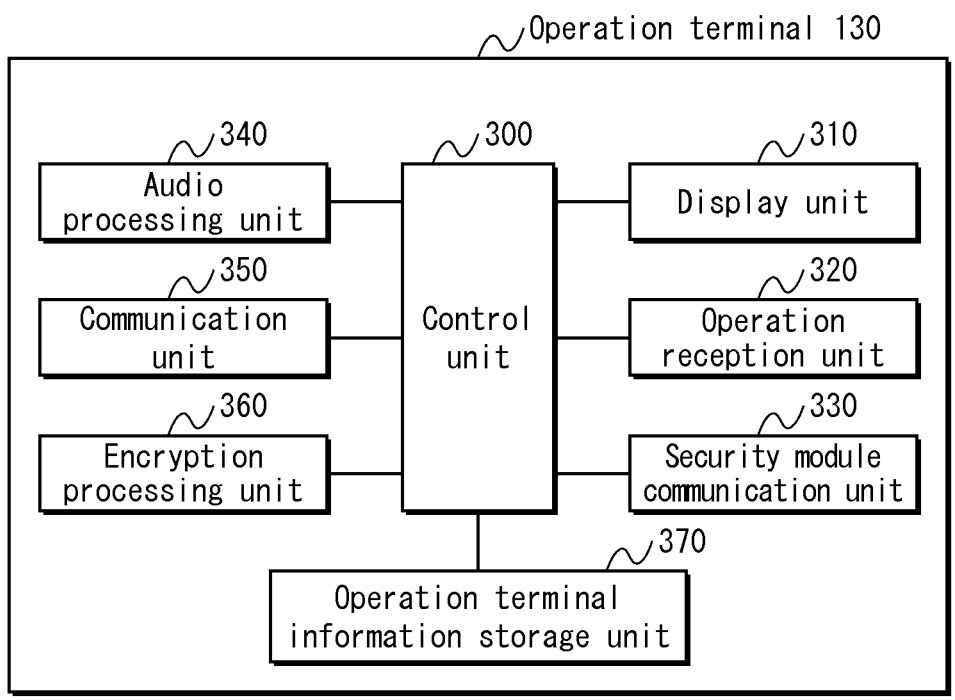
FIG. 3 is a block diagram illustrating functional structure of operation terminal 130.
FIG. 4 illustrates data structure of operation terminal information 400.

FIG. 3 is a block diagram illustrating the functional structure of the operation terminal 130.

As illustrated in FIG. 3, the operation terminal 130 includes: a control unit 300; a display unit 310; an operation reception unit 320; a security module communication unit 330; an audio processing unit 340; a communication unit 350; an encryption processing unit 360; and an operation terminal information storage unit 370.

The display unit 310 is implemented by using the touch panel controller 230, and the touch panel 240, and by the CPU 200 executing programs. The display unit 310 is controlled by the control unit 300, and has a function of generating images to be presented to the user of the operation terminal 130 and causing the touch panel 240 to display such images.

The operation reception unit 320 is implemented by using the touch panel controller 230, and the touch panel 240, and by the CPU 200 executing programs. The operation reception unit 320 is controlled by the control unit 300, and has a function of receiving contact operations performed on the touch panel 240 by the user of the operation terminal 130.

The security module communication unit 330 is implemented by using the connector 260 and by the CPU 200 executing programs. The security module communication unit 330 is controlled by the control unit 300. The security module communication unit 330 has a function of performing wired communication with the first security module 110 when the first security module 110 is attached to the operation terminal 130.

The audio processing unit 340 is implemented by using the receiver 270 and the microphone 280, and by the CPU 200 executing programs. The audio processing unit 340 is controlled by the control unit 300. The audio processing unit 340 has a function of inputting and outputting voices when the operation terminal 130 is making a telephone call.

The communication unit 350 is implemented by using the communication LSI 210 and the antenna 220, and by the CPU 200 executing programs. The communication unit 350 is controlled by the control unit 300. The communication unit 350 has a function of communicating with the base station 180 by using the commercial wireless communication line for portable phones, and a function of communicating with the server device 160 via the base station 180 and the network 170.

The encryption processing unit 360 is implemented by the CPU 200 executing programs, and is controlled by the control unit 300. The encryption processing unit 360 has an encryption function, an authentication function, and a key sharing function. The encryption function is a function of executing encryption for maintaining confidentiality and integrity of data. The authentication function is a function of executing authentication by utilizing encryption technology. The key sharing function is a function of executing key sharing by utilizing encryption technology. In order to achieve the functions described above (i.e., encryption function, authentication function, and key sharing function), the encryption processing unit 360 utilizes technology such as AES (Advanced Encrypting Standard), ECDSA (Elliptic Curve Digital Signature Standard), ECDH (Elliptic Curve Diffie-Hellman), and/or SSL (SecureSocketLayer)/TSL (Transport Layer Security).

The operation terminal information storage unit 370 is implemented by using a part of a storage area of the memory 250 and by the CPU 200 executing programs. The operation terminal information storage unit 370 has a function of storing operation terminal information 400.

FIG. 4 illustrates one example of the data structure of the operation terminal information 400, which is stored by the operation terminal information storage unit 370.

As illustrated in FIG. 4, the operation terminal information 400 includes a terminal type 410 and a model number 420. The terminal type and the model number are associated with one another as illustrated in FIG. 4.

The terminal type 410 indicates the type of terminal that the operation terminal 130 is classified into.

The model number 420 indicates the model of the operation terminal 130.

In this example, the operation terminal 130 is a smartphone of a model number "P-06D".

Description of the functional structure of the operation terminal 130 continues, referring to FIG. 3 once again.

The control unit 300 is implemented by the CPU 200 executing programs. The control unit 300 controls the display unit 310, the operation reception unit 320, the security module communication unit 330, the audio processing unit 340, the communication unit 350, the encryption processing unit 360, and the operation terminal information storage unit 370, thereby realizing the five functions described above of the operation terminal 130 (i.e., the smartphone control function, the initial registration function A, the second security module issue request function A, the device operation function A, and the information check function A).

Figure 5:
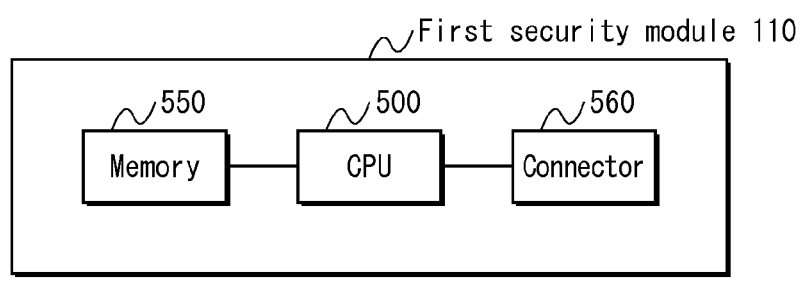
FIG. 5 is a circuit diagram of first security module 110.

FIG. 5 is a circuit diagram of the first security module 110.

As illustrated in FIG. 5, the first security module 110 includes: a CPU 500; a memory 550; and the connector 560.

The connector 560 is connected to the CPU 500 and has the three functions described in the following.

Function 1: The connector 560 connects to the connector 260 of the operation terminal 130. When the connector 560 connects to the connector 260, the first security module 110 is attached to the operation terminal 130 in detachable state.

Function 2: The connector 560, when the first security module 110 is attached to the operation terminal 130, realizes wired communication between the operation terminal 130 and the first security module 110.

Function 3: The connector 560, when the first security module 110 is attached to the operation terminal 130, feeds power passed on from the connector 260 to electric components of the first security module 110.

The memory 550 is connected to the CPU 500. The memory 550 is implemented by using a RAM, a ROM, and a flash memory, and stores programs defining operations of the CPU 500 and data used by the CPU 500.

The CPU 500 is connected to the memory 550 and the connector 560. The CPU 500 executes the programs stored in the memory 550, thereby realizing the four functions of the first security module 110 described in the following.

Initial registration function B: The CPU 500 controls the first security module 110 to provide the first security module 110 with a function of realizing the initial registration performed by the device control system 100, through cooperation with other structural elements included in the device control system 100.

Second security module issue request function B: The CPU 500 controls the first security module 110 to provide the first security module 110 with a function of realizing the second security module issue request performed by the device control system 100, through cooperation with other structural elements included in the device control system 100.

Device operation function B: The CPU 500 controls the first security module 110 to provide the first security module 110 with a function of realizing the device operation performed by the device control system 100, through cooperation with other structural elements included in the device control system 100.

Information check function B: The CPU 500 controls the first security module 110 to provide the first security module 110 with a function of realizing the information check performed by the device control system 100, through cooperation with other structural elements included in the device control system 100.

This concludes description of the circuit structure of the first security module 110. The following describes the functional structure of the first security module 110.

Figure 6:
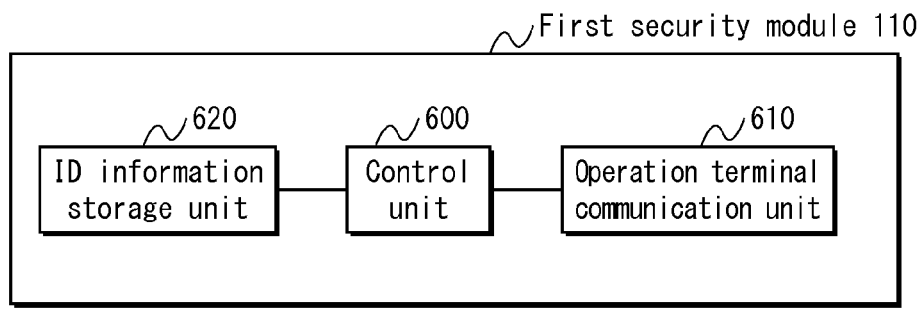
FIG. 6 is a block diagram illustrating functional structure of first security module 110.

FIG. 6 is a block diagram illustrating the functional structure of the first security module 110.

As illustrated in FIG. 6, the first security module 110 includes: a control unit 600; an operation terminal communication unit 610; and an ID information storage unit 620.

The ID information storage unit 620 is implemented by using a part of a storage area of the memory 550, and by the CPU 500 executing programs. The ID information storage unit 620 has a function of storing a security module ID that uniquely identifies the first security module 110.

The security module ID is written to a predetermined storage area of the ROM of the memory 550 in the manufacturing of the first security module 110. This prevents tampering of the security module ID of the first security module 110.

Further, the ID information storage unit 620 is tamper-resistant, particularly with respect to tampering of the security module ID stored therein. The ID information storage unit 620 is provided with such tamper resistance by utilizing encryption technology involving software and/or hardware.

The operation terminal communication unit 610 is implemented by using the connector 560 and by the CPU 500 executing programs. The operation terminal communication unit 610 is controlled by the control unit 600. The operation terminal communication unit 610 has a function of performing wired communication with the operation terminal 130 when the first security module 110 is attached to the operation terminal 130.

The control unit 600 is implemented by the CPU 500 executing programs. The control unit 600 controls the operation terminal communication unit 610 and the ID information storage unit 620, thereby realizing the four functions of the first security module 110 described above (i.e., the initial registration function B, the second security module issue request function B, the device operation function B, and the information check function B).

Figure 7:
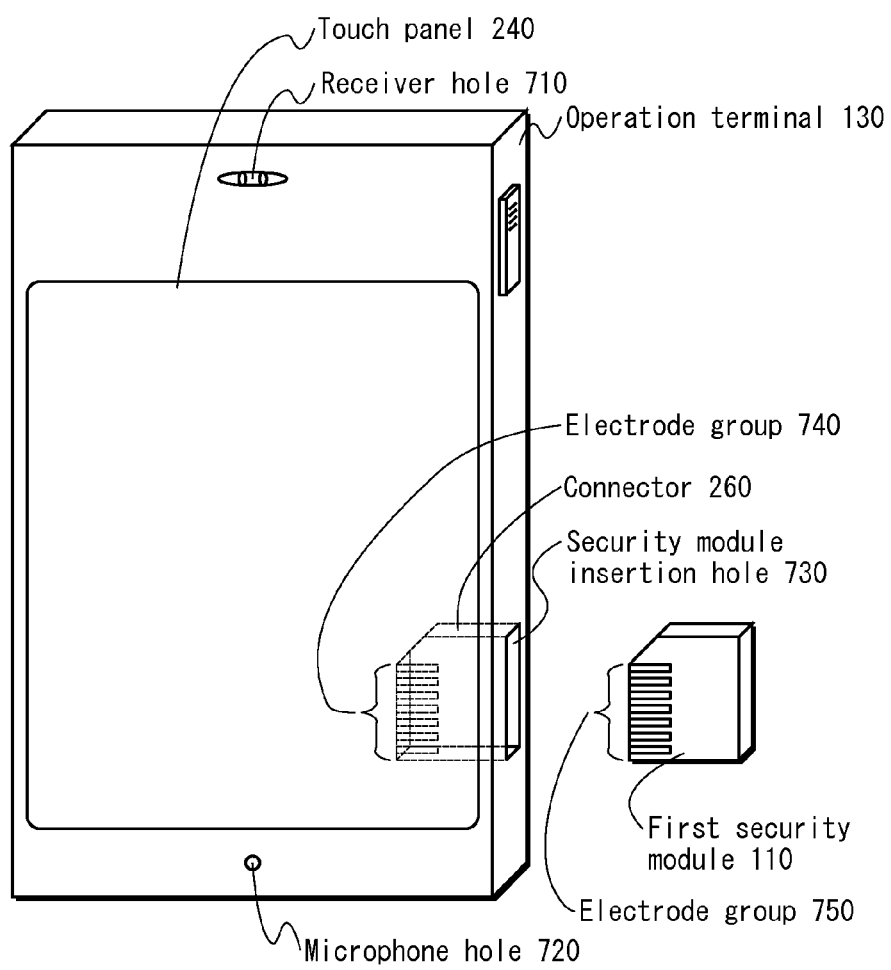
FIG. 7 is a perspective view illustrating exterior of operation terminal 130 and first security module 110.

FIG. 7 is a perspective view illustrating the exterior of the operation terminal 130 and the first security module 110.

As illustrated in FIG. 7, the operation terminal 130 is a smartphone and has a housing. A main surface of the housing has a receiver hole 710 and a microphone hole 720. The receiver hole 710 is for transmitting sound output from the receiver 270 to outside the housing, and the microphone hole 720 is for allowing sound from outside the housing to reach the microphone 280. Further, at the main surface of the housing, a main surface of the touch panel 240 is arranged. In addition, the housing has one side surface having a security module insertion hole 730. The security module insertion hole 730 has an inner part where the connector 260 is disposed.

Meanwhile, the first security module 110 has a housing that serves as the connector 560. Thus, when the housing of the first security module 110, or that is, the connector 560 is inserted into the security module insertion hole 730, the connector 260 and the connector 560 connect with one another. Thus, the first security module 110 is attached to the operation terminal 130.

The connector 260 includes an electrode group 740 composed of a plurality of metal electrodes. Meanwhile, the housing of the first security module 110, or that is, the connector 560 has an electrode group 750 composed of a plurality of metal electrodes. When the first security module 110 is attached to the operation terminal 130, each of the electrodes in the electrode group 740 is electrically connected with one of the electrodes in the electrode group 750. This allows the operation terminal 130 and the first security module 110 to perform wired communication.

FIG. 1 illustrates a device 140 (refers to a given one of the devices 140A through 140C). The device 140 is an electronic device located inside a house that operates on AC supplied from a domestic AC power supply, and for example, may be an air conditioner, a refrigerator, a recorder, or a television.

The following describes the device 140, instead of describing each of the devices 140A through 140C separately.

Figure 8:
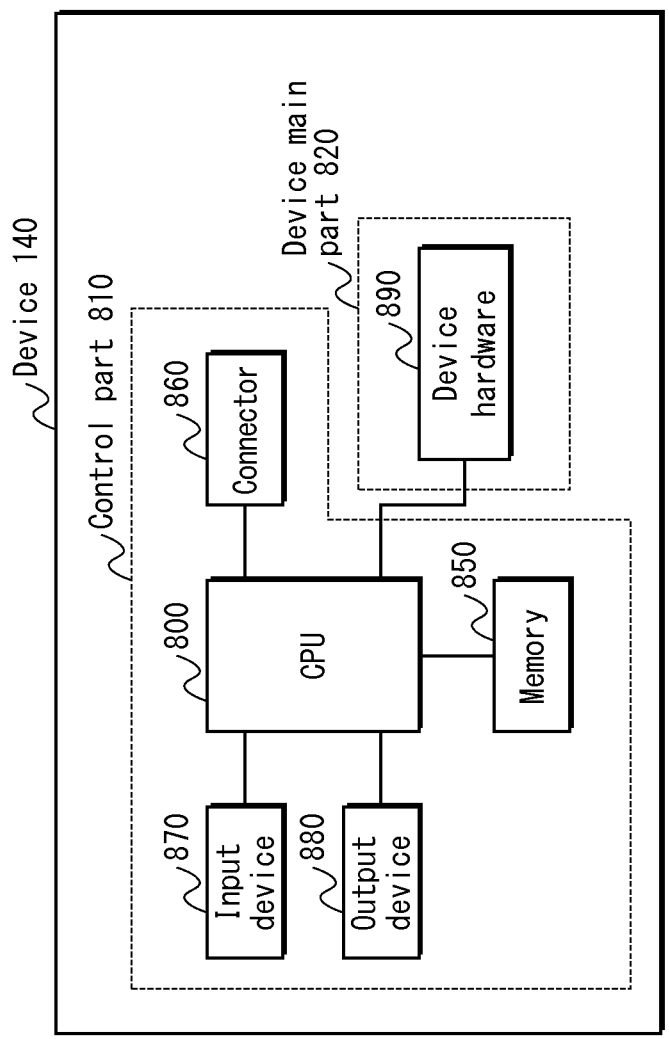
FIG. 8 is a circuit diagram of device 140.

FIG. 8 is a circuit diagram of the device 140.

As illustrated in FIG. 8, the device 140 includes a control part 810 and a device main part 820.

The control part 810 is implemented by using: a CPU 800; a connector 860; a memory 850; an input device 870; and an output device 880. The device main part 820 is implemented by using device hardware 890.

The device hardware 890 is connected to the CPU 800, and is controlled by the CPU 800. The device hardware 890 is a group of hardware that, by being controlled by the CPU 800, allows the device 140 to achieve its functions as an electronic device. For example, when the device 140 is an air conditioner, the device hardware 890 is a group of hardware that allows the device 140 to function as an air conditioner, and in this case, includes such hardware as a compressor, a heat exchanger, and a mechanical fan.

The connector 860 is connected to the CPU 800 and has the three functions described in the following.

Function 1: The connector 860 connects to a connector 1160 of a second security module 120. When the connector 860 connects to the connector 1160, the second security module 120 is attached to the device 140 in detachable state. The second security module 120 and the connector 1160 are described in detail later in the present disclosure.

Function 2: The connector 860, when the second security module 120 is attached to the device 140, realizes wired communication between the device 140 and the second security module 120.

Function 3: The connector 860, when the second security module 120 is attached to the device 140, feeds power to the second security module 120.

The input device 870 is connected to the CPU 800. The input device 870 has a function of converting operations performed thereon by a user of the device 140 into electric signals and transmitting the electric signals to the CPU 800. The input device 870 is implemented, for example, by using a control panel.

The output device 880 is connected to the CPU 800. The output device 880 has a function of displaying images, sound, etc., based on image signals transmitted from the CPU 800. For example, the output device 880 may be implemented by using a liquid crystal display and a speaker.

The memory 850 is connected to the CPU 800. The memory 850 is implemented by using a RAM, a ROM, and a flash memory, and stores programs defining operations of the CPU 800 and data used by the CPU 800.

The CPU 800 is connected to the memory 850, the connector 860, the input device 870, the output device 880, and the device hardware 890. The CPU 800 executes the programs stored in the memory 850 and controls the device hardware 890, the input device 870, and the output device 880, thereby realizing the four functions of the device 140 described in the following.

Device control function: The CPU 800 controls the device 140 to provide the device 140 with functions similar to those typically possessed by conventional devices. For example, when the device 140 is a television, such functions include a program playback function and a channel switching function. For example, when the device 140 is a washing machine, such functions include a rinsing function and a spin-drying function.

Device registration function C: The CPU 800 controls the device 140 to provide the device 140 with a function of realizing a device registration performed by the device control system 100, through cooperation with other structural elements included in the device control system 100. The device registration is described in detail later in the present disclosure. In specific, detailed description of the device registration is provided in the <Device Registration> section of the present disclosure, with reference to a flowchart.

Device operation function C: The CPU 800 controls the device 140 to provide the device 140 with a function of realizing the device operation performed by the device control system 100, through cooperation with other structural elements included in the device control system 100.

Information check function C: The CPU 800 controls the device 140 to provide the device 140 with a function of realizing the information check performed by the device control system 100, through cooperation with other structural elements included in the device control system 100.

This concludes description of the circuit structure of the device 140. The following describes the functional structure of the device 140.

Figure 9:
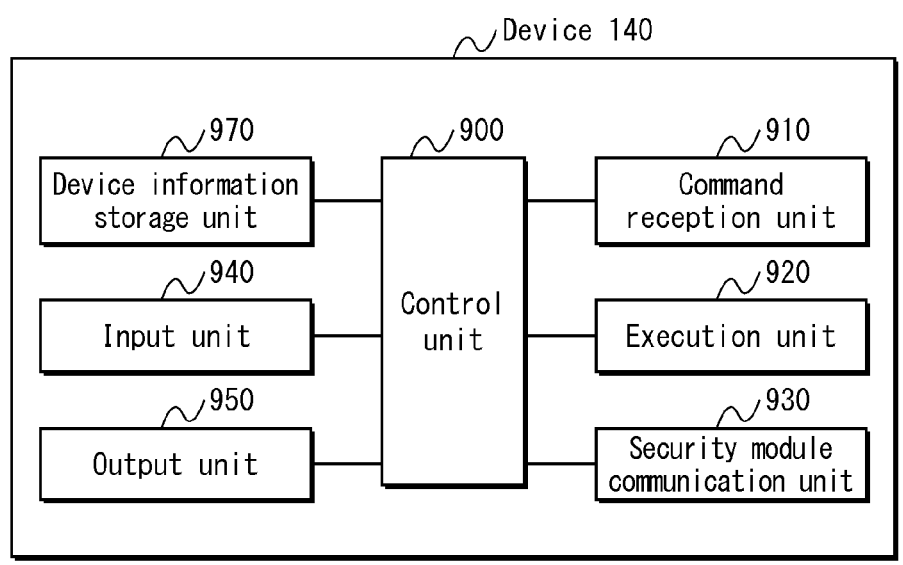
FIG. 9 is a block diagram illustrating functional structure of device 140.

FIG. 9 is a block diagram illustrating the functional structure of the device 140.

As illustrated in FIG. 9, the device 140 includes: a control unit 900; a command reception unit 910; an execution unit 920; a security module communication unit 930; an input unit 940; an output unit 950; and a device information storage unit 970.

The execution unit 920 is implemented by using the device hardware 890 and by the CPU 800 executing programs. The execution unit 920 is controlled by the control unit 900. The execution unit 920, when the control unit 900 transmits thereto a command indicating that the device hardware 890 is to be caused to carry out a predetermined operation, executes the predetermined operation indicated by the command by using the device hardware 890.

The security module communication unit 930 is implemented by using the connector 860 and by the CPU 800 executing programs. The security module communication unit 930 is controlled by the control unit 900. The security module communication unit 930 has a function of performing wired communication with the second security module 120 when the second security module 120 is attached to the device 140.

The input unit 940 is implemented by using the input device 870 and by the CPU 800 executing programs. The input unit 940 is controlled by the control unit 900. The input unit 940 has a function of receiving operations performed on the input device 870 by the user of the device 140. In addition, the input unit 940 has a function of, when receiving an operation performed by the user of the device 140 and the operation indicates that the device hardware 890 is to be caused to carry out a predetermined operation, generating a command indicating that the device hardware 890 is to be caused to carry out the predetermined operation, and transmitting the command to the control unit 900.

The output unit 950 is implemented by using the output device 880 and by the CPU 800 executing programs. The output unit 950 is controlled by the control unit 900. The output unit 950 has a function of generating images that are to be presented to the user of the device 140, and causing the output device 880 to display such images.

The device information storage unit 970 is implemented by using a part of a storage area of the memory 850 and by the CPU 800 executing programs. The device information storage unit 970 has a function of storing device information 1000.

FIG. 10 illustrates one example of the data structure of the device information 1000, which is stored by the device information storage unit 970.

As illustrated in FIG. 10, the device information 1000 includes a device type 1010, a model number 1020, one or more functions 1030, one or more security levels 1040, and one or more commands 1050. The device type 1010, the model number information 1020, the functions 1030, the security levels 1040, and the commands 1050 are associated with one another as illustrated in FIG. 10.

The device type 1010 indicates the type of device that the device 140 is classified into.

The model number 1020 indicates the model of the device 140.

Each function 1030 indicates a function that is controllable from the operation terminal 130, among the functions that the device 140 has as an electronic device.

Each security level 1040 indicates a security level that the operation terminal 130 needs to have in order to control the function 1030 associated therewith.

Here, the security level of the operation terminal 130 indicates the state of the operation terminal 130. In specific, the operation terminal 130 is in a first security level when the first security module 110 is attached to the operation terminal 130, whereas the operation terminal 130 is in a second security level when the first security module 110 is not attached to the operation terminal 130.

Further, the first security level is superior to the second security level. When the operation terminal 130 has the first security level, the operation terminal 130 is capable of controlling both functions that are controllable when the operation terminal 130 has the first security level and functions that are controllable when the operation terminal 130 has the second security level. In contrast, when the operation terminal 130 has the second security level, the operation terminal 130 is capable of controlling only the functions that are controllable when the operation terminal 130 has the second security level.

Each command 1050 is a command for causing the device 140 to carry out the function 1030 associated therewith.

The example of the device information 1000 illustrated in FIG. 10 indicates that the device 140 is an air conditioner of a model number "CS-X252C". Further, this example of the device information 1000 indicates that the "Power ON", "Power OFF", "Switch operation", and "Set timer" functions of the device 140 are controllable from the operation terminal 130, and that the "Power ON", "Power OFF", "Switch operation", and "Set timer" functions are controllable from the operation terminal 130 when having the first security level, whereas the "Power OFF" function is controllable from the operation terminal 130 when having the second security level.

Description of the functional structure of the device 140 continues, referring to FIG. 9 once again.

The control unit 900 is implemented by the CPU 800 executing programs. The control unit 900 controls the execution unit 920, the security module communication unit 930, the input unit 940, the output unit 950, and the device information storage unit 970, thereby realizing the four functions of the device 140 described above (i.e., the device control function, the device registration function C, the device operation function C, and the information check function C).

The following describes the second security modules 120A through 120C illustrated in FIG. 1, which have similar structures and similar functions.

Thus, the following describes the second security module 120, which may be any of the second security modules 120A through 120C, instead of describing each of the second security modules 120A through 120C separately.

Figure 11:
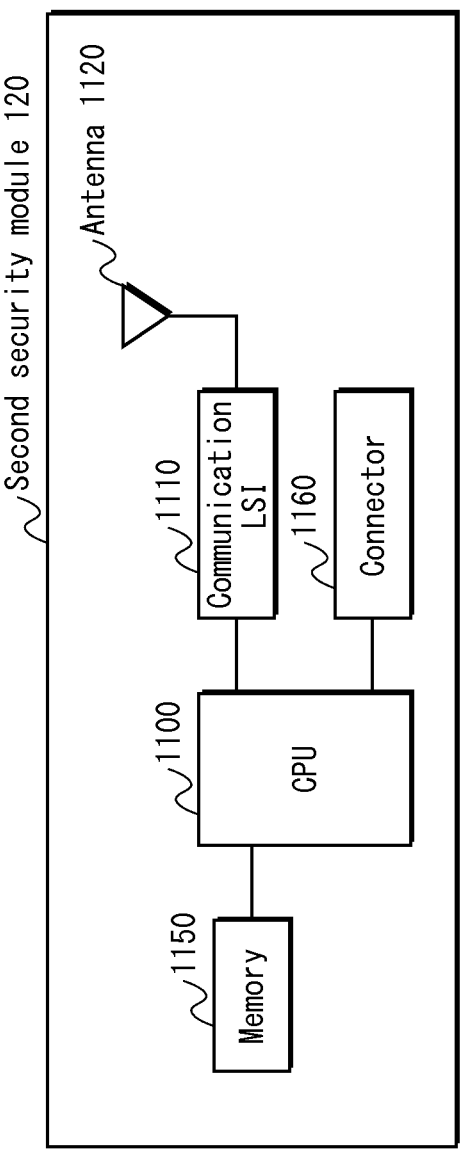
FIG. 11 is a circuit diagram of second security module 120.

FIG. 11 is a circuit diagram of the second security module 120.

As illustrated in FIG. 11, the second security module 120 includes: a CPU 1100; an LSI 1110 for communication (referred to in the following as a "communication LSI 1110"); an antenna 1120; a memory 1150; and the connector 1160.

The antenna 1120 is connected to the communication LSI 1110, and is used in the communication performed by the communication LSI 1110. For example, the antenna 1120 may be a metal monopole antenna.

The communication LSI 1110 is connected to the antenna 1120 and the CPU 1100, and is controlled by the CPU 1100. The communication LSI 1110 has the following functions: a modulation function of modulating a transmission signal transmitted from the CPU 1100; a transmission function of transmitting the modulated signal to the home gateway 150 by using the antenna 1120; a reception function of receiving a signal transmitted from the home gateway 150 by using the antenna 1120; and a demodulation function of demodulating the received signal and transmitting the demodulated signal to the CPU 1100.

The communication between the communication LSI 1110 and the home gateway 150 conforms to the Bluetooth™ protocol.

The connector 1160 is connected to the CPU 1100 and has the three functions described in the following.

Function 1: The connector 1160 connects to the connector 860 of the device 140. When the connector 1160 connects to the connector 860, the second security module 120 is attached to the device 140 in detachable state.

Function 2: The connector 1160, when the second security module 120 is attached to the device 140, realizes wired communication between the device 140 and the second security module 120.

Function 3: The connector 1160, when the second security module 120 is attached to the device 140, feeds power passed on from the connector 860 to electric components of the second security module 120.

The memory 1150 is connected to the CPU 1100. The memory 1150 is implemented by using a RAM, a ROM, and a flash memory, and stores programs defining operations of the CPU 1100 and data used by the CPU 1100.

The CPU 1100 is connected to the communication LSI 1110, the memory 1150, and the connector 1160. The CPU 1100 executes the programs stored in the memory 1150 and controls the communication LSI 1110, thereby realizing the three functions of the second security module 120 described in the following.

Device registration function D: The CPU 1100 controls the second security module 120 to provide the second security module 120 with a function of realizing the device registration performed by the device control system 100, through cooperation with other structural elements included in the device control system 100.

Device operation function D: The CPU 1100 controls the second security module 120 to provide the second security module 120 with a function of realizing the device operation performed by the device control system 100, through cooperation with other structural elements included in the device control system 100.

Information check function D: The CPU 1100 controls the second security module 120 to provide the second security module 120 with a function of realizing the information check performed by the device control system 100, through cooperation with other structural elements included in the device control system 100.

This concludes description of the circuit structure of the second security module 120. The following describes the functional structure of the second security module 120.

Figure 12:
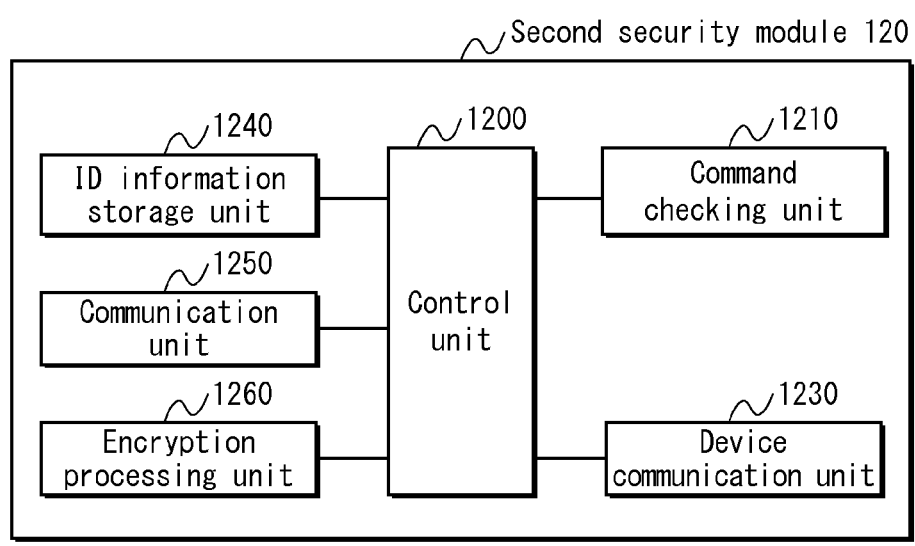
FIG. 12 is a block diagram illustrating functional structure of second security module 120.

FIG. 12 is a block diagram illustrating the functional structure of the second security module 120.

As illustrated in FIG. 12, the second security module 120 includes: a control unit 1200; a command checking unit 1210; a device communication unit 1230; an ID information storage unit 1240; a communication unit 1250; and an encryption processing unit 1260.

The communication unit 1250 is implemented by using the communication LSI 1110 and the antenna 1120, and by the CPU 1100 executing programs. The communication unit 1250 is controlled by the control unit 1200. The communication unit 1250 has a function of communicating with the home gateway 150 through communication that conforms to the Bluetooth™ protocol, and a function of communicating with the server device 160 via the home gateway 150 and the network 170.

The encryption processing unit 1260 is implemented by the CPU 1100 executing programs, and is controlled by the control unit 1200. The encryption processing unit 1260 has an encryption function, an authentication function, and a key sharing function. The encryption function is a function of executing encryption for maintaining confidentiality and integrity of data. The authentication function is a function of executing authentication by utilizing encryption technology. The key sharing function is a function of executing key sharing by utilizing encryption technology. In order to achieve the functions described above (i.e., encryption function, authentication function, and key sharing function), the encryption processing unit 1260 utilizes technology such as AES, ECDSA, ECDH, and/or SSL/TSL.

The command checking unit 1210 is implemented by the CPU 1100 executing programs, and is controlled by the control unit 1200. The command checking unit 1210 has the two functions described in the following.

Command checking function: The command checking unit 1210, when the communication unit 1250 receives a signature-provided command from the server device 160, performs signature verification. The command checking unit 1210, when performing the signature verification, checks the authenticity of the signature provided to the signature-provided command by using the encryption processing unit 1260.

Signature verification result notification function: The command checking unit 1210, when the authenticity of a signature provided to a signature-provided command is confirmed through the signature verification, generates a command included in the signature-provided command, and transmits the generated command and a signal indicating the authenticity of the signature to the control unit 1200. Meanwhile, the command checking unit 1210, when the authenticity of a signature provided to a signature-provided command is not confirmed through the signature verification, transmits a signal indicating the inauthenticity of the signature to the control unit 1200.

The device communication unit 1230 is implemented by using the connector 1160 and by the CPU 1100 executing programs. The device communication unit 1230 is controlled by the control unit 1200. The device communication unit 1230 has a function of performing wired communication with the device 140 when the second security module 120 is attached to the device 140.

The ID information storage unit 1240 is implemented by using a part of a storage area of the memory 1150 and by the CPU 1100 executing programs. The ID information storage unit 1240 has a function of storing a security module ID that uniquely identifies the second security module 120.

The security module ID is written to a predetermined storage area of the ROM of the memory 1150 in the manufacturing of the second security module 120. This prevents tampering of the security module ID of the second security module 120.

Further, the ID information storage unit 1240 is tamper-resistant, particularly with respect to tampering of the security module ID stored therein. The ID information storage unit 1240 is provided with such tamper resistance by utilizing encryption technology involving software and/or hardware.

The control unit 1200 is implemented by the CPU 1100 executing programs. The control unit 1200 controls the command checking unit 1210, the device communication unit 1230, the ID information storage unit 1240, the communication unit 1250, and the encryption processing unit 1260, thereby realizing the three functions of the second security module 120 described above (i.e., the device registration function D, the device operation function D, and the information check function D).

Figure 13:
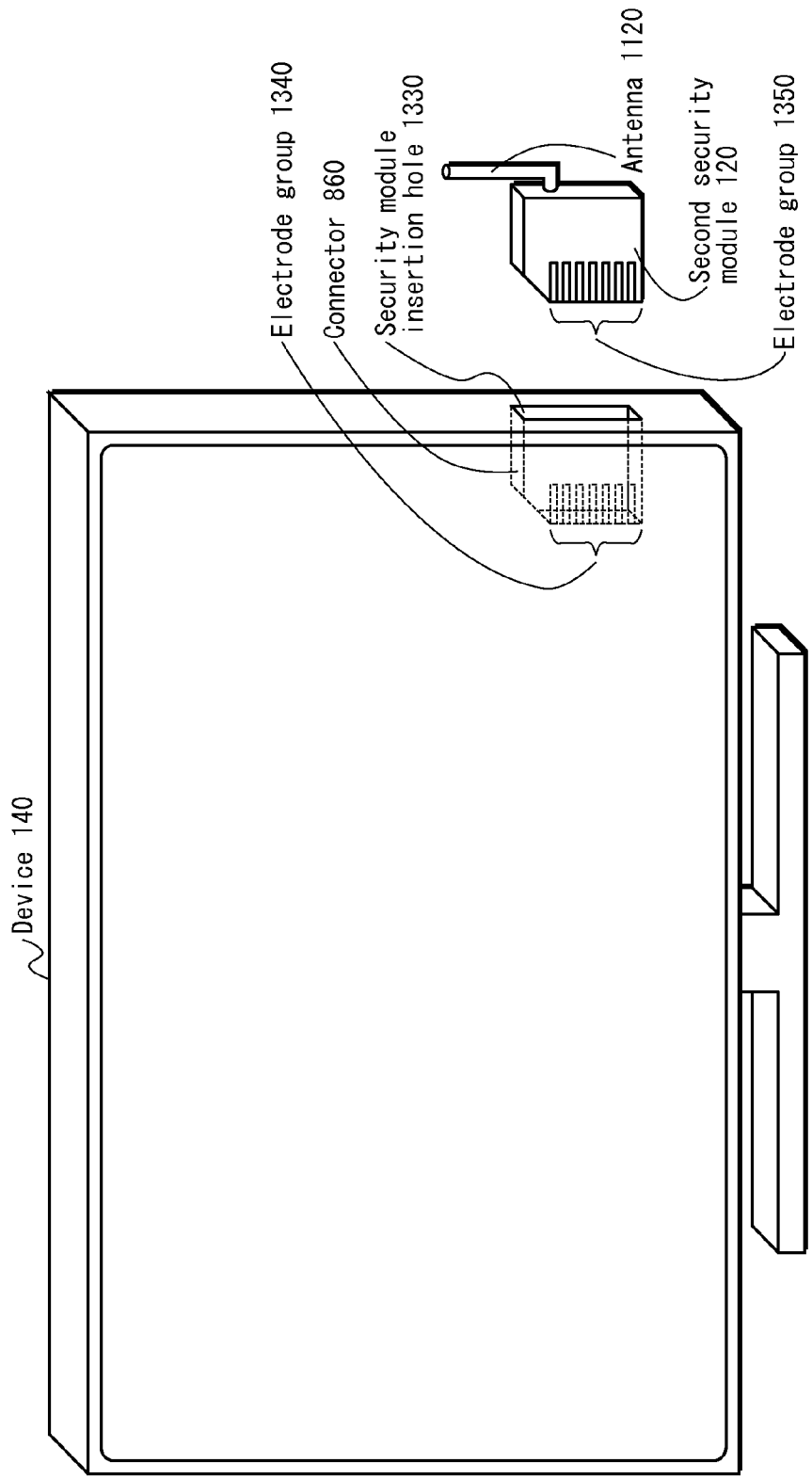
FIG. 13 is a perspective view illustrating exterior of device 140 and second security module 120.

FIG. 13 is a perspective view illustrating the exterior of the device 140 and the second security module 120.

FIG. 13 illustrates an example where the device 140 is a television.

As illustrated in FIG. 13, the device 140 has a housing. A side surface of the housing has a security module insertion hole 1330. The security module insertion hole 1330 has an inner part where the connector 860 is disposed.

Meanwhile, the security module 120 has a housing that serves as the connector 1160. Thus, when the housing of the second security module 120, or that is, the connector 1160 is inserted into the security module insertion hole 1130, the connector 860 and the connector 1160 connect with one another. Thus, the second security module 120 is attached to the device 140.

The connector 860 includes an electrode group 1340 composed of a plurality of metal electrodes. Meanwhile, the housing of the second security module 120, or that is, the connector 1160 has an electrode group 1350 composed of a plurality of metal electrodes. When the second security module 120 is attached to the device 140, each of the electrodes in the electrode group 1340 is electrically connected with one of the electrodes in the electrode group 1350. This allows the device 140 and the second security module 120 to perform wired communication.

Figure 14:
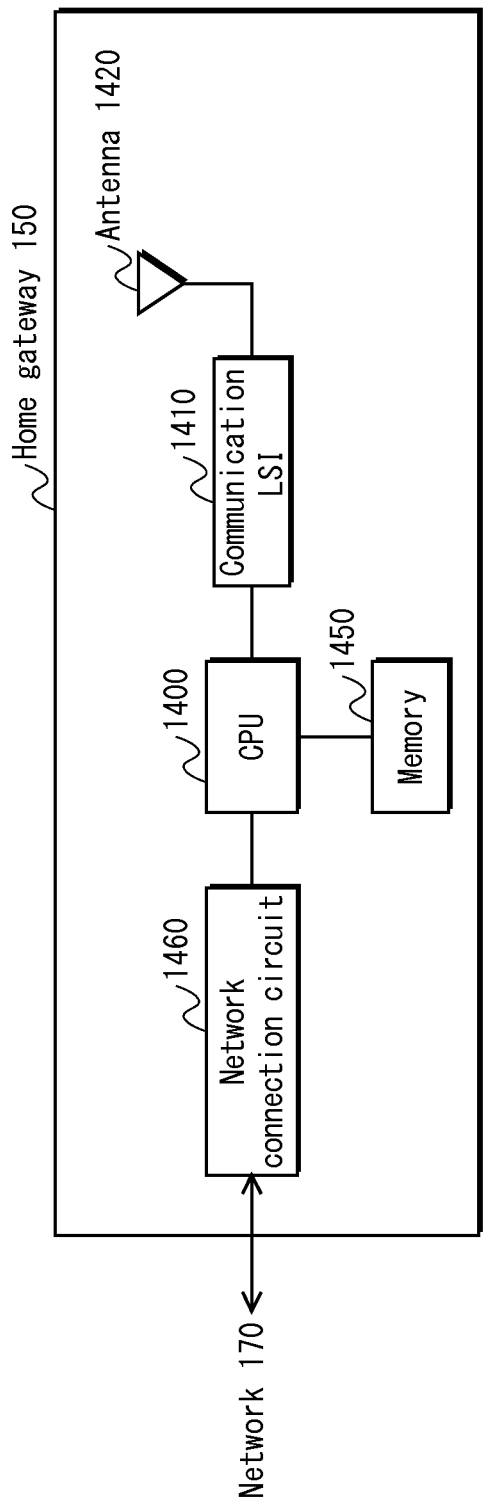
FIG. 14 is a circuit diagram of home gateway 150.

FIG. 14 is a circuit diagram of the home gateway 150.

As illustrated in FIG. 14, the home gateway 150 includes: a CPU 1400; an LSI 1410 for communication (referred to in the following as a "communication LSI 1410"); an antenna 1420; a memory 1450; and a network connection circuit 1460.

The antenna 1420 is connected to the communication LSI 1410, and is used in the communication performed by the communication LSI 1410. For example, the antenna 1420 may be a metal monopole antenna.

The communication LSI 1410 is connected to the antenna 1420 and the CPU 1400. The communication LSI 1410 is controlled by the CPU 1400. The communication LSI 1410 has the following functions: a modulation function of modulating a transmission signal transmitted from the CPU 1400; a transmission function of transmitting the modulated signal to the second security module 120 by using the antenna 1420; a reception function of receiving a signal transmitted from the second security module 120 by using the antenna 1420; and a demodulation function of demodulating the received signal and transmitting the demodulated signal to the CPU 1400.

The communication between the communication LSI 1410 and the second security module 120 conforms to the Bluetooth™ protocol.

The memory 1450 is connected to the CPU 1400. The memory 1450 is implemented by using a RAM, a ROM, and a flash memory, and stores programs defining operations of the CPU 1400 and data used by the CPU 1400.

The network connection circuit 1460 is connected to the CPU 1400 and the network 170. The network connection circuit 1460 is controlled by the CPU 1400. The network connection circuit 1460 has a function of receiving signals transmitted from external devices via the network 170 and transmitting such signals to the CPU 1400, and a function of transmitting signals transmitted from the CPU 1400 to external devices via the network 170.

The CPU 1400 is connected to the communication LSI 1410, the memory 1450, and the network connection circuit 1460. The CPU 1400 executes programs stored in the memory 1450 and controls the communication LSI 1410 and the network connection circuit 1460, thereby providing the home gateway 150 with a communication relay function of relaying the communication between the server device 160 and the second security module 120.

This concludes description of the circuit structure of the home gateway 150. The following describes the functional structure of the home gateway 150.

Figure 15:
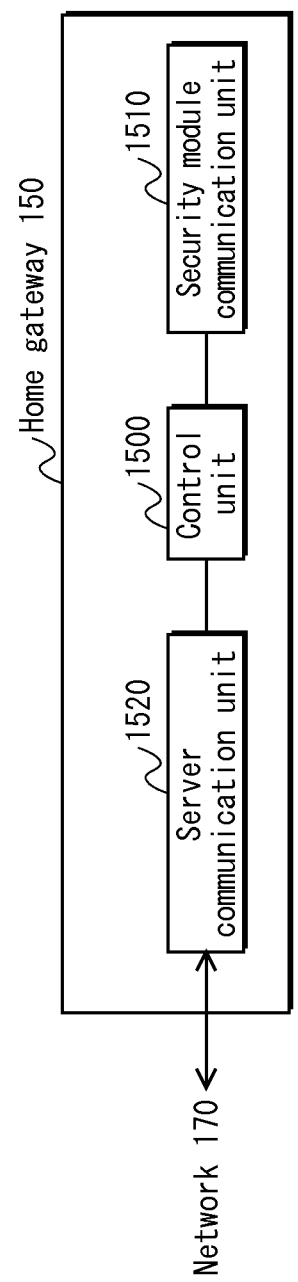
FIG. 15 is a block diagram illustrating functional structure of home gateway 150.

FIG. 15 is a block diagram illustrating the functional structure of the home gateway 150.

As illustrated in FIG. 15, the home gateway 150 includes: a control unit 1500; a security module communication unit 1510; and a server communication unit 1520.

The security module communication unit 1510 is implemented by using the communication LSI 1410 and the antenna 1420, and by the CPU 1400 executing programs. The security module communication unit 1510 is controlled by the communication unit 1500. The security module communication unit 1510 has a function of communicating with the second security module 120 through communication that conforms to the Bluetooth™ protocol.

The server communication unit 1520 is implemented by using the network connection circuit 1460 and by the CPU 1400 executing programs. The server communication unit 1520 is controlled by the control unit 1500. The server communication unit 1520 has a function of communicating with the server device 160 via the network 170.

The control unit 1500 is implemented by the CPU 1400 executing programs. The control unit 1500 controls the security module communication unit 1510 and the server communication unit 1520, thereby providing the home gateway 150 with the above-described communication relay function.

The following describes the network 170, which is illustrated in FIG. 1. The network 170 is a network connected to the home gateway 150, the server device 160, and the base station 180. The network 170 has a function of transferring signals between devices connected thereto.

The following describes the base station 180, which is illustrated in FIG. 1. The base station 180 is connected to the network 170. The base station 180 is a wireless base station for telecommunication service, and communicates with the operation terminal 130 by utilizing the commercial wireless communication line for portable phones. The base station 180 has a function of relaying the communication between the operation terminal 130 and the server device 160.

Figure 16:
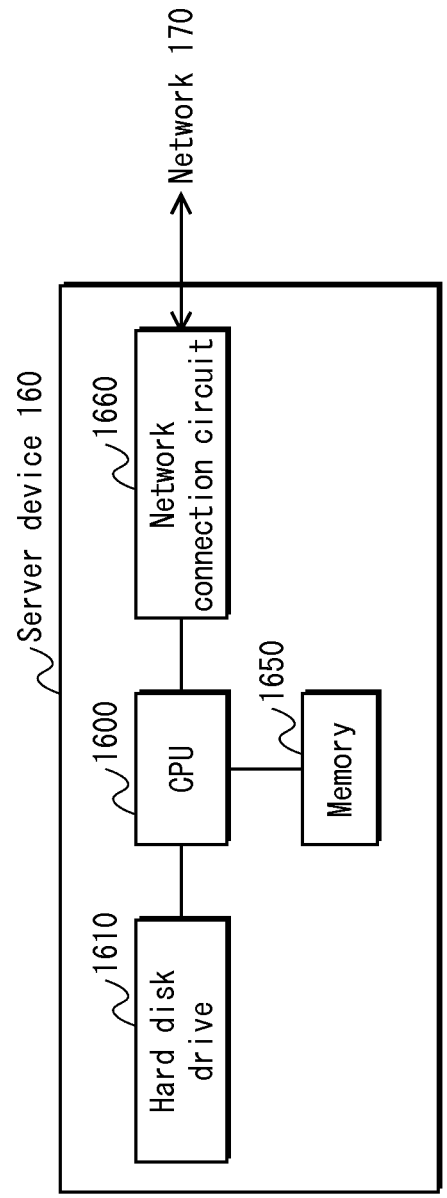
FIG. 16 is a circuit diagram of server device 160.

FIG. 16 is a circuit diagram of the server device 160.

The server device 160 is a computer that is connected to the network 170. The server device 160 has two user modes, namely a first user mode and a second user mode. The second user mode has a lower privilege level than the first user mode.

As illustrated in FIG. 16, the server device 160 includes: a CPU 1600; a network connection circuit 1660; a memory 1650; and a hard disk drive 1610.

The network connection circuit 1660 is connected to the CPU 1600 and the network 170. The network connection circuit 1660 is controlled by the CPU 1600. The network connection circuit 1660 has a function of receiving signals transmitted from external devices via the network 170 and transmitting the signals to the CPU 1600, and a function of transmitting signals transmitted from the CPU 1600 to external devices via the network 170.

The memory 1650 is connected to the CPU 1600. The memory 1650 is implemented by using a RAM, a ROM, and a flash memory, and stores programs defining operations of the CPU 1600 and data used by the CPU 1600.

The hard disk drive 1610 is connected to the CPU 1600. The hard disk drive 1610 includes a built-in hard disk, and stores data used by the CPU 1600.

The CPU 1600 is connected to the network connection circuit 1660, the memory 1650, and the hard disk drive 1610. The CPU 1600 executes programs stored in the memory 1650 and controls the network connection circuit 1660 and the hard disk drive 1610, thereby realizing the five functions of the server device 160 described in the following.

Initial registration function E: The CPU 1600 controls the server device 160 to provide the server device 160 with a function of realizing the initial registration performed by the device control system 100, through cooperation with other structural elements included in the device control system 100.

Second security module issue request function E: The CPU 1600 controls the server device 160 to provide the server device 160 with a function of realizing the second security module issue request performed by the device control system 100, through cooperation with other structural elements included in the device control system 100.

Device registration function E: The CPU 1600 controls the server device 160 to provide the server device 160 with a function of realizing the device registration performed by the device control system 100, through cooperation with other structural elements included in the device control system 100.

Device operation function E: The CPU 1600 controls the server device 160 to provide the server device 160 with a function of realizing the device operation performed by the device control system 100, through cooperation with other structural elements included in the device control system 100.

Information check function E: The CPU 1600 controls the server device 160 to provide the server device 160 with a function of realizing the information check performed by the device control system 100, through cooperation with other structural elements included in the device control system 100.

This concludes description of the circuit structure of the server device 160. The following describes the functional structure of the server device 160.

Figure 17:
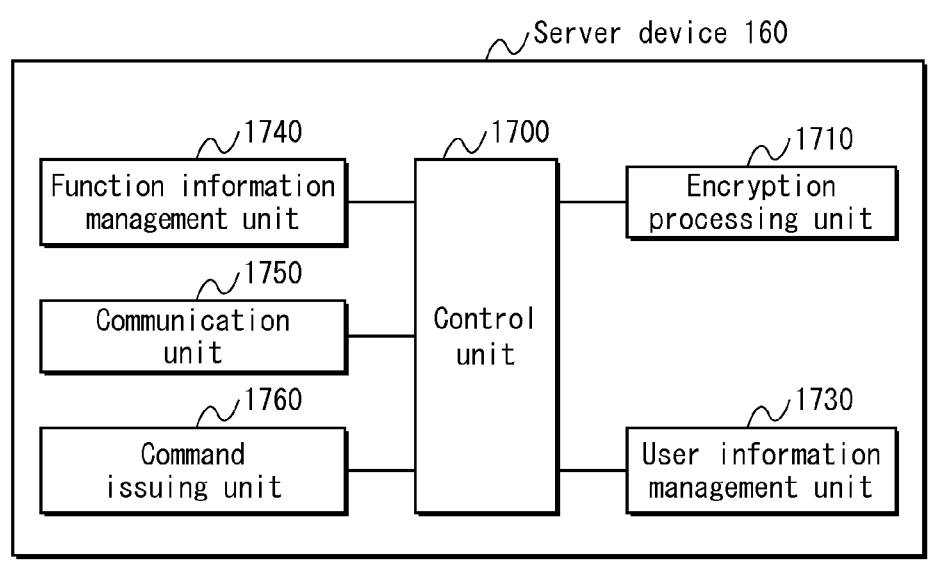
FIG. 17 is a block diagram illustrating functional structure of server device 160.

FIG. 17 is a block diagram illustrating the functional structure of the server device 160.

As illustrated in FIG. 17, the server device 160 includes: a control unit 1700; an encryption processing unit 1710; a user information management unit 1730; a function information management unit 1740; a communication unit 1750; and a command issuing unit 1760.

The communication unit 1750 is implemented by using the network connection circuit 1660 and by the CPU 1600 executing programs. The communication unit 1750 is controlled by the control unit 1700. The communication unit 1750 has a function of communicating with the second security module 120 via the network 170 and the home gateway 150, and a function of communicating with the operation terminal 130 via the network 170 and the base station 180.

The encryption processing unit 1710 is implemented by the CPU 1600 executing programs, and is controlled by the control unit 1700. The encryption processing unit 1710 has an encryption function, an authentication function, and a key sharing function. The encryption function is a function of executing encryption for maintaining confidentiality and integrity of data. The authentication function is a function of executing authentication by utilizing encryption technology. The key sharing function is a function of executing key sharing by utilizing encryption technology. In order to achieve the functions described above (i.e., encryption function, authentication function, and key sharing function), the encryption processing unit 1710 utilizes technology such as AES, ECDSA, ECDH, and/or SSL/TSL.

The user information management unit 1730 is implemented by using a part of a storage area of the hard disk drive 1610 and by the CPU 1600 executing programs. The user information management unit 1730 has a function of storing user information 1800, and a function of updating the user information 1800 stored therein.

FIG. 18 illustrates one example of the data structure of the user information 1800, which is stored by the user information management unit 1730.

As illustrated in FIG. 18, the user information 1800 includes one or more user names 1810, one or more user accounts 1820, one or more passwords 1830, one or more pieces of registration information 1840, one or more device types 1850, one or more model numbers 1860, and one or more security module IDs 1870. The user names 1810, the user accounts 1820, the passwords 1830, the pieces of registration information 1840, the device types 1850, the model numbers 1860, and the security module IDs 1870 are associated with one another as illustrated in FIG. 18.

Each user name 1810 indicates a name of a user using the device control system 100.

Each user account 1820 indicates an account that a user indicated by the user name 1810 associated therewith uses to log in to the server device 160.

Each password 1830 indicates a hash value of a password that a user indicated by the user name 1810 associated therewith uses to log in to the server device 160.

Each piece of registration information 1840 indicates registration information (e.g., an address, a telephone number, and a date of birth) of a user indicated by the user name 1810 associated therewith.

Each device type 1850 indicates a type of device that a device that is used by a user indicated by the user name 1810 associated therewith is classified into. The device is either one device 140 among one or more devices 140 included in the device control system 100, or one operation terminal 130 among one or more operation terminals 130 included in the device control system 100.

Each model number 1860 indicates a model of the device, whose device type is indicated by the device type 1850 associated therewith.

Each security module ID 1870 indicates a security module ID stored by a security module inserted into the device, whose model is indicated by the model number 1860 associated therewith.

The function information management unit 1740 is implemented by using a part of a storage area of the hard disk drive 1610 and by the CPU 1600 executing programs. The function information management unit 1740 has a function of storing function information 1900, and a function of updating the function information 1900 stored therein.

FIG. 19 illustrates one example of the data structure of the function information 1900, which is stored by the function information management unit 1740.

As illustrated in FIG. 19, the function information 1900 includes one or more device types 1910, one or more model numbers 1920, one or more functions 1930, one or more security levels 1940, and one or more commands 1950. The device types 1910, the model numbers 1920, the functions 1930, the security levels 1940, and the commands 1950 are associated with one another as illustrated in FIG. 19.

Each device type 1910 indicates a type of device that a device 140 included in the device control system 100 is classified into.

Each model number 1920 indicates a model of the device 140.

Each function 1930 indicates, among one or more functions that the device 140 of the model indicated by the model number 1920 associated therewith has as an electronic device, one function that is controllable from an operation terminal 130.

Each security level 1940 indicates a security level that an operation terminal 130 needs to have in order to control a function of the device 140 indicated by the function 1930 associated therewith. Thus, the security level 1940 is similar to the security level 1040 (illustrated in FIG. 10).

Each command 1950 is a command for causing the device 140 of a model indicated by the model number 1860 associated therewith to carry out a function indicated by the function 1930 associated therewith.

Description of the functional structure of the server device 160 continues, referring to FIG. 17 once again.

The command checking unit 1760 is implemented by the CPU 1600 executing programs, and is controlled by the control unit 1700. The command checking unit 1760 has the two functions described in the following.

Command generation function: The command checking unit 1760 refers to the one or more functions 1900 stored by the function information management unit 1740, and generates a command for causing a device 140 that is the control target to carry out a target function.

Signature provision function: The command checking unit 1760 provides an electronic signature to a generated command by using the encryption processing unit 120, and thereby generates a signature-provided command. The electronic signature indicates the authenticity of the generated command.

The control unit 1700 is implemented by the CPU 1600 executing programs. The control unit 1700 controls the encryption processing unit 1710, the user information management unit 1730, the function information management unit 1740, the communication unit 1750, and the command issuing unit 1760, thereby realizing the five functions of the server device 160 described above (i.e., the initial registration function E, the second security module issue request function E, the device registration function E, the device operation function E, and the information check function E).

This concludes the description of the structure of the device control system 100. The following describes operations performed by the device control system 100, with reference to the accompanying drawings.

<Operations>

The device control system 100 is characterized for performing: the initial registration; the second security module issue request; the device registration; the device operation; and the information check.

The following describes such operations, one by one.

<Initial Registration>

The initial registration performed by the device control system 100 is an operation of registering, to the server device 160, information related to a user who newly uses the device control system 100.

The following explanation is based on a case where the user is already in possession of a first security module 110, having acquired the first security module 100 legitimately. Note that in the device control system 100, a user may legitimately acquire a first security module 110 through the following process, for example. First, a user makes a request to an administrator of the device control system 100 for a first security module. In response, when accepting the request, the administrator provides a first security module 110 to the user having made the request.

Figure 20:
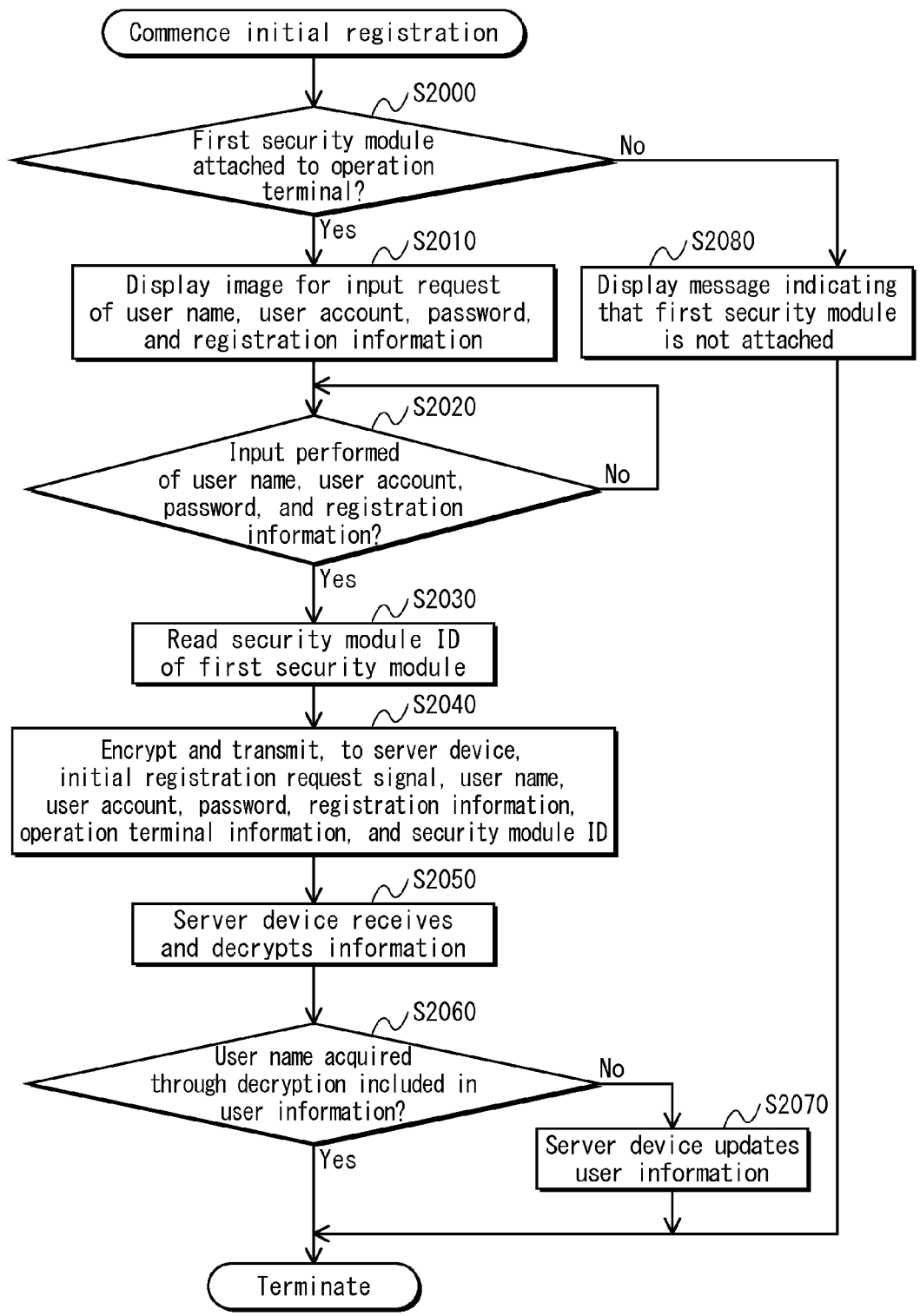
FIG. 20 is a flowchart illustrating initial registration.

FIG. 20 is a flowchart illustrating the initial registration.

The initial registration is commenced when the operation reception unit 320 receives a predetermined operation that the user performs on an operation terminal 130.

When the initial registration is commenced, the control unit 300 controls the security module communication unit 330 and attempts to perform wired communication with a first security module 110. Thus, the control unit 300 determines whether or not a first security module 110 is attached to the operation terminal 130 (Step S2000).

When the wired communication with a first security module 110 is successful and thus it is determined that a first security module 110 is attached to the operation terminal 130 in Step S2000 (Yes in Step S2000), the control unit 300 controls the display unit 310 to cause the touch panel 240 to display a request for input of information to be registered to the server device 160 (Step S2010). Here, the information to be registered to the server device 160 includes a user name, a user account, a password, and registration information as described above.

When the operation reception unit 320 receives input of a user name, a user account, a password, and registration information with the input request displayed on the touch panel 240 (i.e., when Yes in Step S2020 after No in Step S2020 for several times), the control unit 300 controls the security module communication unit 330 to transmit a read request signal to the first security module 110. Here, the read request signal is a request for the first security module 110 to read the security module ID thereof, which is stored in the ID information storage unit 620.

When the operation terminal communication unit 610 of the first security module 110 receives the read request signal transmitted from the security module communication unit 330, the control unit 600 reads the security module ID (Step S2030), and controls the operation terminal communication unit 610 to transmit the security module ID to the operation terminal 130.

When the security module communication unit 330 of the operation terminal 130 receives the security module ID transmitted from the operation terminal communication unit 610, the control unit 300 controls the encryption processing unit 360 to encrypt the following information: (i) an initial registration request signal; (ii) the user name, the user account, the password, and the registration information having been input; (iii) the operation terminal information 400, which is stored in the operation terminal information storage unit 370; and (iv) the security module ID having been received. The initial registration request signal is a request to proceed with the initial registration. Further, the control unit 300 controls the communication unit 350 to transmit the encrypted information to the server device 160 (Step S2040).

When the communication unit 1750 of the server device 160 receives the encrypted information transmitted from the communication unit 350, the control unit 1700 controls the encryption processing unit 1710 to decrypt the encrypted information (Step S2050). Thus, the control unit 1700 acquires the initial registration request signal, the user name, the user account, the password, the registration information, the operation terminal information, and the security module ID.

When acquiring such information, the control unit 1700 controls the user information management unit 1730 to check whether or not the user name acquired through the decryption is included in the user information 1800, which is stored in the user information management unit 1730 (Step S2060).

When it is determined that the user name is not included in the user information 1800 through the processing in Step S2060 (No in Step S2060), the control unit 1700 controls the user information management unit 1730 to update the user information 1800 (Step S2070). Here, the user information 1800 is updated such that the user name, the user account, the password, the registration information, the operation terminal information (including the terminal type 410 and the model number 420, as illustrated in FIG. 4), and the security module ID acquired through the decryption are associated with one another.

FIG. 21 illustrates one example of the data structure of the user information 1800 having been updated through the processing in Step S2070. In specific, FIG. 21 illustrates an example where information related to the user, who is identified by a user name 1810 "User A" after the updating, has been updated.

As illustrated in FIG. 21, through the processing in Step S2070, the user information management unit 1730 updates the user information 1800 to include an associated set of information related to the user, including the user name ("User A"), the user account, the password, the registration information, the operation terminal information, and the security module ID, which are acquired through the decryption.

Description of the initial registration continues, referring to FIG. 20 once again.

Note that when the wired communication with a first security module 110 is unsuccessful and thus it is determined that a first security module 110 is not attached to the operation terminal 130 in Step S2000 (No in Step S2000), the control unit 300 controls the display unit 310 to cause the touch panel 240 to display a screen indicating that a first security module 110 is not attached to the operation terminal 130 (Step S2080).

Further, note that the device control system 100 terminates the initial registration in each of the following cases: (i) when it is determined that the user name is included in the user information 1800 through the processing in Step S2060 (Yes in Step S2060); (ii) when the processing in Step S2070 is completed; and (iii) when the processing in Step S2080 is completed.

<Second Security Module Issue Request>

The second security module issue request performed by the device control system 100 is an operation of receiving, from a user using the device control system 100, a request to issue a new second security module.

Figure 22:
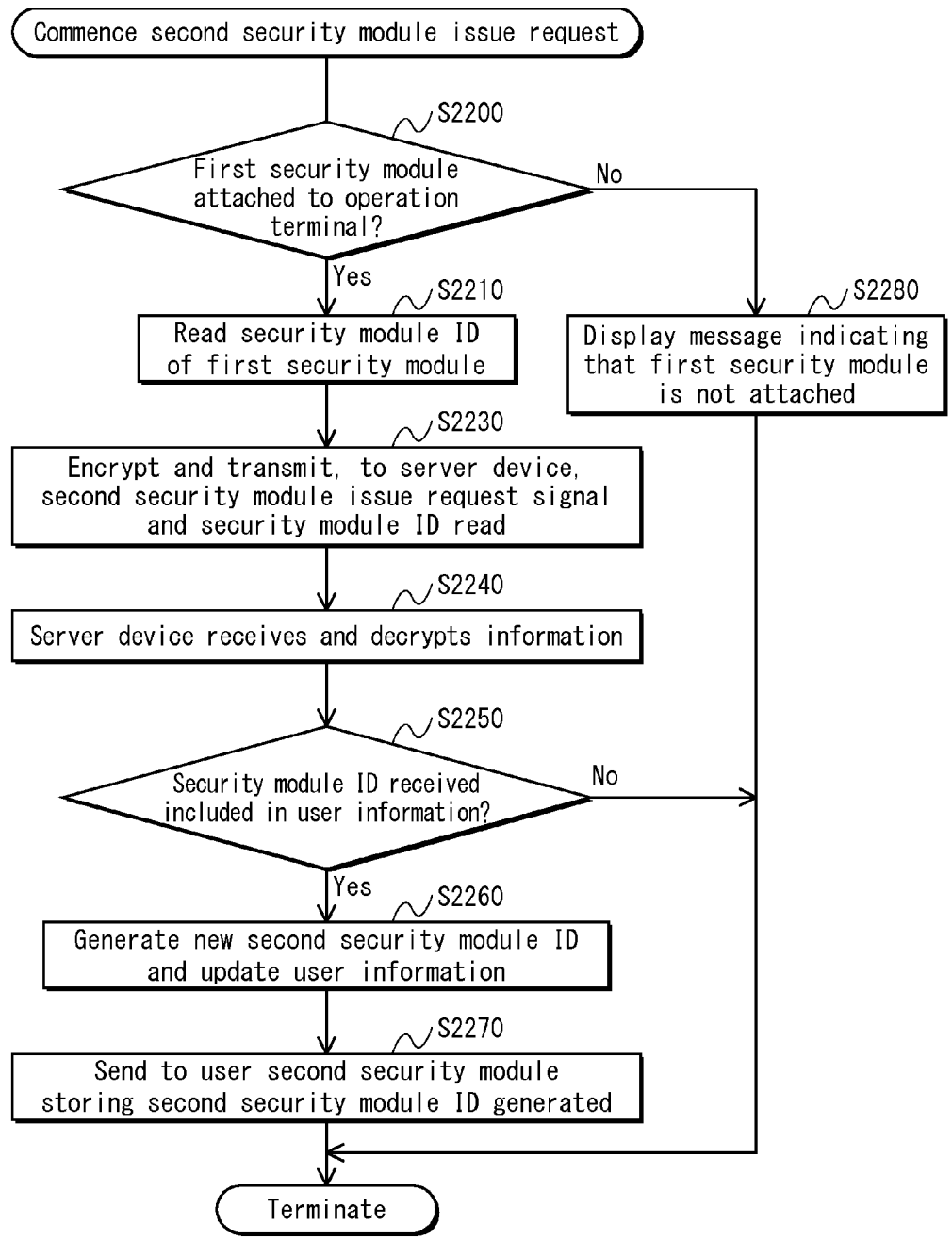
FIG. 22 is a flowchart illustrating second security module issue request.

FIG. 22 is a flowchart illustrating the second security module issue request.

The second security module issue request is commenced when the operation reception unit 320 receives a predetermined operation that the user performs on the operation terminal 130.

When the second security module issue request is commenced, the control unit 300 controls the security module communication unit 330 to attempt to perform wired communication with a first security module 110. Thus, the control unit 300 determines whether or not a first security module 110 is attached to the operation terminal 130 (Step S2200).

In Step S2200, when the wired communication with a first security module 110 is successful and thus it is determined that a first security module 110 is attached to the operation terminal 130 (Yes in Step S2200), the control unit 300 controls the security module communication unit 330 to transmit a read request signal to the first security module 110. Here, the read request signal is a request for the first security module 110 to read the security module ID thereof.

When the operation terminal communication unit 610 of the first security module 110 receives the read request signal transmitted from the security module communication unit 330, the control unit 600 reads the security module ID (Step S2210), and controls the operation terminal communication unit 610 to transmit the security module ID to the operation terminal 130.

When the security module communication unit 330 of the operation terminal 130 receives the security module ID transmitted from the operation terminal communication unit 610, the control unit 300 controls the encryption processing unit 360 to encrypt the following information: (i) a second security module issue request signal and (ii) the security module ID having been received. The second security module issue request signal is a request to proceed with the second security module issue request. Further, the control unit 300 controls the communication unit 350 to transmit the encrypted information to the server device 160 (Step S2230).

When the communication unit 1750 of the server device 160 receives the encrypted information transmitted from the communication unit 350, the control unit 1700 controls the encryption processing unit 1710 to decrypt the encrypted information (Step S2240). Thus, the control unit 1700 acquires the second security module issue request signal and the security module ID.

When acquiring such information, the control unit 1700 controls the user information management unit 1730 to check whether or not the security module ID acquired through the decryption is included in the user information 1800 (Step S2250).

When it is determined that the security module ID is included in the user information 1800 through the processing in Step S2250 (Yes in Step S2250), the control unit 1700 generates a new security module ID. Further, the control unit 1700 controls the user information management unit 1730 to update the user information 1800 (Step S2260). Here, the user information 1800 is updated such that the new security module ID is associated with a user name 1810 associated with the security module ID acquired through the decryption.

FIG. 23 illustrates one example of the data structure of the user information 1800 having been updated through the processing in Step S2260. In specific, FIG. 23 illustrates an example where information related to a user name 1810 ("User A") associated with a security module ID "0x481DA188" has been updated.

As illustrated in FIG. 23, through the processing in Step S2260, the user information management unit 1730 updates the user information 1800 by adding the new security module ID (having a value "0xC63694AD") to the user information 1800 as a security module ID 1870 that is associated with the user name 1810 associated with the security module ID acquired through the decryption (having the value "0x481DA188").

Description of the second security module issue request continues, referring to FIG. 22 once again.

When the user information 1800 is updated through the processing in Step S2260, the administrator of the device control system 100 sends, for example by post, a second security module 120 storing the newly generated security module ID to the user (Step S2270). Here, as already described above, the new security module ID is included in the updated user information 1800 as a security module ID 1870 that is associated with a user name 1810 indicating the user. Further, the sending is performed based on the registration information 1840 associated with the newly generated security module ID in the updated user information 1800.

Note that when the wired communication with a first security module 110 is unsuccessful and thus it is determined that a first security module 110 is not attached to the operation terminal 130 in Step S2200 (No in Step S2200), the control unit 300 controls the display unit 310 to cause the touch panel 240 to display a screen indicating that a first security module 110 is not attached to the operation terminal 130 (Step S2280).

Further, note that the device control system 100 terminates the second security module issue request in each of the following cases: (i) when the processing in Step S2280 is completed; (ii) when it is determined that the security module ID is not included in the user information 1800 through the processing in Step S2250 (No in Step S2250); and (iii) when the processing in Step S2270 is completed.

<Device Registration>

The device registration performed by the device control system 100 is an operation of registering, to the server device 160, information on a new device 140 having attached thereto the new second security module 120 that has been sent out through the processing in Step S2270 in the second security module issue request.

Figure 24:
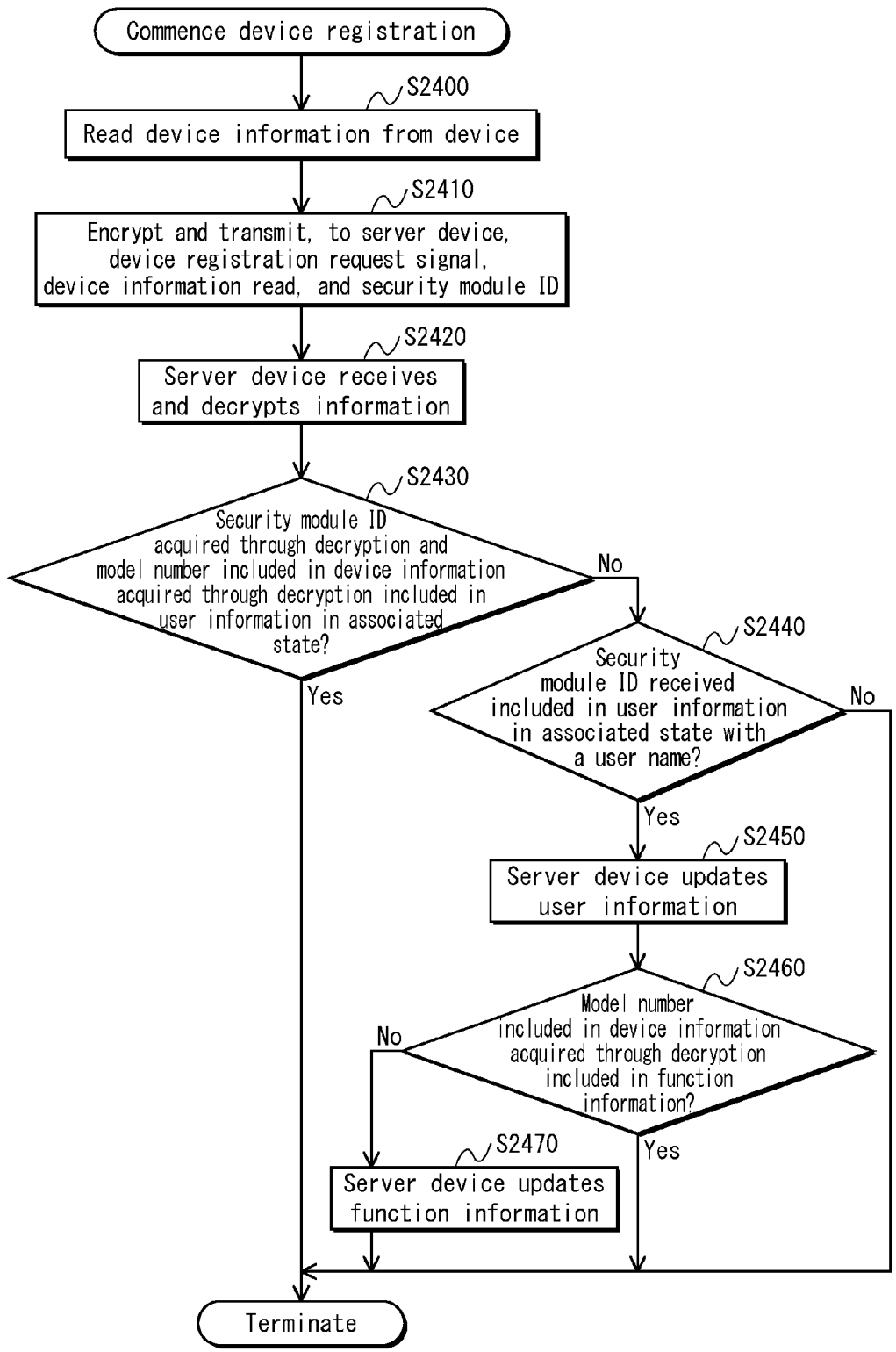
FIG. 24 is a flowchart illustrating device registration.

FIG. 24 is a flowchart illustrating the device registration.

The device registration is commenced when the device 140 is turned on and the second security module 120 is activated.

When the device registration is commenced, the control unit 1200 of the second security module 120 controls the device communication unit 1230 to transmit a read request signal to the device 140. Here, the read request signal is a request for the device 140 to read the device information 1000, which is stored in the device information storage unit 970.

When the security module communication unit 930 of the device 140 receives the read request signal transmitted from the device communication unit 1230, the control unit 900 reads the device information 1000 (Step S2400). Further, the control unit 900 controls the security module communication unit 930 to transmit the device information 1000 to the second security module 120.

When the device communication unit 1230 of the second security module 120 receives the device information 1000 transmitted from the security module communication unit 930, the control unit 1200 controls the encryption processing unit 1260 to encrypt the following information: (i) a device registration request signal; (ii) the device information received; and (iii) the security module ID stored in the ID information storage unit 1240. The device registration request signal is a request to proceed with the device registration. Further, the control unit 1200 controls the communication unit 1250 to transmit the encrypted information to the server device 160 (Step S2410).

When the communication unit 1750 of the server device 160 receives the encrypted information transmitted from the communication unit 1250, the control unit 1700 controls the encryption processing unit 1710 to decrypt the encrypted information (Step S2420). Thus, the control unit 1700 acquires the device registration request signal, the device information, and the security module ID.

When acquiring such information, the control unit 1700 controls the user information management unit 1730 to check whether or not the security module ID and the model number included in the device information acquired through the decryption are included in associated state in the user information 1800 (Step S2430).

When it is determined that the security module ID and the model number are not included in associated state in the user information 1800 through the processing in Step S2430 (No in Step S2430), the control unit 1700 controls the user information management unit 1730 to check whether or not the security module ID is associated with a user name 1810 in the user information 1800 (Step S2440).

When it is determined that the security module ID is associated with a user name 1810 in the user information 1800 through the processing in Step S2440 (Yes in Step S2440), the control unit 1700 controls the user information management unit 1730 to update the user information 1800 (Step S2450). Here, the user information 1800 is updated such that the device type and the model number included in the device information acquired through the decryption are associated with the security module ID.

After updating the user information 1800, the control unit 1700 controls the function information management unit 1740 to check whether or not the model number included in the device information acquired through the decryption is included in the function information 1900 stored in the function information management unit 1740 (Step S2460).

When it is determined that the model number included in the device information is not included in the function information 1900 through the processing in Step S2460 (No in Step S2460), the control unit 1700 controls the function information management unit 1740 to update the function information 1900 (Step S2470). Here, the function information 1900 is updated to include, in associated state, the device type, the model number, the functions, the security levels, and the commands included in the device information acquired through the decryption.

Note that the device control system 100 terminates the device registration in each of the following cases: (i) when it is determined that the security module ID and the model number included in the device information acquired through the decryption are included in associated state in the user information 1800 through the processing in Step S2430 (No in Step S2430); (ii) when the processing in Step S2470 is completed; (iii) when it is determined that the model number included in the device information acquired through the decryption is included in the function information 1900 through the processing in Step S2460 (Yes in Step S2460); and (iv) when it is determined that the security module ID is not associated with a user name 1810 in the user information 1800 through the processing in Step S2440 (No in Step S2440).

<Device Operation>

The device operation performed by the device control system 100 is an operation of controlling a device 140 based on an operation that a user using the device control system 100 performs on an operation terminal 130.

Figure 25:
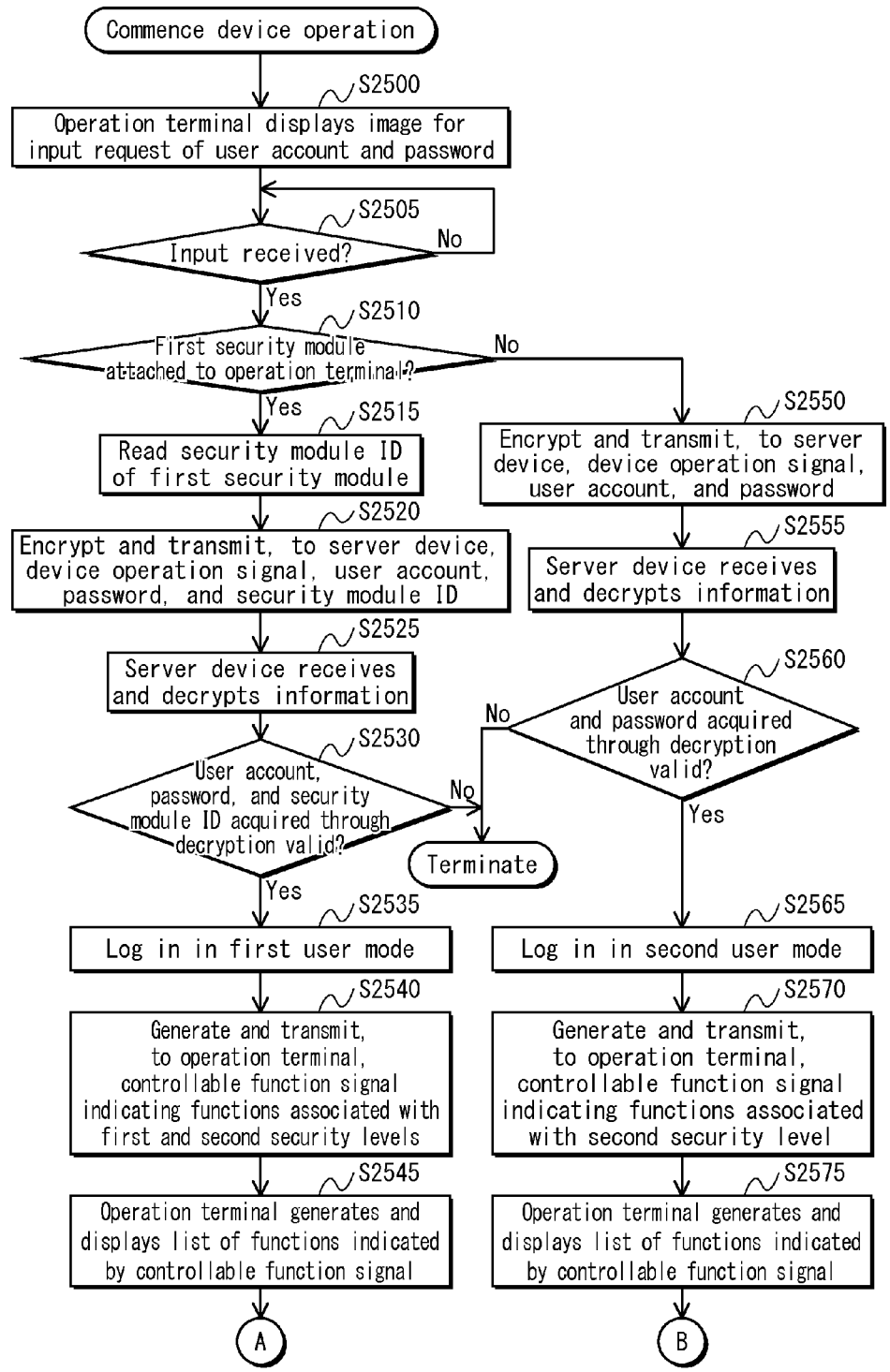
FIG. 25 is first part of flowchart illustrating device operation.
Figure 26:
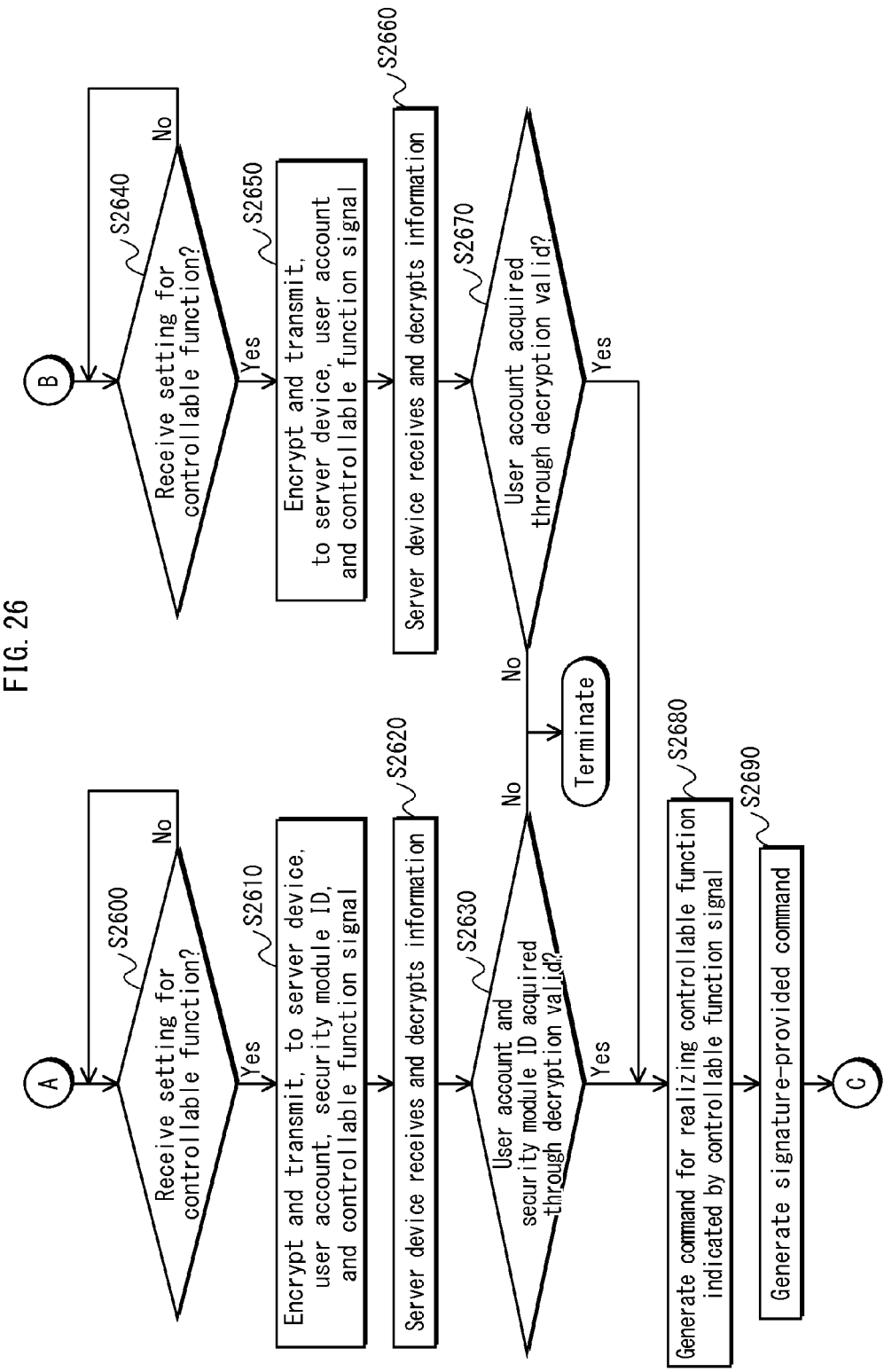
FIG. 26 is second part of flowchart illustrating device operation.
Figure 27:
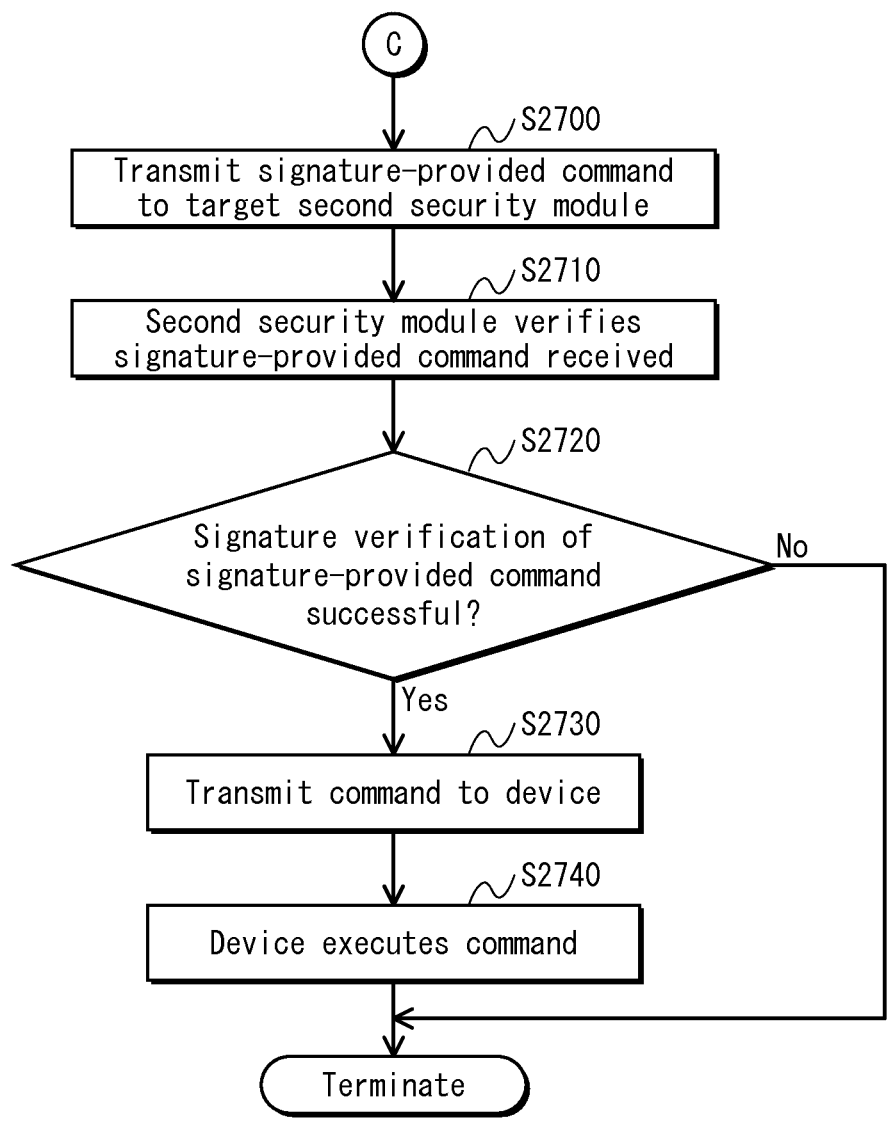
FIG. 27 is third part of flowchart illustrating device operation.

FIGS. 25, 26, and 27 each correspond to a part of a flowchart illustrating the device operation.

The device operation is commenced when the operation reception unit 320 receives a predetermined operation that the user performs on the operation terminal 130.

When the device operation is commenced, the control unit 300 controls the display unit 310 to cause the touch panel 240 to display a request for input of a user account and a password (Step S2500).

Figure 28:
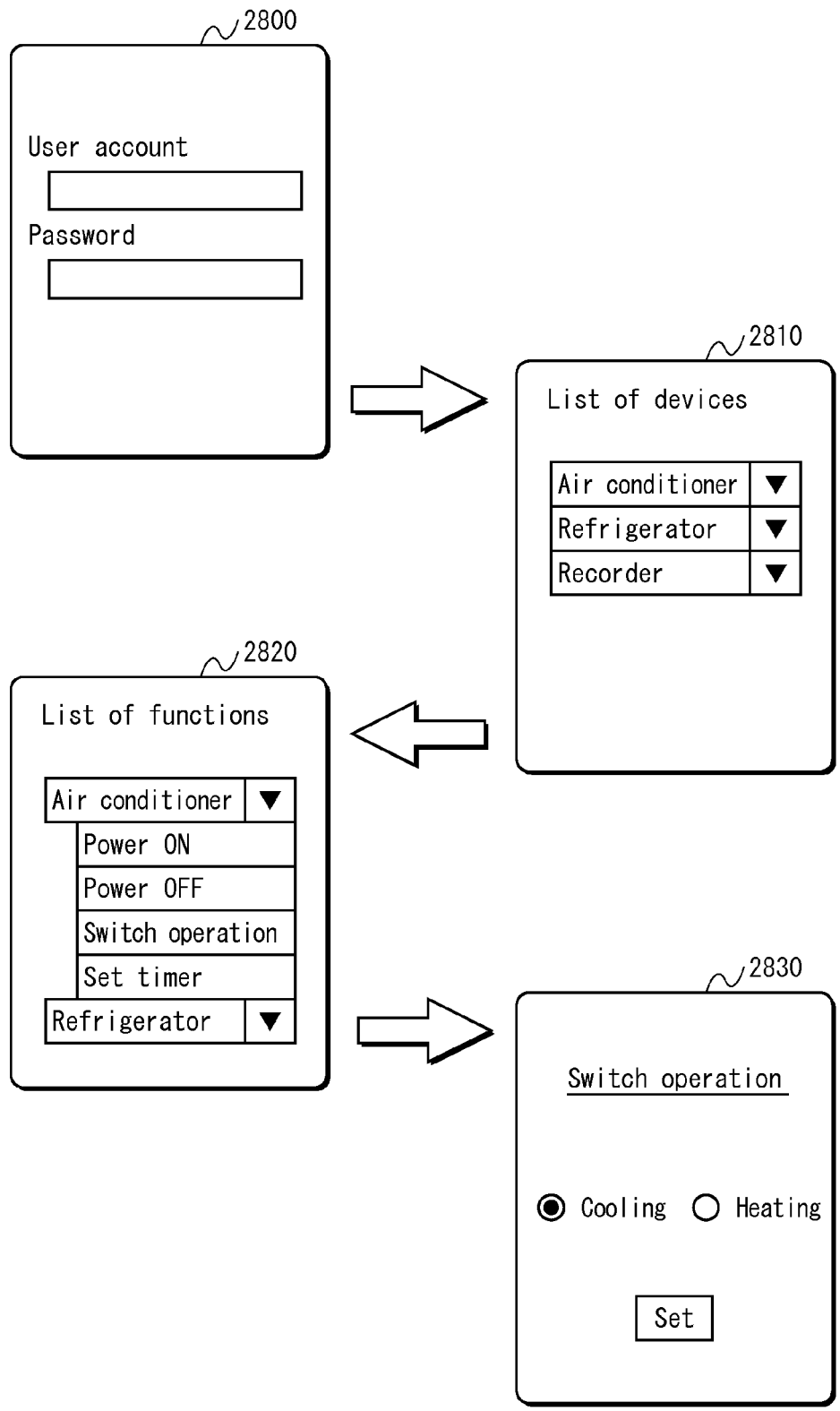
FIG. 28 is a schematic illustrating first example of image displayed on touch panel 240.

FIG. 28 is a schematic illustrating a first example of images displayed on the touch panel 240 in the device operation.

FIG. 28 illustrates an image 2800. The image 2800 is an input request displayed on the touch panel 240 through the processing in Step S2500. The touch panel 240 with this image displayed thereon receives input of a user account and a password from the user.

Description of the device operation continues, referring to FIG. 25 once again.

When the operation reception unit 320 receives input of a user account and a password from the user with the input request displayed on the touch panel 240 (i.e., when Yes in Step S2505 after No in Step S2505 for several times), the control unit 300 controls the security module communication unit 330 to attempt to perform wired communication with a first security module 110. Thus, the control unit 300 determines whether or not a first security module 110 is attached to the operation terminal 130 (Step S2510).

In Step S2510, when the wired communication with a first security module 110 is successful and thus it is determined that a first security module 110 is attached to the operation terminal 130 (Yes in Step S2510), the control unit 300 controls the security module communication unit 330 to transmit a read request signal to the first security module 110. Here, the read request signal is a request for the first security module 110 to read the security module ID thereof.

When the operation terminal communication unit 610 of the first security module 110 receives the read request signal transmitted from the security module communication unit 330, the control unit 600 reads the security module ID stored in the ID information storage unit 620 (Step S2515), and controls the operation terminal communication unit 610 to transmit the security module ID to the operation terminal 130.

When the security module communication unit 330 of the operation terminal 130 receives the security module ID transmitted from the operation terminal communication unit 610, the control unit 300 controls the encryption processing unit 360 to encrypt the following information: (i) a device operation signal; (ii) the user account and the password having been input; and (iii) the security module ID having been received. The device operation signal is a request to proceed with the device operation. Further, the control unit 300 controls the communication unit 350 to transmit the encrypted information to the server device 160 (Step S2520).

When the communication unit 1750 of the server device 160 receives the encrypted information transmitted from the communication unit 1250, the control unit 1700 controls the encryption processing unit 1710 to decrypt the encrypted information (Step S2525). Thus, the control unit 1700 acquires the device operation signal, the user account, the password, and the security module ID.

When acquiring such information, the control unit 1700 controls the user information management unit 1730 to check whether or not the user account, the password, and the security module ID are included in associated state in the user information 1800 (Step S2530). Thus, the control unit 1700 checks whether or not the set of user account, password, and security module ID acquired through the decryption is valid.

When it is determined that the set of user account, password, and security module ID acquired through the decryption is valid through the processing in Step S2530 (Yes in Step S2530), the control unit 1700 puts the user account in logged-in state in the first user mode (Step S2535).

Further, the control unit 1700 refers to the user information 1800 (illustrated in FIG. 18) and the function information 1900 (illustrated in FIG. 19) and specifies, for each model number 1860 associated with the user account acquired through the decryption, both functions 1930 associated with security levels 1940 indicating the first security level and functions 1930 associated with security levels 1940 indicating the second security level as controllable functions. Further, the control unit 1700 controls the communication unit 1750 to transmit a controllable function signal indicating the functions specified as controllable functions to the operation terminal 130.

When the communication unit 350 of the operation terminal 130 receives the controllable function signal transmitted from the communication unit 1750, the control unit 300 generates a function presentation image. The function presentation image is an image for presenting the controllable functions indicated by the received controllable function signal to the user, and also, for urging the user to make settings related to one controllable function. Further, the control unit 300 controls the display unit 310 to cause the touch panel 240 to display the generated function presentation image (Step S2545).

Each of images 2810, 2820, and 2830 illustrated in FIG. 28 is one example of the function presentation image displayed on the touch panel 240 through the processing in Step S2545. FIG. 28 illustrates an example of a case where a plurality of function presentation images are generated and displayed.

Image 2810 is a device list image indicating a list of devices whose functions are controllable. The touch panel 240, when displaying the device list image, receives from the user a specification operation for specifying one of the types of devices displayed in the device list image.

Image 2820 is a function list image indicating a list of controllable functions that the device specified through the specification operation performed with the touch panel 240 displaying the image 2810 has. The image 2820 illustrated in FIG. 28 is an example of a function list image displayed when an air conditioner is specified through the specification operation performed with the touch panel 240 displaying the image 2810. The touch panel 240, with the function list image displayed thereon, receives from the user a specification operation for specifying one of the controllable functions displayed in the function list image.

Image 2830 is a setting image indicating a list of settings that may be made for the controllable function specified through the specification operation performed with the touch panel 240 displaying the image 2820. The image 2830 illustrated in FIG. 28 is an example of a setting image displayed when "Switch operation" is specified through the specification operation performed with the touch panel 240 displaying the image 2820. The touch panel 240, when displaying the setting image, receives from the user a specification operation for specifying one setting displayed on the setting image. The example of the setting image illustrated in FIG. 28 includes two possible settings, one of which can be chosen. In specific, one is for switching to cooling, and the other is for switching to heating.

Description of the device operation continues, referring to FIG. 26 once again.

When the operation reception unit 320 receives a specification operation for specifying a setting for one controllable function from the user with the function presentation image displayed on the touch panel 240 (i.e., when Yes in Step S2600 after No in Step S2600 for several times), the control unit 300 controls the encryption processing unit 360 to encrypt the following information: (i) the user account having been input; (ii) the security module ID of the first security module 110 read through the processing in Step S2515; and (iii) a controllable function signal indicating the setting for the controllable function received from the user. Further, the control unit 300 controls the communication unit 350 to transmit the encrypted information to the server device 160 (Step S2610).

When the communication unit 1750 of the server device 160 receives the encrypted information transmitted from the communication unit 350, the control unit 1700 controls the encryption processing unit 1710 to decrypt the encrypted information (Step S2620). Thus, the control unit 1700 acquires the user account, the security module ID, and the controllable function signal.

When acquiring such information, the control unit 1700 controls the user information management unit 1730 to check whether or not the user account and the security module ID acquired through the decryption are included in associated state in the user information 1800 (Step S2630). Thus, the control unit 1700 checks whether or not the set of user account and security module ID acquired through the decryption is valid.

Meanwhile, when the wired communication with a first security module 110 is unsuccessful and thus it is determined that a first security module 110 is not attached to the operation terminal 130 in Step S2510 (No in Step S2510), the control unit 300 controls the encryption processing unit 360 to encrypt (i) the device operation signal and (ii) the user account and password having been input. Further, the control unit 300 controls the communication unit 350 to transmit the encrypted information to the server device 160 (Step S2550).

When the communication unit 1750 of the server device 160 receives the encrypted information transmitted from the communication unit 350, the control unit 1700 controls the encryption processing unit 1710 to decrypt the encrypted information (Step S2555). Thus, the control unit 1700 acquires the device operation signal, the user account, and the password.

When acquiring such information, the control unit 1700 controls the user information management unit 1730 to check whether or not the user account and the password acquired through the decryption are included in associated state in the user information 1800 (Step S2560). Thus, the control unit 1700 checks whether or not the set of user account and password acquired through the decryption is valid.

When it is determined that the set of user account and password acquired through the decryption is valid through the processing in Step S2560 (Yes in Step S2560), the control unit 1700 puts the user account in logged-in state in the second user mode (Step S2565).

Further, the control unit 1700 refers to the user information 1800 (illustrated in FIG. 18) and the function information 1900 (illustrated in FIG. 19) and specifies, for each model number 1860 associated with the user account acquired through the decryption, functions 1930 associated with security levels 1940 indicating the second security level as controllable functions. Further, the control unit 1700 controls the communication unit 1750 to transmit a controllable function signal indicating such controllable functions to the operation terminal 130 (Step S2570).

When the communication unit 350 of the operation terminal 130 receives the controllable function signal transmitted from the communication unit 1750, the control unit 300 generates the function presentation image. Further, the control unit 300 controls the display unit 310 to cause the touch panel 240 to display the generated function presentation image (Step S2575).

Figure 29:
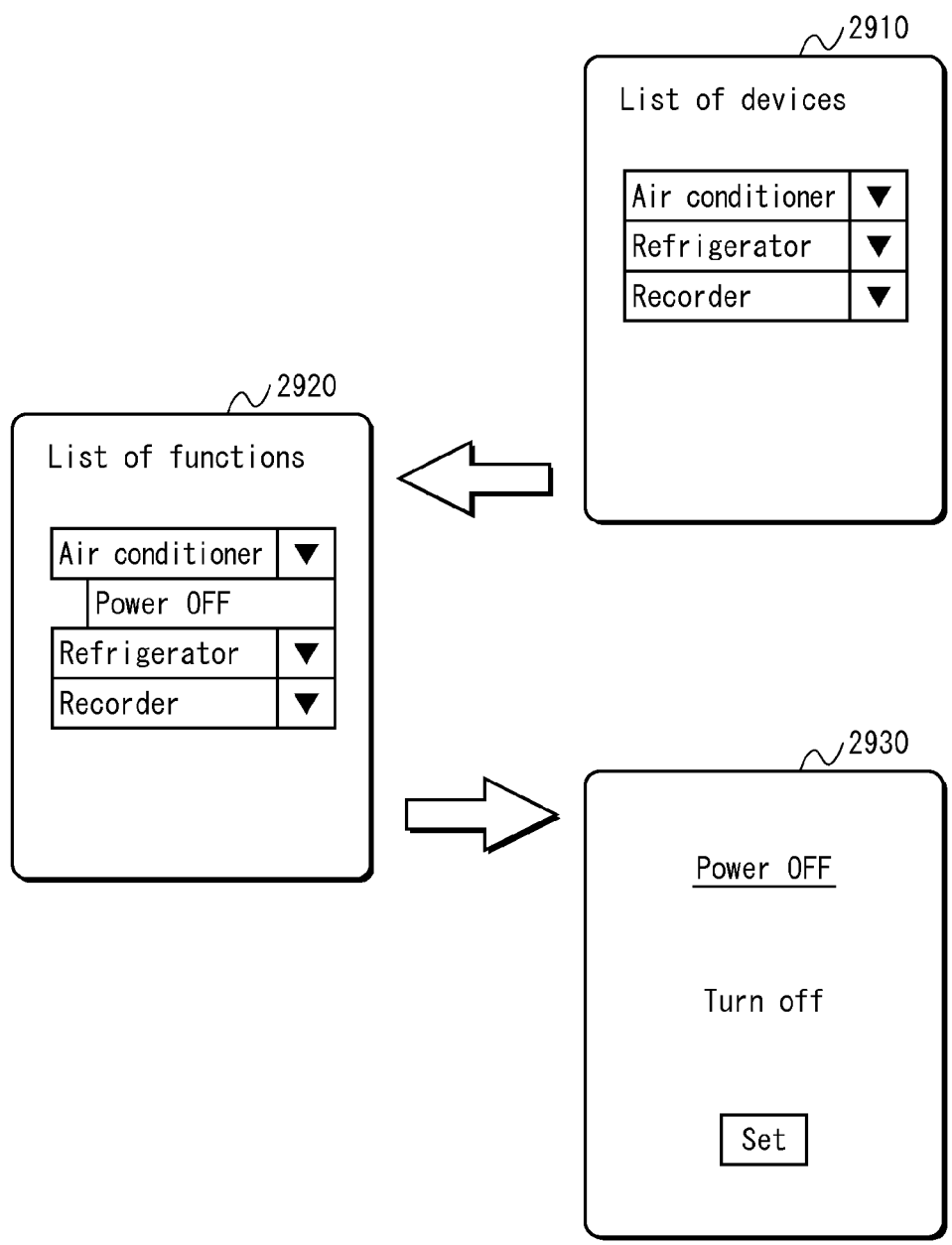
FIG. 29 is a schematic illustrating second example of image displayed on touch panel 240.

FIG. 29 is a schematic illustrating a second example of images displayed on the touch panel 240 in the device operation.

Each of images 2910, 2920, and 2930 illustrated in FIG. 29 is one example of the function presentation image displayed on the touch panel 240 through the processing in Step S2575. FIG. 29 illustrates an example of a case where a plurality of function presentation images are displayed.

Image 2910 is a device list image indicating a list of devices whose functions are controllable. The touch panel 240, when displaying the device list image, receives from the user a specification operation for specifying one of the device types displayed in the device list image.

Image 2920 is a function list image indicating a list of controllable functions that the device specified through the specification operation performed on the touch panel 240 with the image 2910 displayed thereon. The image 2920 illustrated in FIG. 29 is an example of a function list image displayed when an air conditioner is specified through the specification operation performed with the touch panel 240 displaying the image 2910 thereon. The touch panel 240, with the function list image displayed thereon, receives from the user a specification operation for specifying one of the controllable functions displayed in the function list image.

Image 2930 is a setting image indicating a list of settings that may be made for the controllable function specified through the specification operation performed with the touch panel 240 displaying the image 2920. The image 2930 illustrated in FIG. 29 is an example of a setting image displayed when "Power OFF" is specified through the specification operation performed with the touch panel 240 displaying the image 2920. The touch panel 240, when displaying the setting image, receives from the user a specification operation for specifying one setting displayed on the setting image. The example of the setting image illustrated in FIG. 29 only includes one possible setting of turning the air conditioner off.

Description of the device operation continues, referring to FIG. 26 once again.

When the operation reception unit 320 receives a specification operation for specifying a setting for one controllable function from the user with the function presentation image displayed on the touch panel 240 (i.e., when Yes in Step S2640 after No in Step S2640 for several times), the control unit 300 controls the encryption processing unit 360 to encrypt (i) the user account having been input and (ii) a controllable function signal indicating the setting for the controllable function received from the user. Further, the control unit 300 controls the communication unit 350 to transmit the encrypted information to the server device 160 (Step S2650).

When the communication unit 1750 of the server device 160 receives the encrypted information transmitted from the communication unit 350, the control unit 1700 controls the encryption processing unit 1710 to decrypt the encrypted information (Step S2660). Thus, the control unit 1700 acquires the user account and the controllable function signal.

When acquiring such information, the control unit 1700 controls the user information management unit 1730 to check whether or not the user account acquired through the decryption is included in the user information 1800 (Step S2670). Thus, the control unit 1700 checks whether or not the user account acquired through the decryption is valid.

In each of the following cases, the control unit 1700 controls the command issuing unit 1760 to refer to the function information 1900 and generate a command for realizing the setting for the controllable function indicated by the controllable function signal (Step S2680): (i) when it is determined that the set of user account and security module acquired through the decryption is valid through the processing in Step S2630 (Yes in Step S2630) and (ii) when it is determined that the user account acquired through the decryption is valid through the processing in Step S2670 (Yes in Step S2670). Further, the control unit 1700 controls the command issuing unit 1760 to provide an electronic signature indicating authenticity to the generated command, and thereby generates a signature-provided command (Step S2690).

Following the generation of the signature-provided command, the control unit 1700 refers to the user information 1800 and the function information 1900, and controls the communication unit 1750 to transmit the generated signature-provided command to a second security module 120 attached to a target device 140 that is to execute the signature-provided command (Step S2700, illustrated in FIG. 27).

When the communication unit 1250 of the second security module 120 receives the signature-provided command transmitted from the communication unit 1750, the control unit 1200 controls the command checking unit 1210 to perform signature verification with respect to the signature-provided command (Step S2710).

When the authenticity of the signature provided to the signature-provided command is confirmed through the signature verification (Yes in Step S2720), the control unit 1200 further controls the command checking unit 1210 to generate the command included in the signature-provided command. Further, the control unit 1200 controls the device communication unit 1230 to transmit the generated command to the target device 140 having the second security module 120 attached thereto.

When the security module communication unit 930 of the target device 140 receives the command transmitted from the device communication unit 1230, the control unit 900 transmits the received command to the execution unit 920 (Step S2730), and causes the execution unit 920 to execute a predetermined operation indicated by the command by using the device hardware 890 (Step S2740).

Note that the device control system 100 terminates the device operation in each of the following cases: (i) when it is determined that the set of user account, password, and security module ID acquired through the decryption is not valid through the processing in Step S2530 (No in Step S2530); (ii) when it is determined that the set of user account and password acquired through the decryption is not valid through the processing in Step S2560 (No in Step S2560); (iii) when it is determined that the set of user account and security module ID acquired through the decryption is not valid through the processing in Step S2630 (No in Step S2630); (iv) when it is determined that the user account acquired through the decryption is not valid through the processing in Step S2670 (No in Step S2670); (v) when the authenticity of the signature provided to the signature-provided command is not confirmed through the processing in Step S2720; and (vi) when the processing in Step S2740 is completed.

<Information Check>

The information check performed by the device control system 100 is an operation of first presenting user information registered to the server device 160 to a user using the device control system 100, and then updating the user information when receiving an operation for updating the user information from the user.

Figure 30:
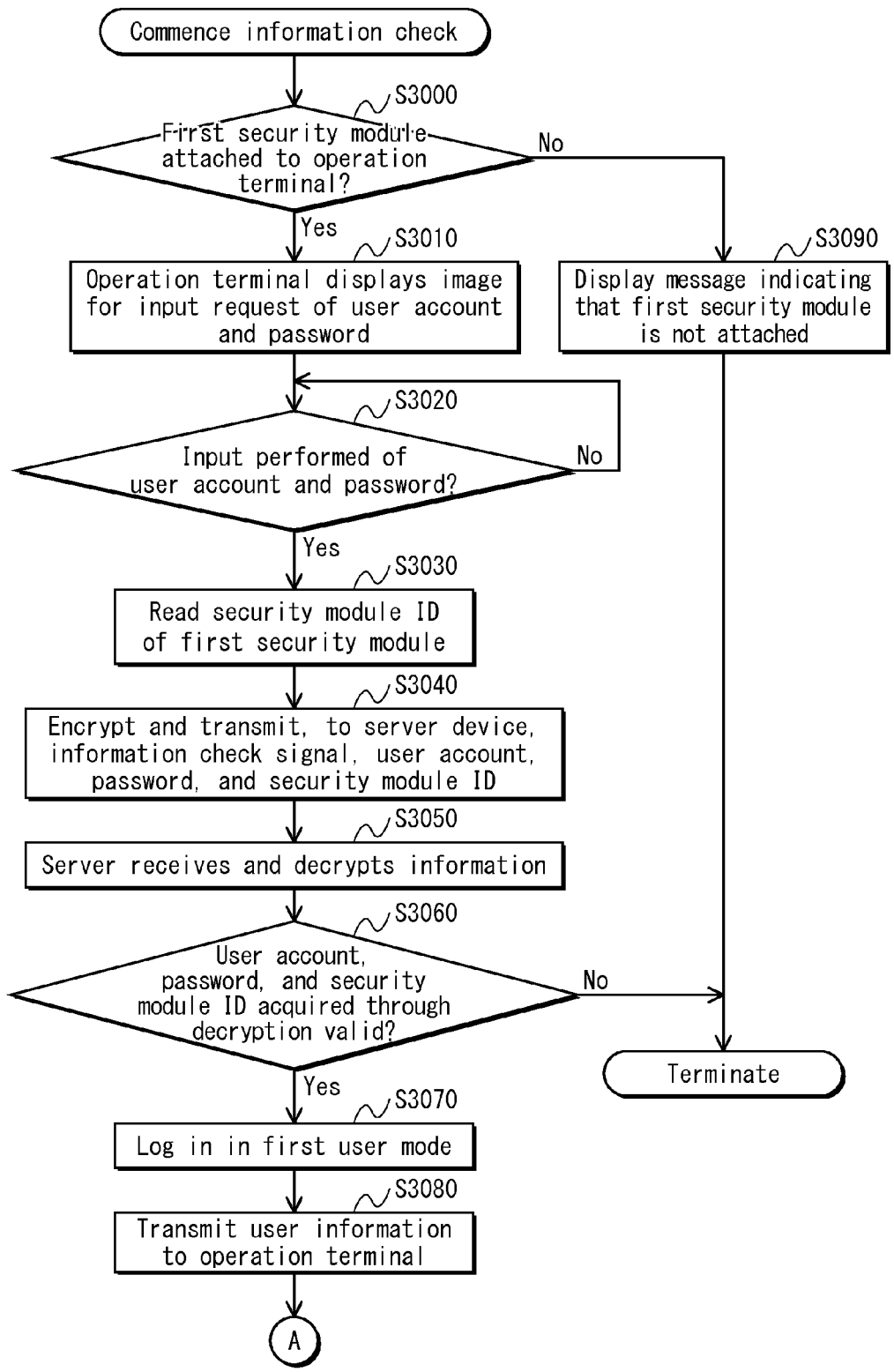
FIG. 30 is first part of flowchart illustrating information check.
Figure 31:
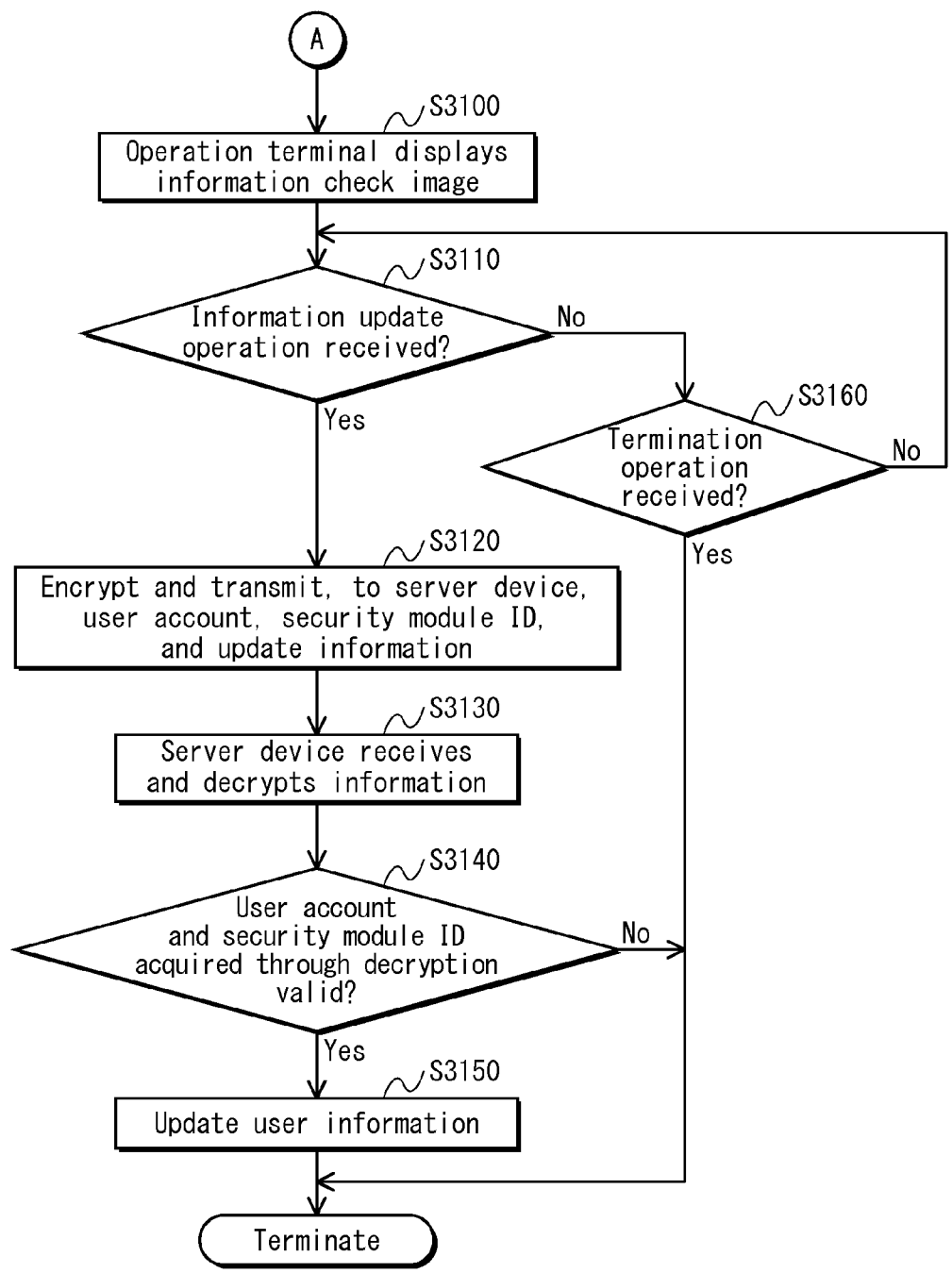
FIG. 31 is second part of flowchart illustrating information check.

FIGS. 30 and 31 each correspond to a part of a flowchart illustrating the information check.

The information check is commenced when the operation reception unit 320 receives a predetermined operation that the user performs on the operation terminal 130.

When the information check initial registration is commenced, the control unit 300 controls the security module communication unit 330 to attempt to perform wired communication with a first security module 110. Thus, the control unit 300 determines whether or not a first security module 110 is attached to the operation terminal 130 (Step S3000).

In Step S3000, when the wired communication with a first security module 110 is successful and thus it is determined that a first security module 110 is attached to the operation terminal 130 (Yes in Step S3000), the control unit 300 controls the display unit 310 to cause the touchpad 240 to display a request for input of a user account and a password (Step S3010).

When the operation reception unit 320 receives input of a user account and a password from the user with the input request displayed on the touch panel 240 (i.e., when Yes in Step S3020 after No in Step S3020 for several times), the control unit 300 controls the security module communication unit 330 to transmit a read request signal to the first security module 110. Here, the read request signal is a request for the first security module 110 to read the security module ID thereof.

When the operation terminal communication unit 610 of the first security module 110 receives the read request signal transmitted from the security module communication unit 330, the control unit 600 reads the security module ID stored in the ID information storage unit 620 (Step S3030), and controls the operation terminal communication unit 610 to transmit the security module ID to the operation terminal 130.

When the security module communication unit 330 of the operation terminal 130 receives the security module ID transmitted from the operation terminal communication unit 610, the control unit 300 controls the encryption processing unit 360 to encrypt the following information: (i) an information check signal; (ii) the user account and the password having been input; and (iii) the security module ID having been received. The information check signal is a request to proceed with the information check. Further, the control unit 300 controls the communication unit 350 to transmit the encrypted information to the server device 160 (Step S3040).

When the communication unit 1750 of the server device 160 receives the encrypted information transmitted from the communication unit 1250, the control unit 1700 controls the encryption processing unit 1710 to decrypt the encrypted information (Step S3050). Thus, the control unit 1700 acquires the information check signal, the user account, the password, and the security module ID.

When acquiring such information, the control unit 1700 controls the user information management unit 1730 to check whether or not the user account, the password, and the security module ID acquired through the decryption are included in associated state in the user information 1800

(Step S3060). Thus, the control unit 1700 checks whether or not the set of user account, password, and security module ID acquired through the decryption is valid.

When it is determined that the set of user account, password, and security module ID acquired through the decryption is valid through the processing in Step S3060 (Yes in Step S3060), the control unit 1700 puts the user account in logged-in state in the first user mode (Step S3070).

Further, the control unit 1700 controls the communication unit 1750 to transmit the user information 1800 to the operation terminal 130 (Step S3080).

When the communication unit 350 of the operation terminal 130 receives the user information transmitted from the communication unit 1750, the control unit 300 generates an information check image. The information check image is an image for presenting the received user information to the user, and in addition, for allowing the user to update part of the user information. Further, the control unit 300 controls the display unit 310 to cause the touch panel 240 to display the generated information check image (Step S3100, illustrated in FIG. 31).

Figure 32:
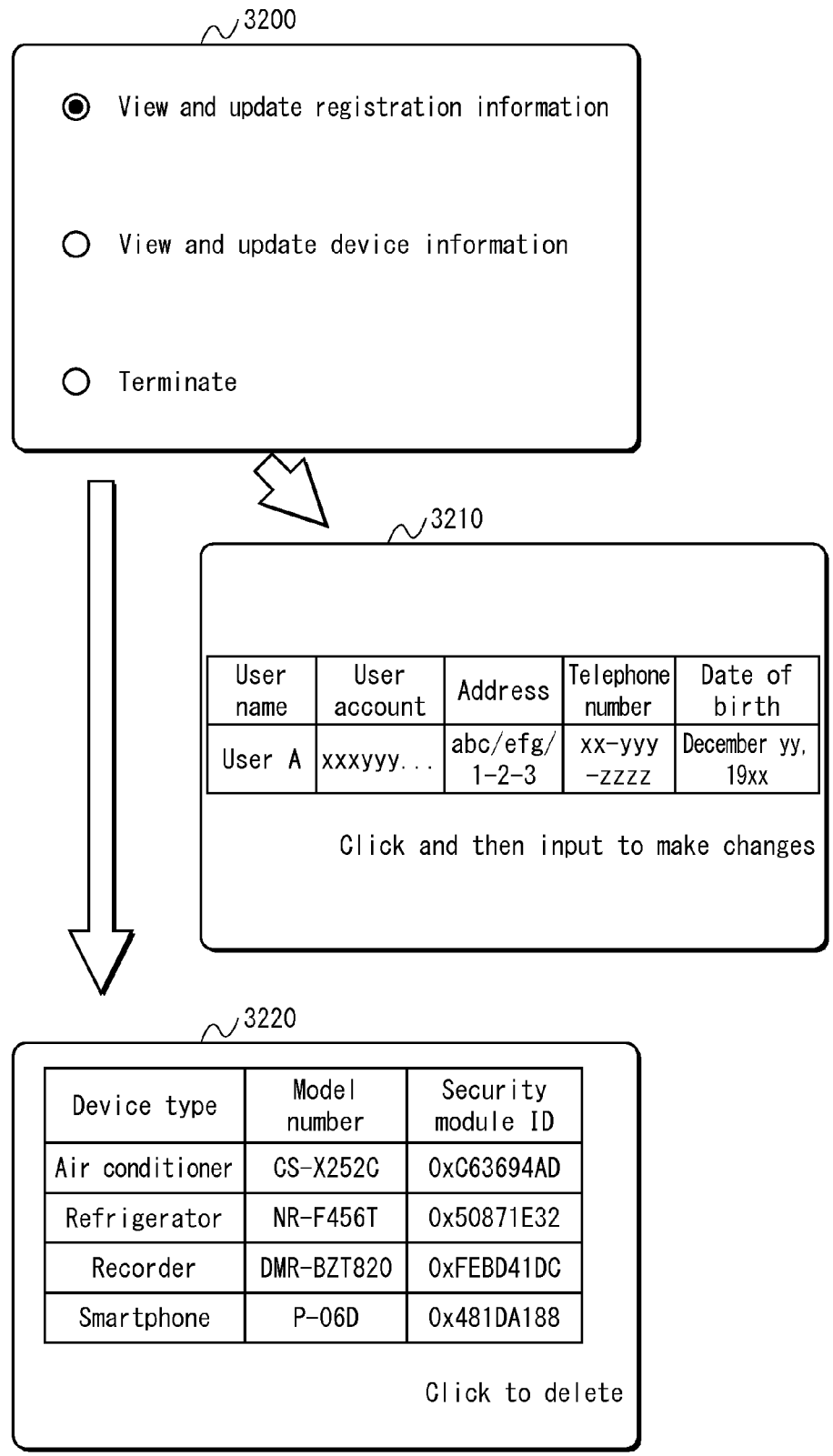
FIG. 32 is a schematic illustrating one example of information check image displayed on touch panel 240.

FIG. 32 is a schematic illustrating an example of the information check image displayed on the touch panel 240 in the information check.

Each of images 3200, 3210, and 3220 illustrated in FIG. 31 is one example of the information check image displayed on the touch panel 240 through the processing in Step S3100. FIG. 31 illustrates an example of a case where a plurality of function presentation images are displayed.

Image 3200 is an image allowing a user to choose one of: (i) "View and update registration information"; (ii) "View and update device information"; and (iii) "Terminate". When the user chooses "View and update registration information", the user name, the user account, and the registration information for the user is displayed, and the user is able to update such information. When the user chooses "View and update device information", device types, model numbers, and security module IDs associated with the user is displayed, and the user is able to update such information. When the user chooses "Terminate", the information check is terminated. The touch panel 240, with the image 3200 displayed thereon, receives a specification operation for specifying one among such choices from the user.

Image 3210 is an example of an image displayed when a specification operation for specifying (i) "View and update registration information" is received on the touch panel 240 with the image 3200 displayed thereon. In the example illustrated in FIG. 31, the image 3210 is an image displaying a user name 1810, a user account 1820, and registration information 1840 (an address, a telephone number, and a date of birth are displayed in the image 3210) that are associated with one another in the user information 1800 (illustrated in FIG. 18). The touch panel 240, with the image 3210 displayed thereon, receives from the user an information update operation for updating at least one of the user name, the user account, the address, the telephone number, and the date of birth that are being displayed.

Image 3220 is an example of an image displayed when a specification operation for specifying (ii) "View and update device information" is received on the touch panel 240 with the image 3200 displayed thereon. In the example illustrated in FIG. 31, the image 3220 is an image displaying associated sets of information each composed of a device type 1850, a model number 1860, and a security module ID 1870 included in the user information 1800 (illustrated in FIG. 18). The touch panel 240, with the image 3220 displayed thereon, receives from the user an information update operation for updating at least one device type, model number, or security module ID among those that are being displayed.

Description of the information check continues, referring to FIG. 31 once again.

When the operation reception unit 320 receives an information update operation from the user with the information check image displayed on the touch panel 240 before receiving a termination operation for terminating the information check (Yes in Step 3110 after No in Steps S3110 and S3160 for several times), the control unit 300 controls the encryption processing unit 360 to encrypt the following information: (i) update information indicating the contents of the information update operation having been received; (ii) the user account having been input; and (iii) the security module ID having been received. Further, the control unit 300 controls the communication unit 350 to transmit the encrypted information to the server device 160 (Step S3120).

When the communication unit 1750 of the server device 160 receives the encrypted information transmitted from the communication unit 350, the control unit 1700 controls the encryption processing unit 1710 to decrypt the encrypted information (Step S3130). Thus, the control unit 1700 acquires the update information, the user account, and the security module ID.

When acquiring such information, the control unit 1700 controls the user information management unit 1730 to check whether or not the user account and the security module ID acquired through the decryption are included in associated state in the user information 1800 (Step S3140). Thus, the control unit 1700 checks whether or not the set of user account and security module ID acquired through the decryption is valid.

When it is determined that the set of user account and security module ID acquired through the decryption is valid through the processing in Step S3140 (Yes in Step S3140), the control unit 1700 controls the user information management unit 1730 to update the user information 1800 based on the contents of the received information update operation indicated by the update information (Step S3150).

Note that when the wired communication with a first security module 110 is unsuccessful and thus it is determined that a first security module 110 is not attached to the operation terminal 130 in Step S3000 (No in Step S3000), the control unit 300 controls the display unit 310 to cause the touch panel 240 to display an indication that a first security module 110 is not attached to the operation terminal 130 (Step S3090).

Further, note that the device control system 100 terminates the information check in each of the following cases: (i) when the processing in Step S3090 is completed; (ii) when it is determined that the set of user account, password, and security module ID acquired through the decryption is not valid through the processing in Step S3060 (No in Step S3060); (iii) when the termination operation is received through the processing in Step S3160; and (iv) when the processing in Step S3110 is completed.

Embodiment 2

<Overview>

The following describes one embodiment of the device control method pertaining to the present invention. In specific, the following describes a first modified device control system, which is a modification of the device control system 100 in embodiment 1.

The first modified device control system has a hardware structure that is a modification of the hardware structure of the device control system 100, yielded by replacing the operation terminal 130 with an operation terminal 3330. The operation terminal 3330 is a modification of the operation terminal 130, yielded by modifying, in part, the software executed by the operation terminal 130 and the data stored by the operation terminal 130. In addition, the first modified device control system includes a server device 3560 in place of the server device 160. While the server device 3560 has the same hardware structure as the server device 160, the server device 3560 is a modification of the server device 160, yielded by modifying, in part, the software executed by the server device 160 and the data stored by the server device 160.

In the device control system 100, the operation terminal 130 includes the connector 260, and the first security module 110 is detachably attached to the operation terminal 130. Further, in the device control system 100, the operation terminal 130, when having the first security module 110 attached thereto, is capable of causing devices to execute both controls that are associated with the first security level and controls that are associated with the second security level. Meanwhile, in the device control system 100, the operation terminal 130, when not having the first security module 130 attached thereto, is capable of causing devices to execute only the controls that are associated with the second security level.

In contrast, in the first modified device control system, the operation terminal 3330 includes a fingerprint recognition device for recognizing a fingerprint of a predetermined person registered in advance, in place of a connector for attachment of the first security module 110. Further, in the first modified device control system, the operation terminal 3330, when fingerprint recognition of the predetermined person is successful, is capable of causing devices to execute both controls that are associated with the first security level and controls that are associated with the second security level. Meanwhile, in the first modified device control system, the operation terminal 3330, when fingerprint recognition of the predetermined person is unsuccessful, is capable of causing devices to execute only the controls that are associated with the second security level.

The following describes the structure of the first modified device control system, while referring to the accompanying drawings. Note that the following description focuses on the difference between the first modified device control system and the device control system 100.

<Structure>

Figure 33:
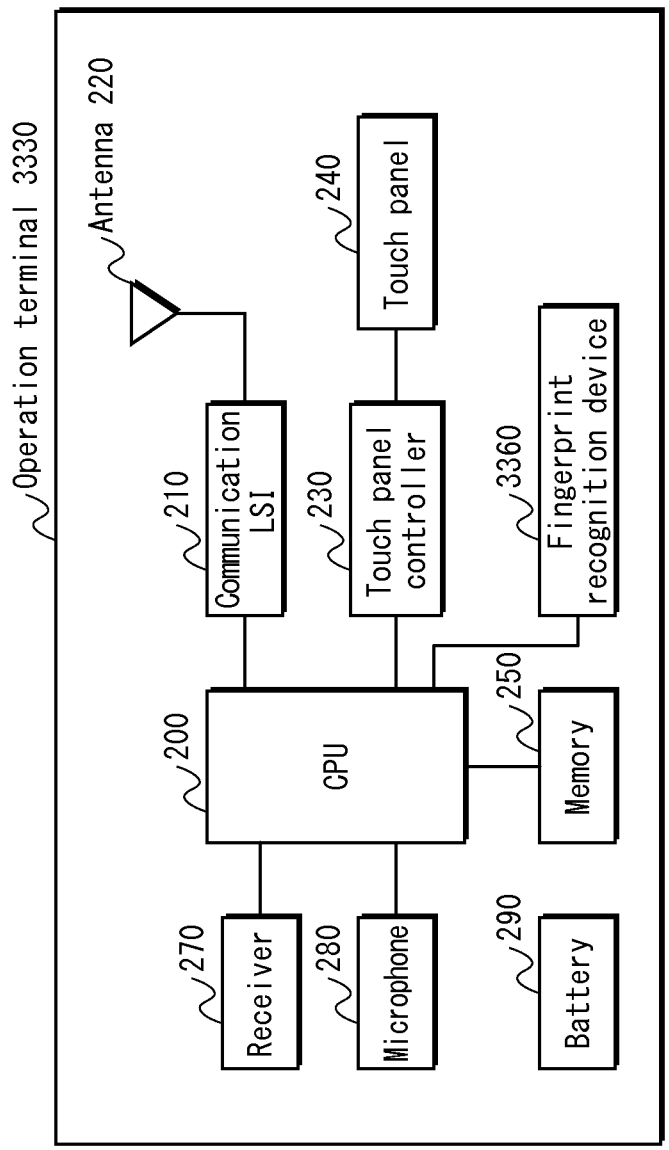
FIG. 33 is a circuit diagram of operation terminal 3330.

FIG. 33 is a circuit diagram of the operation terminal 3330.

As illustrated in FIG. 33, the operation terminal 3330 does not include the connector 260, but instead includes a fingerprint recognition device 3360.

The fingerprint recognition device 3360 is connected to the CPU 200, and is controlled by the CPU 200. The fingerprint recognition device 3360 has a function of performing fingerprint recognition with respect to a user using the operation terminal 3330.

The fingerprint recognition device 3360, when performing the fingerprint recognition, reads information pertaining to a fingerprint from a right hand index finger of the user using the fingerprint recognition device 3360, compares the information so read with fingerprint recognition information, and determines whether or not the user is a valid user. The fingerprint recognition information is stored in advance to the fingerprint recognition device 3360 and pertains to a fingerprint of a right hand index finger of the valid user.

Here, the CPU 200 has the same hardware structure as in embodiment 1 but the programs executed by the CPU 200 differ, in part, from those in embodiment 1.

In specific, the CPU 200 executes programs stored in the memory 250 to control the communication LSI 210, the touch panel controller 230, and the receiver 270, thereby realizing the three functions of the operation terminal 3330 described in the following, in addition to the smartphone control function described in embodiment 1.

Modified initial registration function A: The CPU 200 controls the operation terminal 3330 to provide the operation terminal 3330 with a function of realizing a modified initial registration performed by the first modified device control system, through cooperation with other structural elements included in the first modified device control system. The modified initial registration is described in detail later in the present disclosure. In specific, detailed description of the modified initial registration is provided in the <Modified Initial Registration> section of the present disclosure, with reference to a flowchart.

Modified second security module issue request function A: The CPU 200 controls the operation terminal 3330 to provide the operation terminal 3330 with a function of realizing a modified second security module issue request performed by the first modified device control system, through cooperation with other structural elements included in the first modified device control system. The modified second security module issue request is described in detail later in the present disclosure. In specific, detailed description of the modified second security module issue request is provided in the <Modified Second Security Module Issue Request> section of the present disclosure, with reference to a flowchart.

Modified device operation function A: The CPU 200 controls the operation terminal 3330 to provide the operation terminal 3330 with a function of realizing a modified device operation performed by the first modified device control system, through cooperation with other structural elements included in the first modified device control system. The modified device operation is described in detail later in the present disclosure. In specific, detailed description of the modified device operation is provided in the <Modified Device Operation> section of the present disclosure, with reference to a flowchart.

This concludes description of the circuit structure of the operation terminal 3330. The following describes the functional structure of the operation terminal 3330.

Figure 34:
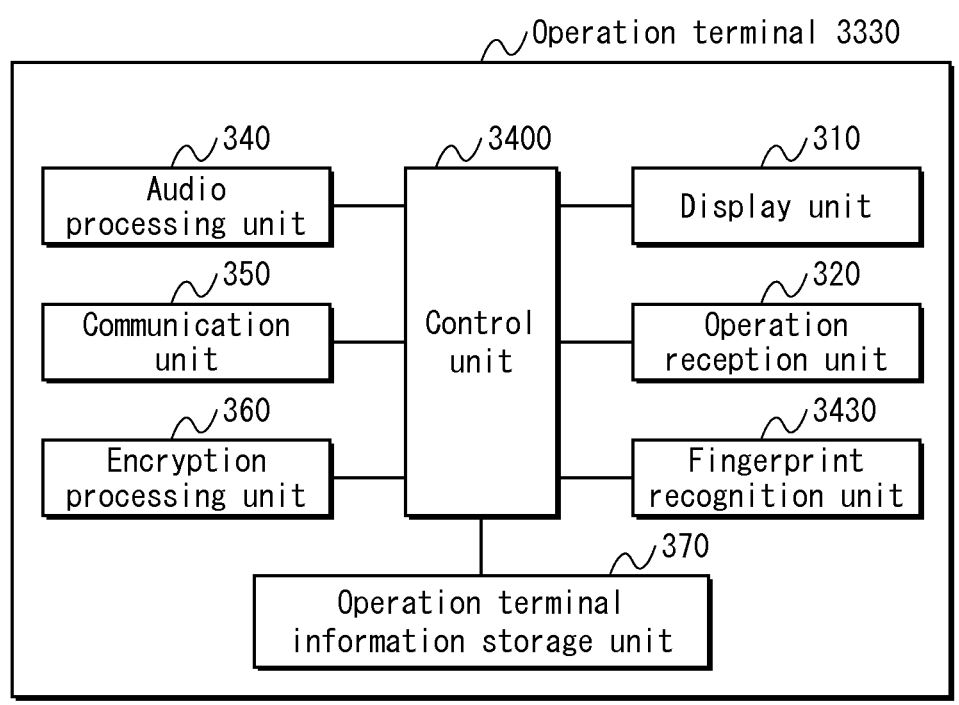
FIG. 34 is a block diagram illustrating functional structure of operation terminal 3330.

FIG. 34 is a block diagram illustrating the functional structure of the operation terminal 3330.

As illustrated in FIG. 34, the operation terminal 3330 does not include the security module communication unit 330, but instead includes a fingerprint recognition unit 3430. Further, the operation terminal 3330 includes a control unit 3400 in place of the control unit 300.

The fingerprint recognition unit 3430 is implemented by using the fingerprint recognition device 3360 and by the CPU 200 executing programs. The fingerprint recognition unit 3430 is controlled by the control unit 3400, and has a fingerprint recognition function of performing the fingerprint recognition by using the fingerprint recognition information stored therein.

The control unit 3400 is implemented by the CPU 200 executing programs. The control unit 3400 controls the display unit 310, the operation reception unit 320, the fingerprint recognition unit 3430, the audio processing unit 340, the communication unit 350, the encryption processing unit 360, and the operation terminal information storage unit 370, thereby realizing the four functions of the operation terminal 3330 described above (i.e., the smartphone control function, the modified initial registration function A, the modified second security module issue request function A, and the modified device operation function A).

Here, the CPU 1600 of the server device 3560 has the same hardware structure as in embodiment 1 but the programs executed by the CPU 1600 differ, in part, from that in embodiment 1.

The CPU 1600 executes programs stored in the memory 1650 and controls the network connection circuit 1660 and the hard disk drive 1610, thereby realizing the three functions of the server device 3560 described in the following.

Modified initial registration function E: The CPU 1600 controls the server device 3560 to provide the server device 3560 with a function of realizing the modified initial registration performed by the first modified device control system, through cooperation with other structural elements included in the first modified device control system.

Modified second security module issue request function E: The CPU 1500 controls the server device 3560 to provide the server device 3560 with a function of realizing the modified second security module issue request performed by the first modified device control system, through cooperation with other structural elements included in the first modified device control system.

Modified device operation function E: The CPU 1600 controls the server device 3560 to provide the server device 3560 with a function of realizing the modified device operation performed by the first modified device control system, through cooperation with other structural elements included in the first modified device control system.

Figure 35:
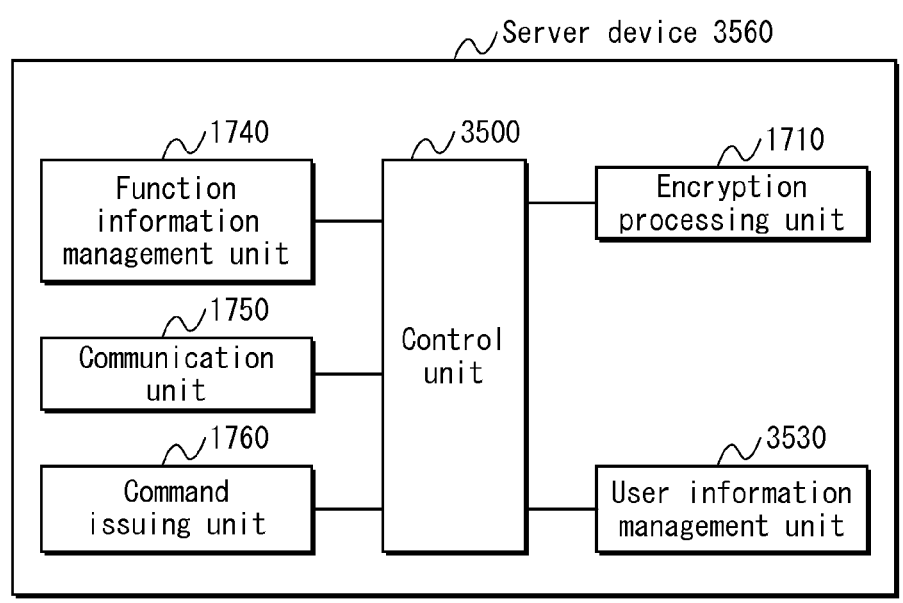
FIG. 35 is a block diagram illustrating functional structure of server device 3560.

FIG. 35 is a block diagram illustrating the functional structure of the server device 3560.

As illustrated in FIG. 35, the server device 3560 includes a control unit 3500 in place of the control unit 1700, and includes a user information management unit 3530 in place of the user information management unit 1730.

The user information management unit 3530 is implemented by using a part of a storage area of the hard disk drive 1610 and by the CPU 1600 executing programs. The user information management unit 3530 has a function of storing user information 3600, and a function of updating the user information 3600 stored therein.

FIG. 36 illustrates one example of the data structure of the user information 3600.

As illustrated in FIG. 36, the user information 3600 includes one or more user names 1810, one or more user accounts 1820, one or more passwords 1830, one or more pieces of registration information 1840, one or more device types 1850, and one or more model numbers 1860, which are also included in the user information 1800 (illustrated in FIG. 18). The user names 1810, the user accounts 1820, the passwords 1830, the pieces of registration information 1840, the device types 1850, and the model numbers 1860 are associated with one another as illustrated in FIG. 36. Thus, the user information 3600 is a modification of the user information 1800, yielded by removing the one or more security module IDs 1870 from the user information 1800.

The control unit 3500 is implemented by the CPU 1600 executing programs. The control unit 3500 controls the encryption processing unit 1710, the user information management unit 3530, the function information management unit 1740, the communication unit 1750, and the command issuing unit 1760, thereby realizing the three functions of the server device 3560 described above (i.e., the modified initial registration function E, the modified second security module issue request function E, and the modified device operation function E).

This concludes the description of the structure of the first modified device control system. The following describes operations performed by the first modified device control system, while referring to the accompanying drawings. Note that the following description focuses on the difference between the first modified device control system and the device control system 100.

<Operations>

The first modified device control system is characterized for performing: the modified initial registration; the modified second security module issue request; and the modified device operation.

The following describes such operations, one by one.

<Modified Initial Registration>

The modified initial registration is a modification of the initial registration in embodiment 1. The modified initial registration performed by the first modified device control system is an operation of registering, to the server device 3560, information related to a user who newly uses the first modified device control system.

Figure 37:
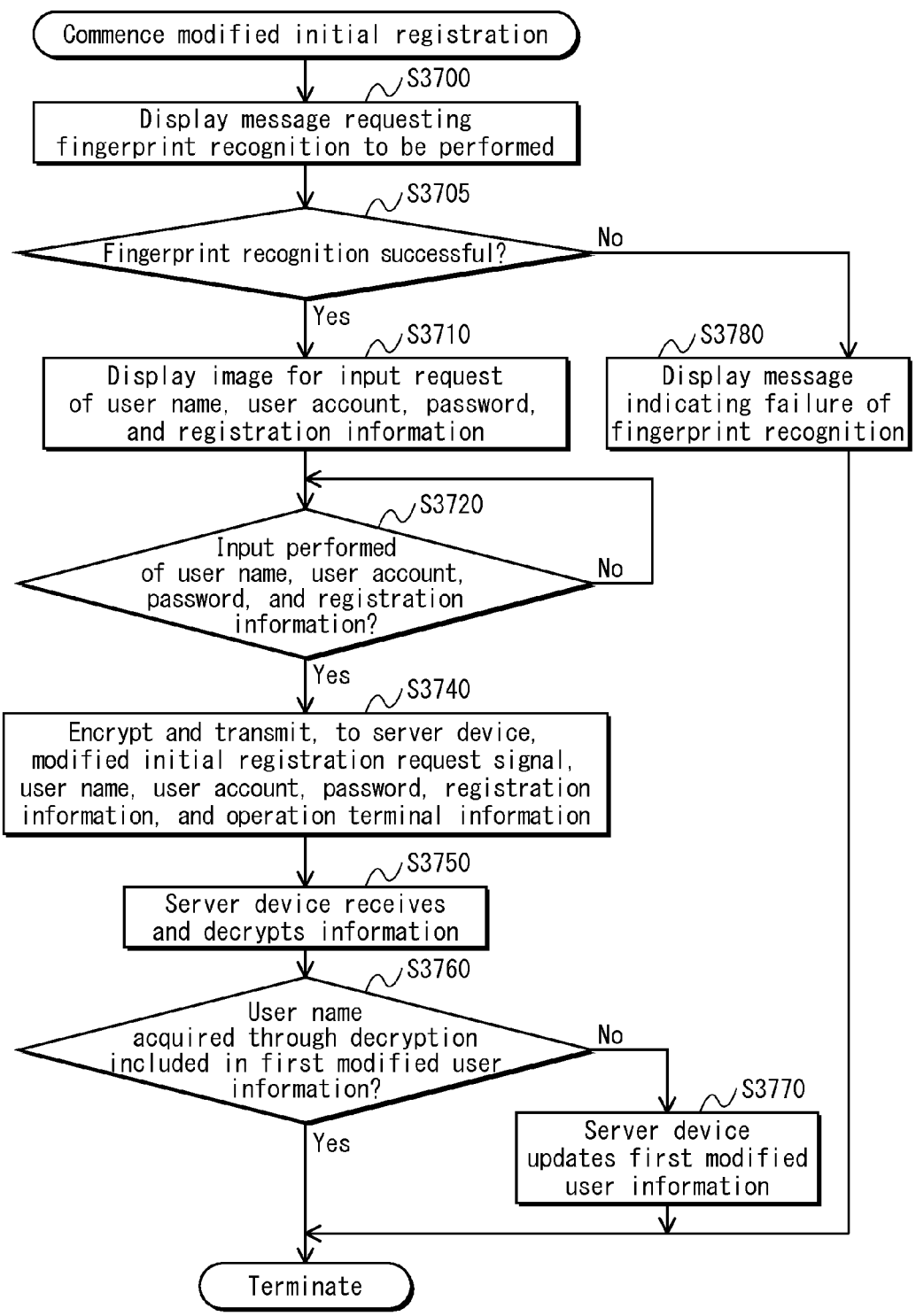
FIG. 37 is a flowchart illustrating modified initial registration.

FIG. 37 is a flowchart illustrating the modified initial registration.

The modified initial registration is commenced when the operation reception unit 320 receives a predetermined operation that the user performs on the operation terminal 3330.

When the modified initial registration is commenced, the control unit 3400 controls the display unit 310 to cause the touch panel 240 to display a message requesting that the user perform fingerprint recognition on the touch panel 240 (Step S3700).

Following the display of such message, the control unit 3400 controls the fingerprint recognition unit 3430 to perform the fingerprint recognition with respect to the user using the operation terminal 3330 (Step S3705).

When the fingerprint recognition unit 3430 determines that the user is a valid user through the processing in Step S3705 and thus, the fingerprint recognition is successful (Yes in Step S3705), the first modified device control system executes the processing in and following Step S3710.

Here, the processing in Steps S3710 through S3720 is similar to the processing in Steps S2010 through S2020 in the initial registration in embodiment 1 (illustrated in FIG. 20). Thus, description of such processing is not provided in the following for already being provided above.

When the operation reception unit 320 receives input of a user name, a user account, a password, and registration information through the processing in Step S3720 (i.e., when Yes in Step S3720 after No in Step S3720 for several times), the control unit 3400 controls the encryption processing unit 360 to encrypt the following information: (i) a modified initial registration request signal; (ii) the user name, the user account, the password, and the registration information having been input; and (iii) the operation terminal information 400. The modified initial registration request signal is a request to proceed with the initial registration. Further, the control unit 3400 controls the communication unit 350 to transmit the encrypted information to the server device 3560 (Step S3740).

When the communication unit 1750 of the server device 3560 receives the encrypted information transmitted from the communication unit 350, the control unit 3500 controls the encryption processing unit 1710 to decrypt the encrypted information (Step S3750). Thus, the control unit 3500 acquires the modified initial registration request signal, the user name, the user account, the password, the registration information, and the operation terminal information.

When acquiring such information, the control unit 3500 controls the user information management unit 3530 to check whether or not the user name acquired through the decryption is included in the user information 3600 (Step S3760).

When it is determined that the user name is not included in the user information 3600 through the processing in Step S3760 (No in Step S3760), the control unit 3500 controls the user information management unit 3530 to update the user information 3600 (Step S3770). Here, the user information 3600 is updated such that the user name, the user account, the password, the registration information, and the operation terminal information (including the terminal type information 410 and the model number information 420, as illustrated in FIG. 4) are associated with one another.

When the fingerprint recognition unit 3430 determines that the user is not a valid user through the processing in Step S3705 and thus, the fingerprint recognition is unsuccessful (No in Step S3705), the control unit 3400 controls the display unit 310 to cause the touch panel 240 to display a message indicating that fingerprint recognition has failed (Step S3780).

Note that the first modified device control system terminates the modified initial registration in each of the following cases: (i) when it is determined that the user name is included in the user information 3600 through the processing in Step S3760 (Yes in Step S3760); (ii) when the processing in Step S3770 is completed; and (iii) when the processing in Step S3780 is completed.

<Modified Second Security Module Issue Request>

The modified second security module issue request is a modification of the second security module issue request in embodiment 1. The modified second security module issue request performed by the first modified device control system is an operation of receiving, from a user using the first modified device control system, a request to issue a new second security module.

Figure 38:
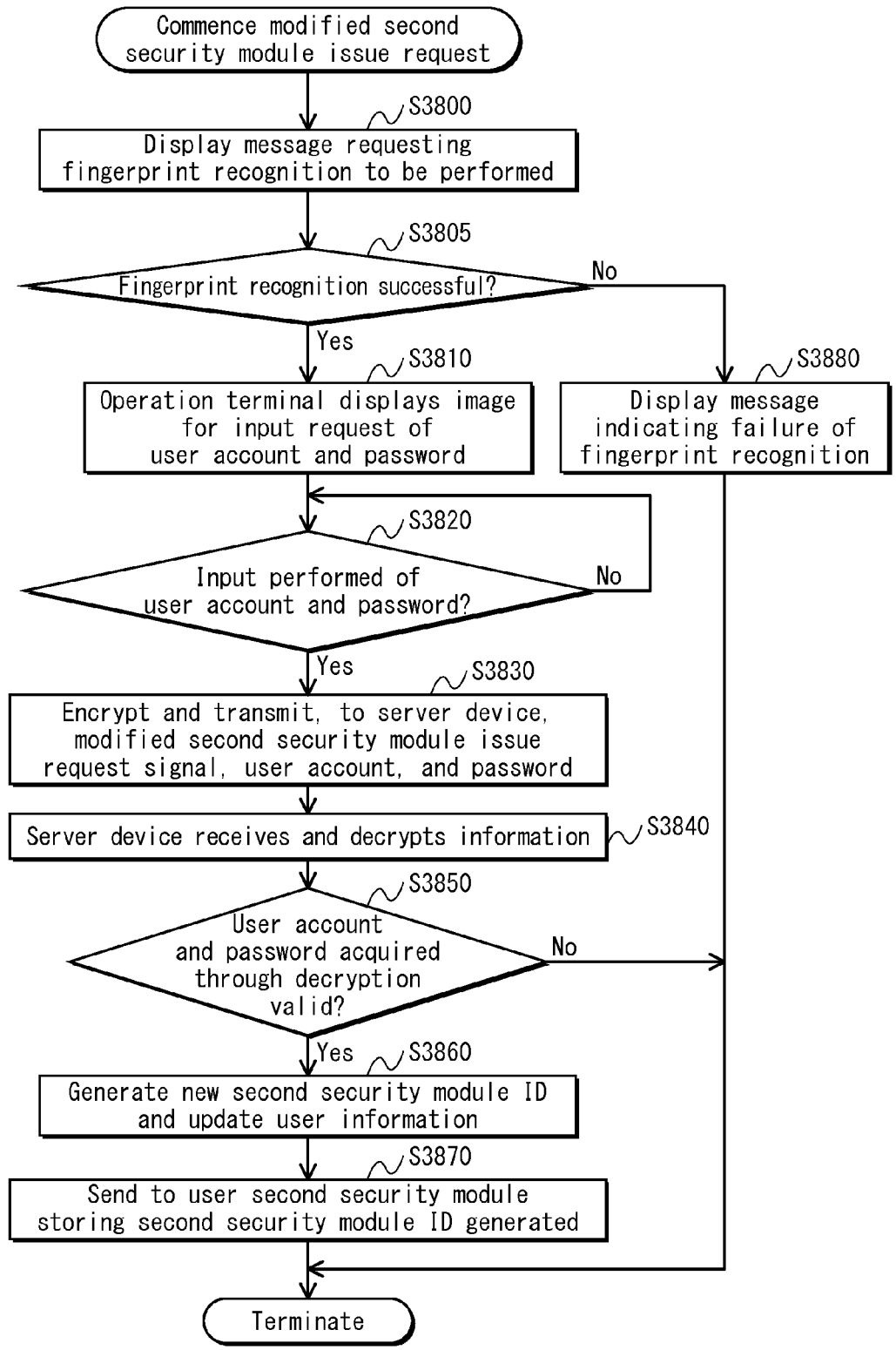
FIG. 38 is a flowchart illustrating modified second security module issue request.

FIG. 38 is a flowchart illustrating the modified second security module issue request.

The second security module issue request is commenced when the operation reception unit 320 receives a predetermined operation that the user performs on the operation terminal 3330.

When the modified second security module issue request is commenced, the control unit 3400 controls the display unit 310 to cause the touch panel 240 to display a message requesting that the user perform fingerprint recognition on the touch panel 240 (Step S3800).

Following the display of such message, the control unit 3400 controls the fingerprint recognition unit 3430 to perform the fingerprint recognition with respect to the user using the operation terminal 3330 (Step S3805).

When the fingerprint recognition unit 3430 determines that the user is a valid user through the processing in Step S3705 and thus, the fingerprint recognition is successful (Yes in Step S3705), the control unit 3400 controls the display unit 310 to cause the touch panel 240 to display a request for input of a user account and a password (Step S3810).

When the operation reception unit 320 receives input of a user account and a password from the user with the input request displayed on the touch panel 240 (i.e., when Yes in Step S3820 after No in Step S3820 for several times), the control unit 3400 controls the encryption processing unit 360 to encrypt (i) a modified second security module issue request signal and (ii) the user account and password having been input. The modified second security module issue request signal is a request to proceed with the modified second security module issue request. Further, the control unit 3400 controls the communication unit 350 to transmit the encrypted information to the server device 3560 (Step S3830).

When the communication unit 1750 of the server device 3560 receives the encrypted information transmitted from the communication unit 350, the control unit 3500 controls the encryption processing unit 1710 to decrypt the encrypted information (Step S3840). Thus, the control unit 3500 acquires the modified second security module issue request signal, the user account, and the password.

When acquiring such information, the control unit 3500 controls the user information management unit 3530 to check whether or not the user account and the password are included in associated state in the user information 3600 (Step S3850). Thus, the control unit 3500 checks whether or not the set of user account and password acquired through the decryption is valid.

When it is determined that the set of user account and password acquired through the decryption is valid through the processing in Step S3850 (Yes in Step S3850), the control unit 3500 generates a new security module ID. Further, the control unit 3500 controls the user information management unit 3530 to update the user information 3600 (Step S3860). Here, the user information 3600 is updated such that the new security module ID is associated with a user name 1810 associated with the security module ID acquired through the decryption.

When the user information 3600 is updated through the processing in Step S3860, the administrator of the first modified device control system sends, for example by post, a second security module 120 storing the newly generated security module ID to the user (Step S3870). Here, as already described above, the new security module ID is included in the updated user information 3600 as a security module ID 1870 that is associated with a user name 1810 indicating the user. Further, the sending is performed based on the registration information 1840 associated with the newly generated security module ID in the updated user information 3600.

When the fingerprint recognition unit 3430 determines that the user is not a valid user through the processing in Step S3805 and thus, the fingerprint recognition is unsuccessful (No in Step S3805), the control unit 3400 controls the display unit 310 to cause the touch panel 240 to display a message indicating that fingerprint recognition has failed (Step S3880).

Note that the first modified device control system terminates the modified second security module issue request in each of the following cases: (i) when the processing in Step S3880 is completed; (ii) when it is determined that the set of user account and password acquired through the decryption is not valid through the processing in Step S3850 (No in Step S3850); and (iii) when the processing in Step S3870 is completed.

<Modified Device Operation>

The modified device operation is a modification of the device operation in embodiment 1. The modified device operation performed by the first modified device control system is an operation of controlling a device 140 based on an operation that a user using the first modified device control system performs on an operation terminal 3330.

Figure 39:
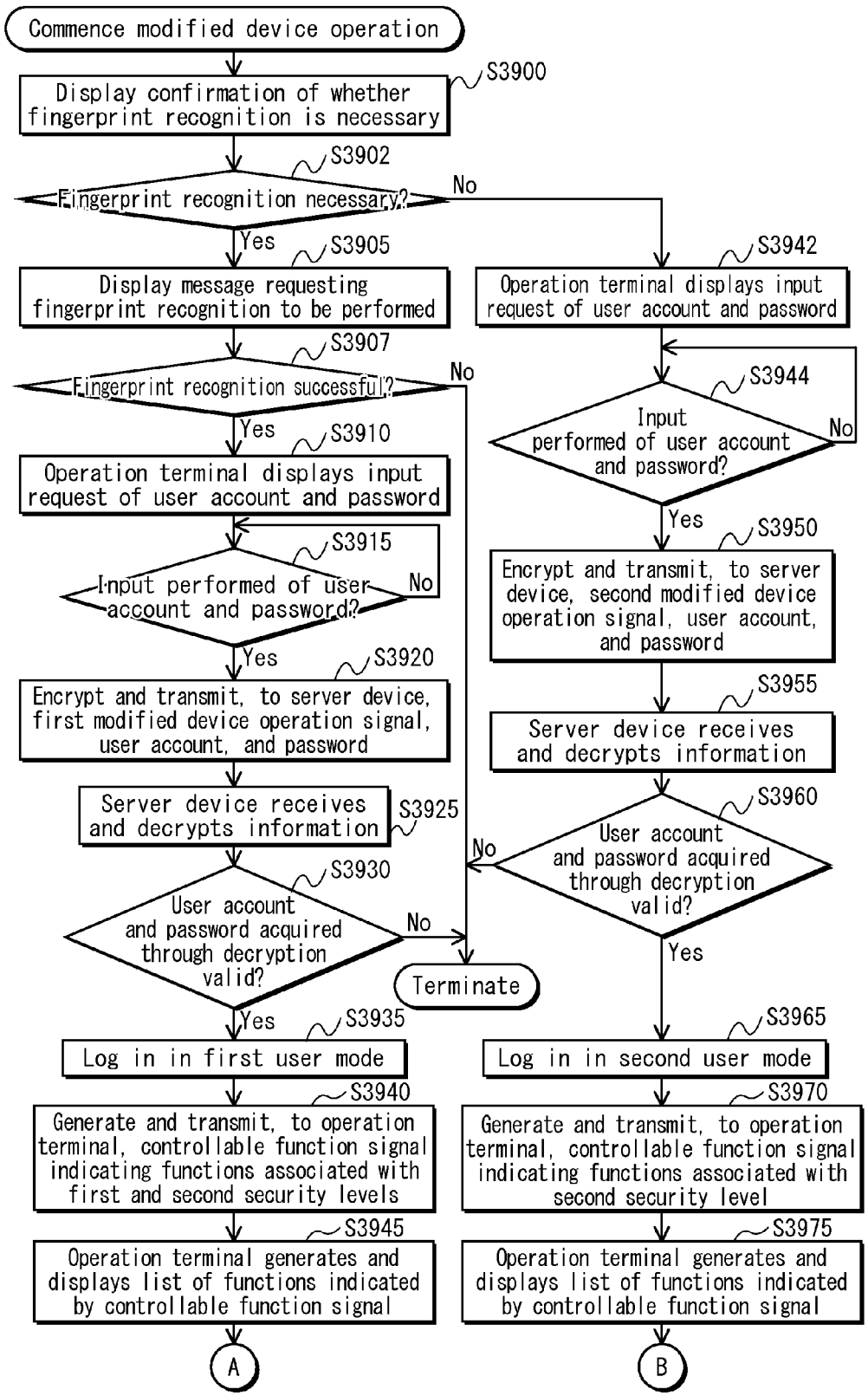
FIG. 39 is first part of flowchart illustrating modified device operation.
Figure 40:
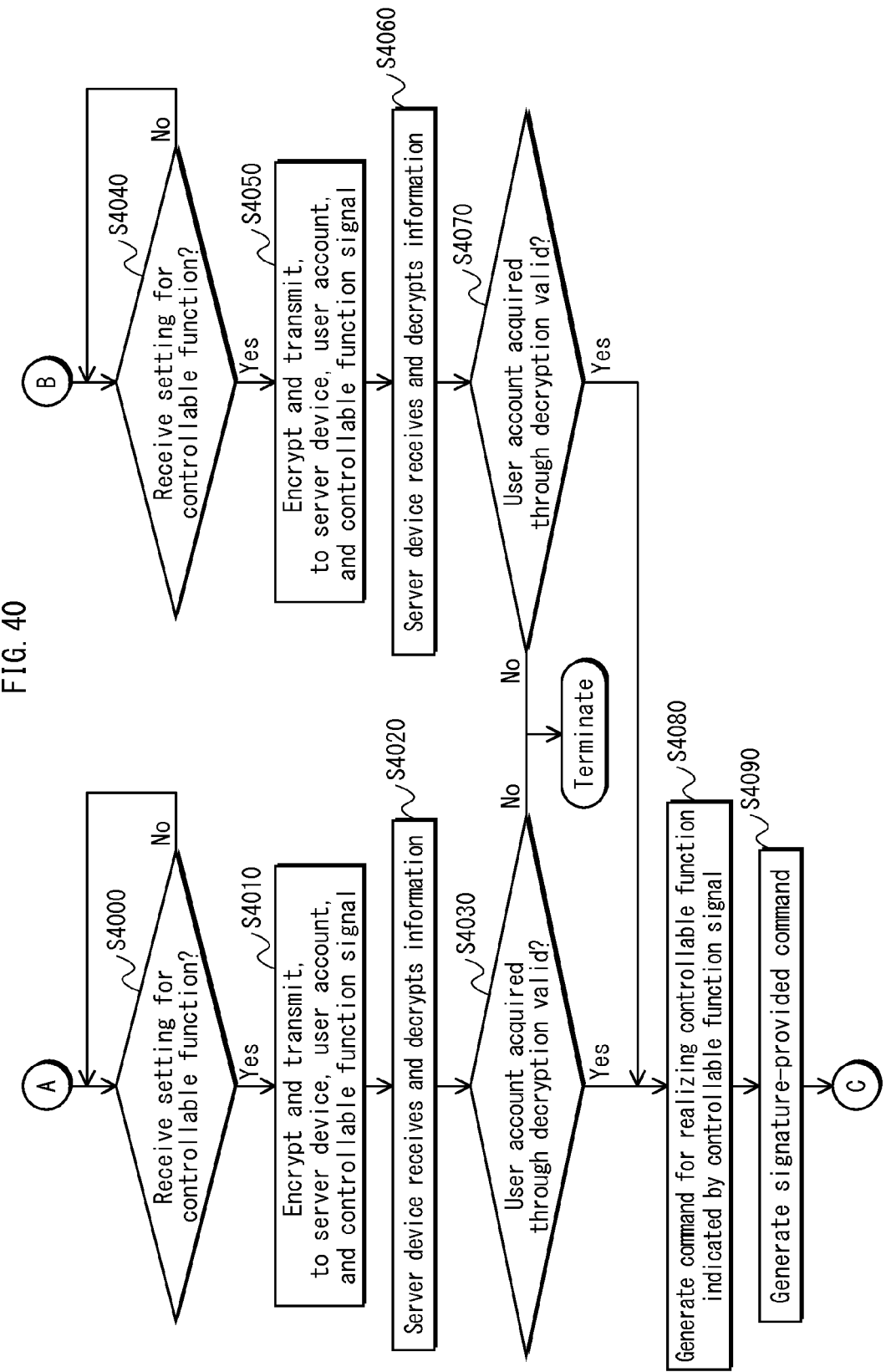
FIG. 40 is second part of flowchart illustrating modified device operation.
Figure 41:
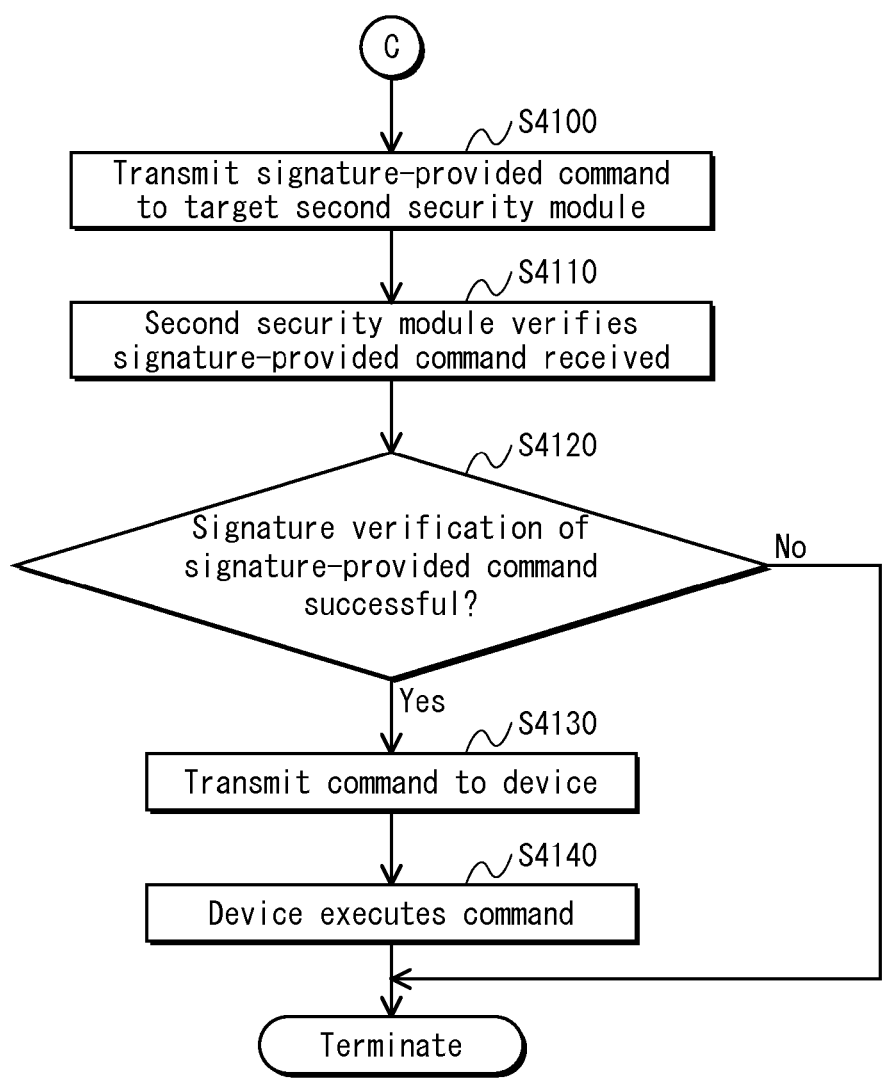
FIG. 41 is third part of flowchart illustrating modified device operation.

FIGS. 39, 40, and 41 each correspond to a part of a flowchart illustrating the modified device operation.

The modified device operation is commenced when the operation reception unit 320 receives a predetermined operation that the user performs on the operation terminal 3330.

When the modified device operation is commenced, the control unit 3400 controls the display unit 310 to cause the touch panel 240 to display a fingerprint recognition necessity confirmation image (Step S3900). The fingerprint recognition necessity confirmation image is an image for confirming with the user whether or not fingerprint recognition is necessary.

When the operation reception unit 320 receives input indicating that fingerprint recognition is necessary from the user with the fingerprint recognition necessity confirmation image displayed on the touch panel 240 (Yes in Step S3902), the control unit 3400 controls the display unit 310 to cause the touch panel 240 to display a message requesting that the user perform fingerprint recognition on the touch panel 240 (Step S3905).

Following the display of such message, the control unit 3400 controls the fingerprint recognition unit 3430 to perform the fingerprint recognition with respect to the user using the operation terminal 3330 (Step S3907).

When the fingerprint recognition unit 3430 determines that the user is a valid user through the processing in Step S3907 and thus, the fingerprint recognition is successful (Yes in Step S3907), the control unit 3400 controls the display unit 310 to cause the touch panel 240 to display a request for input of a user account and a password (Step S3910).

When the operation reception unit 320 receives input of a user account and a password from the user following the display of the input request on the touch panel 240 (i.e., when Yes in Step S3915 after No in Step S3915 for several times), the control unit 3400 controls the encryption processing unit 360 to encrypt (i) a first modified device operation signal and (ii) the user account and password having been input. The first modified device operation signal is a request to proceed with the modified device operation. Further, the control unit 3400 controls the communication unit 350 to transmit the encrypted information to the server device 3560 (Step S3920).

When the communication unit 1750 of the server device 3560 receives the encrypted information transmitted from the communication unit 350, the control unit 3500 controls the encryption processing unit 1710 to decrypt the encrypted information (Step S3925). Thus, the control unit 3500 acquires the first modified device operation signal, the user account, and the password.

When acquiring such information, the control unit 3500 controls the user information management unit 3530 to check whether or not the user account and the password are included in associated state in the user information 3600 (Step S3930). Thus, the control unit 3500 checks whether or not the set of user account and password acquired through the decryption is valid.

When it is determined that the set of user account and password acquired through the decryption is valid through the processing in Step S3930 (Yes in Step S3930), the first modified device control system executes the processing in and following Step S3935.

Here, the processing in Steps S3935 through S4000 (illustrated in FIG. 40) is similar to the processing in Steps S2535 through S2600 in the device operation in embodiment 1 (illustrated in FIGS. 25 through 27). Thus, description of such processing is not provided in the following for already being provided above.

When the operation reception unit 320 receives a specification operation for specifying a setting for one controllable function from the user through the processing in Step S4000 (i.e., when Yes in Step S4000 after No in Step S4000 for several times), the control unit 3400 controls the encryption processing unit 360 to encrypt the user account and a controllable function signal. Here, the controllable function signal indicates the setting for the controllable function received from the user. Further, the control unit 3400 controls the communication unit 350 to transmit the encrypted information to the server device 3560 (Step S54010).

When the communication unit 1750 of the server device 3560 receives the encrypted information transmitted from the communication unit 350, the control unit 3500 controls the encryption processing unit 1710 to decrypt the encrypted information (Step S4020). Thus, the control unit 3500 acquires the user account and the controllable function signal.

When acquiring such information, the control unit 3500 controls the user information management unit 3530 to check whether or not the user account is included in the user information 3600 (Step S4030). Thus, the control unit 3500 checks whether or not the user account acquired through the decryption is valid.

When the operation reception unit 320 receives input indicating that fingerprint recognition is unnecessary from the user through the processing in Step S3902 (No in Step S3902), the control unit 3400 controls the display unit 310 to cause the touch panel 240 to display a request for input of a user account and a password (Step S3942).

When the operation reception unit 320 receives input of a user account and a password from the user with the input request displayed on the touch panel 240 (i.e., when Yes in Step S3944 after No in Step S3944 for several times), the control unit 3400 controls the encryption processing unit 360 to encrypt (i) a second modified device operation signal and (ii) the user account and password having been input. The second modified device operation signal is a request to proceed with the modified device operation. Further, the control unit 3400 controls the communication unit 350 to transmit the encrypted information to the server device 3560 (Step S3950).

When the communication unit 1750 of the server device 3560 receives the encrypted information transmitted from the communication unit 350, the control unit 3500 controls the encryption processing unit 1710 to decrypt the encrypted information (Step S3955). Thus, the control unit 3500 acquires the second modified device operation signal, the user account, and the password.

When acquiring such information, the control unit 3500 controls the user information management unit 3530 to check whether or not the user account and the password are included in associated state in the user information 3600 (Step S3960). Thus, the control unit 3500 checks whether or not the set of user account and password acquired through the decryption is valid.

When it is determined that the set of user account and password acquired through the decryption is valid through the processing in Step S3960 (Yes in Step S3960), the first modified device control system executes the processing in and following Step S3965.

Here, the processing in Steps S3965 through S4040 (illustrated in FIG. 40) is similar to the processing in Steps S2565 through S2640 in the device operation in embodiment 1 (illustrated in FIGS. 25 through 27). Thus, description of such processing is not provided in the following for already being provided above.

When the operation reception unit 320 receives a specification operation for specifying a setting for one controllable function from the user through the processing in Step S4040 (i.e., when Yes in Step S4040 after No in Step S4040 for several times), the control unit 3400 controls the encryption processing unit 360 to encrypt (i) a user account and (ii) a controllable function signal. Here, the controllable function signal indicates the setting for the controllable function received from the user. Further, the control unit 3400 controls the communication unit 350 to transmit the encrypted information to the server device 3560 (Step S4050).

When the communication unit 1750 of the server device 3560 receives the encrypted information transmitted from the communication unit 350, the control unit 3500 controls the encryption processing unit 1710 to decrypt the encrypted information (Step S4060). Thus, the control unit 3500 acquires the user account and the controllable function signal.

When acquiring such information, the control unit 3500 controls the user information management unit 3530 to check whether or not the user account is included in the user information 3600 (Step S4070). Thus, the control unit 3500 checks whether or not the user account acquired through the decryption is valid.

In each of the following cases, the first modified device control system executes the processing in and following Step S4080: (i) when it is determined that the user account acquired through the decryption is valid through the processing in Step S4030 (Yes in Step S4030) and (ii) when it is determined that the user account acquired through the decryption is valid through the processing in Step S4070 (Yes in Step S4070).

Here, the processing in Steps S4080 through S4140 (illustrated in FIG. 41) is similar to the processing in Steps S2680 through S2740 in the device operation in embodiment 1 (illustrated in FIGS. 25 through 27). Thus, description of such processing is not provided in the following for already being provided above.

Note that the first modified device control system terminates the modified device operation in each of the following cases: (i) when the fingerprint recognition unit 3430 determines that the user is not a valid user in the processing in Step S3907 and thus, the fingerprint recognition is unsuccessful (No in Step S3907); (ii) when it is determined that the set of user account, password, and security module ID acquired through the decryption is not valid through the processing in Step S3930 (No in Step S3930); (iii) when it is determined that the set of user account and password acquired through the decryption is not valid through the processing in Step S3960 (No in Step S3960); (iv) when it is determined that the user account acquired through the decryption is not valid through the processing in Step S4030 (No in Step S4030); (v) when it is determined that the user account acquired through the decryption is not valid through the processing in Step S4070 (No in Step S4070); (vi) when the authenticity of a signature provided to a signature-provided command is not confirmed through the processing in Step S4120; and (vii) when the processing in Step S4140 is completed.

<Modification>
<Overview>

The following describes one embodiment of the device control method pertaining to the present invention. In specific, the following describes a second modified device control system, which is a modification of the device control system 100 in embodiment 1.

The second modified device control system has the same hardware structure as the device control system 100. However, the second modified device control system is a modification of the device control system 100, and includes an operation terminal 4230 and a server device 4360. The operation terminal 4230 is a modification of the operation terminal 130, yielded by modifying, in part, the software executed by the operation terminal 130. The server device 4360 is a modification of the server device 160, yielded by modifying, in part, the software executed by the server device 160 and the data stored by the server device 160.

The second modified device control system has a function that the device control system 100 does not have. That is, the second modified device control system has an additional user registration function that makes available device controls that are made available to a user using an operation terminal 4230 having a first security module 110 attached thereto also to one or more users other than such a user.

The following describes the structure of the second modified device control system, while referring to the accompanying drawings. Note that the following description focuses on the difference between the second modified device control system and the device control system 100.

<Structure>

Figure 42:
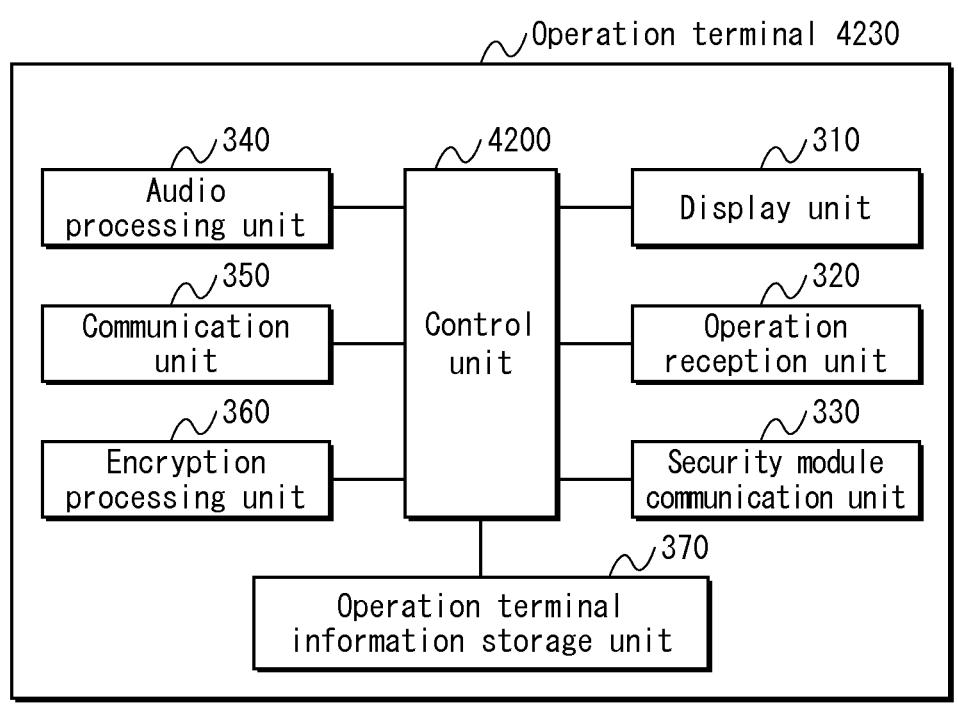
FIG. 42 is a block diagram illustrating functional structure of operation terminal 4230.

FIG. 42 is a block diagram illustrating the functional structure of the operation terminal 4230.

As illustrated in FIG. 42, the operation terminal 4230 does not include the control unit 300, but instead includes a control unit 4200.

The control unit 4200 is implemented by the CPU 200 executing programs. The control unit 4200 realizes the above-described functions of the control unit 300. In addition, the control unit 4200 controls the display unit 310, the operation reception unit 320, the security module communication unit 330, the audio processing unit 340, the communication unit 350, the encryption processing unit 360, and the operation terminal information storage unit 370, thereby realizing an additional user registration function A of the operation terminal 4230, which is described in the following.

Additional user registration function A: The control unit 4200 controls the operation terminal 4230 to provide the operation terminal 4230 with a function of realizing an additional user registration performed by the second modified device control system, through cooperation with other structural elements included in the second modified device control system. The additional user registration is described in detail later in the present disclosure. In specific, detailed description of the additional user registration is provided in the <Additional User Registration> section of the present disclosure, with reference to a flowchart.

Figure 43:
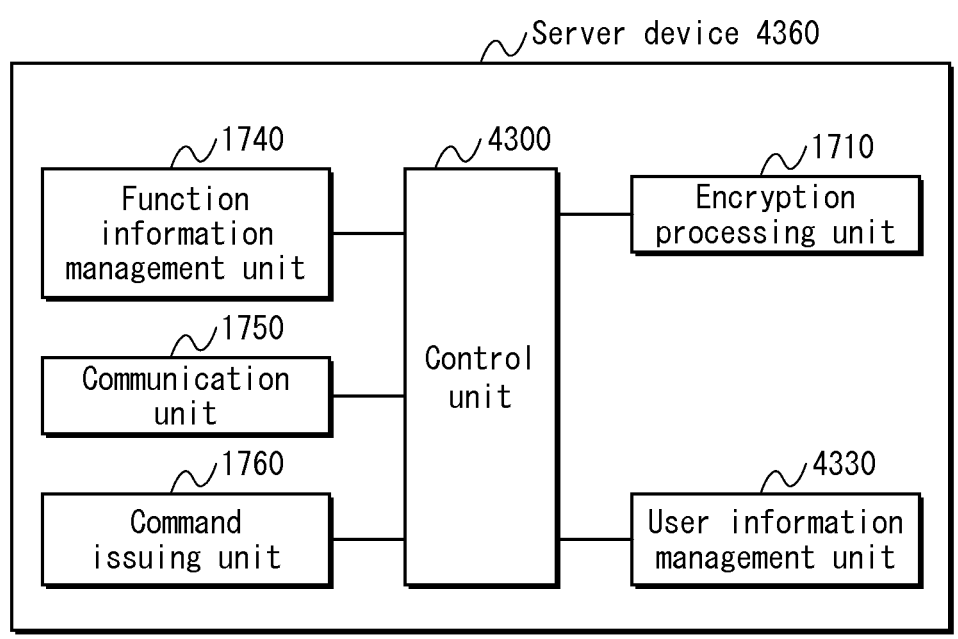
FIG. 43 is a block diagram illustrating functional structure of server device 4360.

FIG. 43 is a block diagram illustrating the functional structure of the server device 4360.

As illustrated in FIG. 43, the server device 4360 includes a control unit 4300 in place of the control unit 1700, and includes a user information management unit 4330 in place of the user information management unit 1730.

The control unit 4300 is implemented by the CPU 1600 executing programs. The control unit 4300 realizes the above-described functions of the control unit 1700. In addition, the control unit 4300 controls the encryption processing unit 1710, the user information management unit 4330, the function information management unit 1740, the communication unit 1750, and the command issuing unit 1760, thereby realizing an additional user registration function B of the server device 4360, which is described in the following.

Additional user registration function B: The CPU 1600 controls the server device 4360 to provide the server device 4360 with a function of realizing the additional user registration performed by the second modified device control system, through cooperation with other structural elements included in the second modified device control system.

The user information management unit 4330 is implemented by using a part of a storage area of the hard disk drive 1610 and by the CPU 1600 executing programs. The user information management unit 4330 is controlled by the control unit 4300. The user information management unit 4330 has a function of storing user information 4400, and a function of updating the user information 4400 stored therein.

FIG. 44 illustrates one example of the data structure of the user information 4400.

As illustrated in FIG. 44, the user information 4400 includes one or more group names 4405 and one or more classes 4480, in addition to the information included in the user information 1800 (illustrated in FIG. 18) (i.e., one or more user names 1810, one or more user accounts 1820, one or more passwords 1830, one or more pieces of registration information 1840, one or more device types 1850, and one or more model numbers 1860). The group names 4405, the classes 4480, the user names 1810, the user accounts 1820, the passwords 1830, the pieces of registration information, the device types 1850, and the model numbers 1860 are associated with one another as illustrated in FIG. 44.

In FIG. 44, each group name 4405 indicates a group to which one or more user names 1810 associated therewith belongs.

Each class 4480 indicates whether a device of a model indicated by a model number 1860 associated therewith is an operation terminal 130 or a device 140.

Here, in the user information 4400, information associated with one group indicated by one group name 4405 includes an associated set of (i) one or more sets (two sets in the example illustrated in FIG. 44) of a user name 1810, a user account 1820, a password 1830, and a piece of registration information 1840, and (ii) one or more sets (five sets in the example illustrated in FIG. 44) of a device type 1850, a model number 1860, a security module ID 1870, and a class 4480. That is, the user information 4400 associates each user belonging to a given group with one or more operation terminals 130 and one or more device 140 belonging to the given group.

In the example illustrated in FIG. 44, the smartphone indicated by the model number "P-06D" and the smartphone indicated by the model number "P-02D" are operation terminals 130 used by users A and B, and the air conditioner indicated by the model number "CS-X252C", the refrigerator indicated by the model number "NR-F456T", and the recorder indicated by the model number "DMR-BZT820" are devices 140 used by the users A and B.

This concludes the description of the structure of the second modified device control system. The following describes operations performed by the second modified device control system, while referring to the accompanying drawings. Note that the following description focuses on the difference between the second modified device control system and the device control system 100.

<Operations>

The second modified device control system is characterized for performing: the additional user registration.

The following describes the additional user registration.

<Additional User Registration>

The additional user registration performed by the second modified device control system is an operation of making available for execution device controls that are made available to a user using an operation terminal 4230 having a first security module 110 attached thereto also to users other than such a user.

Figure 45:
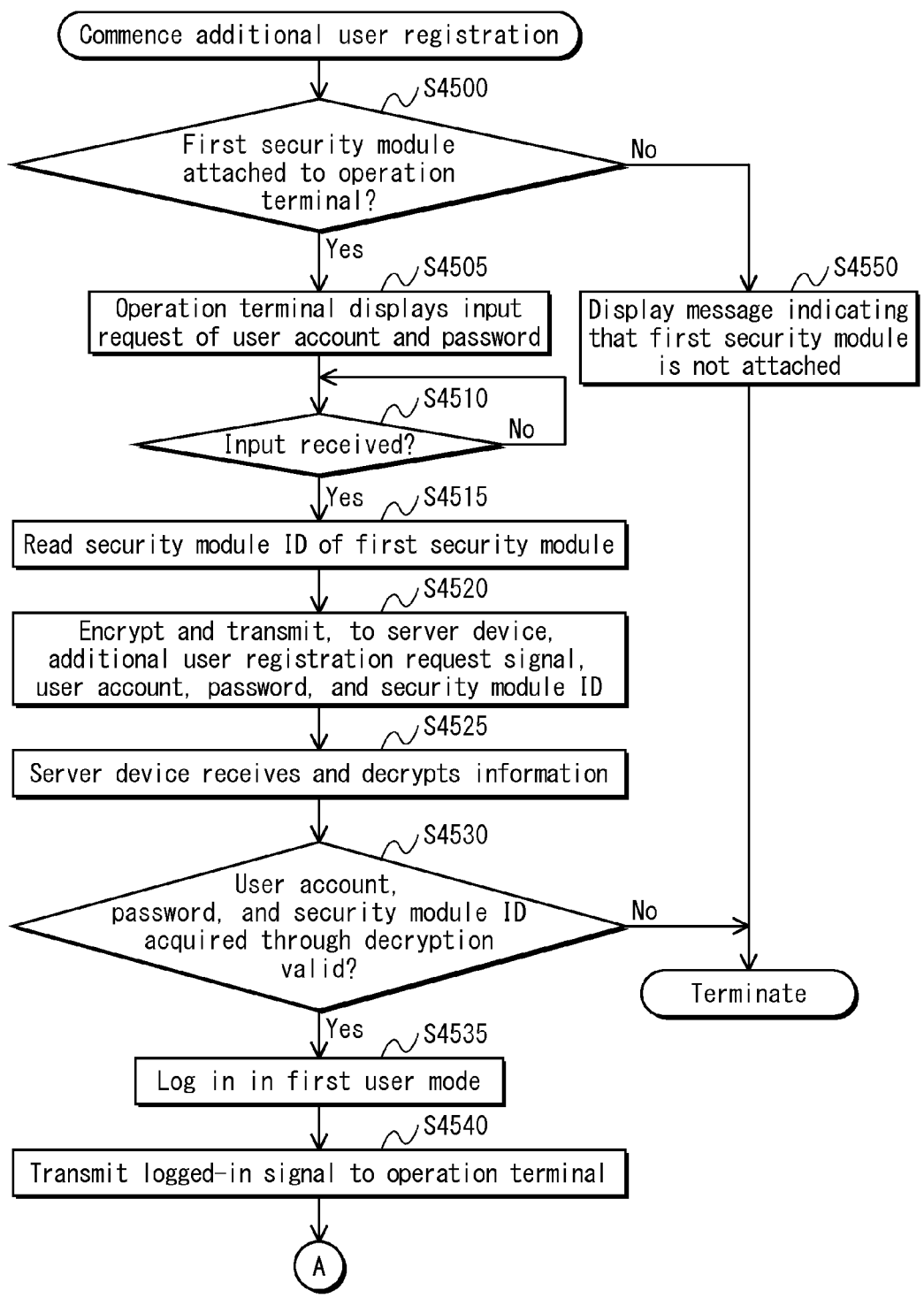
FIG. 45 is first part of flowchart illustrating additional user registration.
Figure 46:
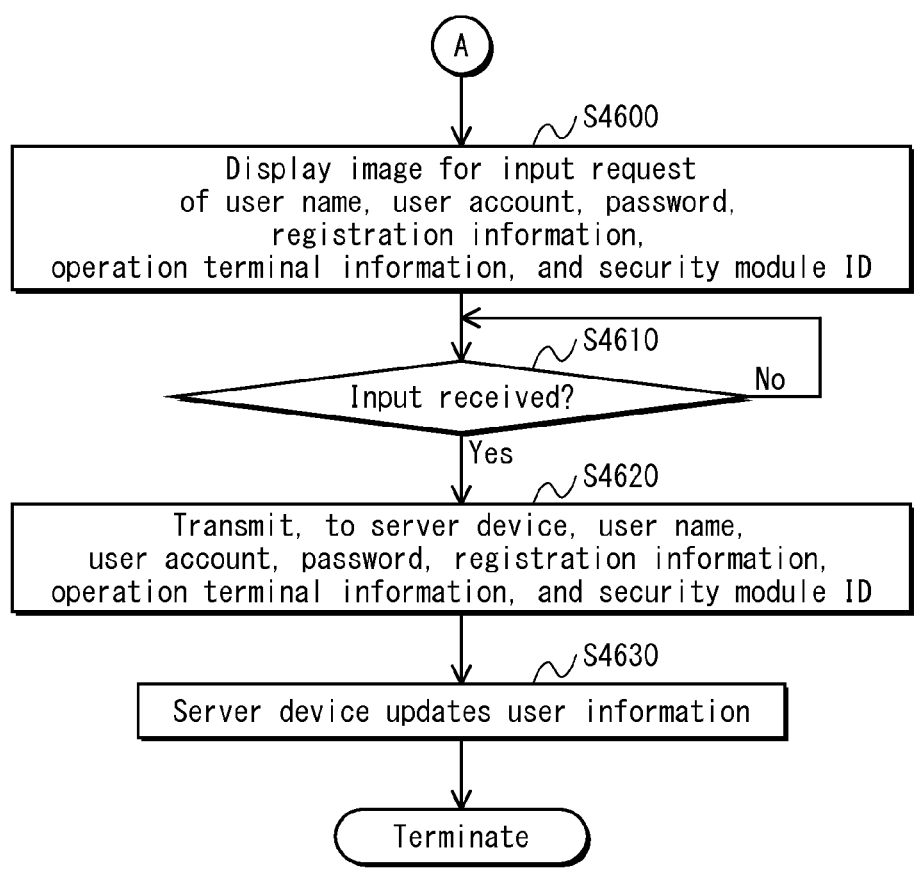
FIG. 46 is second part of flowchart illustrating additional user registration.

FIGS. 45 and 46 each correspond to a part of a flowchart illustrating the additional user registration.

The additional user registration is commenced when the operation reception unit 320 receives a predetermined operation that the user performs on the operation terminal 4230.

When the additional user registration is commenced, the control unit 4200 controls the security module communication unit 330 to attempt to perform wired communication with a first security module 110. Thus, the control unit 4200 determines whether or not a first security module 110 is attached to the operation terminal 4230 (Step S4500).

In Step S4500, when the wired communication with a first security module 110 is successful and thus it is determined that a first security module 110 is attached to the operation terminal 4230 (Yes in Step S4500), the control unit 4200 controls the display unit 310 to cause the touch panel 240 to display a request for input of a user account and a password (Step S4505).

When the operation reception unit 320 receives input of a user account and a password from the user with the input request displayed on the touch panel 240 (i.e., when Yes in Step S4510 after No in Step S4510 for several times), the second modified device control system executes processing in and following Step S4515.

Here, the processing in Steps S4515 through S4535 is similar to the processing in Steps S2515 through S2535 (illustrated in FIG. 25) in the device operation in embodiment 1. Thus, description of such processing is not provided in the following for already being provided above.

When the processing in Step S4535 is completed, the control unit 4300 controls the communication unit 1750 to transmit a logged-in signal indicating that the user account has logged-in in the first user mode (Step S4540).

When the communication unit 350 of the operation terminal 4230 receives the logged-in signal transmitted from the communication unit 1750, the control unit 4200 controls the display unit 310 to cause the touch panel 240 to display a request for input of a user name, a user account, a password, registration information, operation terminal information, and a security module ID (Step S4600). Here, when referring to the user who has logged in with his/her user account through the processing in Step S4535 as a "parent user" and a user to whom the parent user provides the authority for executing controls available to the parent user as a "child user", the display performed in Step S4600 requests that the parent user input the above-described information on the child user.

When the operation reception unit 320 receives input of such information related to the child user from the parent user (i.e., when Yes in Step S4610 after No in Step S4610 for several times), the control unit 4200 controls the communication unit 350 to transmit the input information (i.e., the user name, the user account, the password, the registration information, the operation terminal information, and the security module ID) to the server device 4360 (Step S4620).

When the communication unit 1750 of the server device 4360 receives such information from the communication unit 350, the control unit 4300 controls the user information management unit 4330 to update the user information 4400

(Step S4630). Here, the user information 4400 is updated such that the user name, the user account, the password, the registration information, the operation terminal information, and the security module ID of the child user are each associated with the group name 4405 associated with the parent user in the user information 4400.

Note that when the wired communication with a first security module 110 is unsuccessful and thus it is determined that a first security module 110 is not attached to the operation terminal 4230 in Step S3000 (No in Step S4500), the control unit 4200 controls the display unit 310 to cause the touch panel 240 to display a screen indicating that the first security module 110 is not attached to the operation terminal 4230 (Step S4550).

Further, note that the second modified device control system terminates the additional user registration in each of the following cases: (i) when it is determined that the set of user account, password, and security module ID acquired through the decryption is not valid through the processing in Step S4530 (No in Step S4530); and (ii) when the processing in Step S4630 is completed.

<Supplement>

The above describes one embodiment of the device control method pertaining to the present invention based on three examples of device control systems in embodiment 1, embodiment 2, and the modification. However, and as a matter of course, the device control method pertaining to the present invention is not limited to the device control methods used in such examples of device control systems, and other modifications such as those described in the following can be made.

(1) In embodiment 1, the device control system 100 includes the home gateway 150, which has a communication relay function of relaying the communication between the second security module 120 and the server device 160.

However, the home gateway 150 is not always necessary, as long as the second security module 120 and the server device 160 are able to communicate with one another. For example, a modification may be made such that the second security module 120 includes a network connection circuit for wired connection with the network 170, in which case the second security module 120 and the server device 160 communicate via the network 170.

(2) In embodiment 1, the home gateway 150 has the communication relay function, which is a function of relaying the communication between the second security module 120 and the server device 160.

However, as long as the device control system 100 can be ensured to have functions similar to those described above, the home gateway 150 may be provided with some of the functions of the server device 160 in addition to the communication relay function, in which case the home gateway 150 no longer needs to have some of its functions. For example, a modification may be made such that the home gateway 150 has the function of storing the function information 1900 and the function of referring to the function information 1900 stored therein and generating commands for causing control target devices 140 to execute control target functions, and the server device 160 does not have such functions.

(3) In embodiment 1, the operation terminal 130 is a smartphone.

However, the operation terminal 130 need not be a smartphone, as long as the operation terminal 130 realizes functions corresponding to the initial registration function A, the second security module issue request function A, the device operation function A, and the information check function A. For example, a modification may be made such that the operation terminal 130 is a tablet-type personal computer, a portable game device, a fold-type portable phone, or the like realizing functions corresponding to the initial registration function A, the second security module issue request function A, the device operation function A, and the information check function A.

(4) In embodiment 1, the device control system 100 includes the base station 180, which has a function of relaying the communication between the operation terminal 130 and the server device 160.

However, the base station 180 is not always necessary, as long as the operation terminal 130 and the server device 160 are able to communicate with one another. For example, a modification may be made such that the operation terminal 130 and the server device 160 communicate with one another directly, over a satellite communication line realized by using one or more artificial satellites.

(5) In embodiment 1, the communication between the second security module 120 and the home gateway 150 conforms to the Bluetooth™ protocol.

However, the communication between the second security module 120 and the home gateway 150 does not necessarily have to conform to the Bluetooth™ protocol, as long as the second security module 120 and the home gateway 150 are able to communicate with one another. For example, the communication between the second security module 120 and the home gateway 150 may conform to an infrared communication standard, or a Wi-Fi standard. Further, the communication between the second security module 120 and the home gateway 150 for example may be a wired communication instead of being a wireless communication.

(6) In embodiment 1, a security module ID of a security module (i.e., the first security module 110 and the second security module 120) is stored in a predetermined storage area of a ROM of the security module in the manufacturing of the security module. This prevents tampering of the security module IDs of the first security module 110 and the second security module 120.

However, measures other than storing a security module ID of a security module in a predetermined storage area of a ROM of the security module in the manufacturing of the security module may be taken for preventing the tampering of security module IDs. For example, in order to prevent tampering of a security module ID of a security module, the security module ID may be stored in a predetermined storage area of a flash memory after being encrypted or after being provided with a signature.

(7) In embodiment 1, in the device operation by the device control system 100, (i) when a first security module 110 is attached to the operation terminal 130, the server device 160 transmits a controllable function signal indicating both functions associated with the first security level and functions associated with the second security level to the operation terminal 130, and the operation terminal 130 displays a list of both functions associated with the first security level and functions associated with the second security level. Meanwhile, when a first security module 110 is not attached to the operation terminal 130, the server device 160 transmits a controllable function signal indicating only functions associated with the second security level to the operation terminal 130, and the operation terminal 130 displays a list of only functions associated with the second security level.

However, modifications may be made as long as (i) the operation terminal 130 displays a list of both functions associated with the first security level and functions associated with the second security level when a first security module 110 is attached to the operation terminal 130, and (ii) the operation terminal 130 displays a list of only functions associated with the second security level when a first security module 110 is not attached to the operation terminal 130. In specific, (i) the server device 160 need not transmit a controllable function signal indicating both functions associated with the first security level and functions associated with the second security level to the operation terminal 130 when a first security module 110 is attached to the operation terminal 130, and (ii) the server device 160 need not transmit a controllable function signal indicating only functions associated with the second security level to the operation terminal 130 when a first security module 110 is not attached to the operation terminal 130. For example, a modification may be made such that the server device 160 transmits to the operation terminal 130 a controllable function signal indicating both functions associated with the first security level and functions associated with the second security level regardless of whether or not a first security module 110 is attached to the operation terminal 130, and the operation terminal 130 receiving the controllable function signal (i) displays a list of both functions associated with the first security level and functions associated with the second security level when a first security module 110 is attached to the operation terminal 130 and (ii) displays a list of only functions associated with the second security level when a first security module 110 is not attached to the operation terminal 130.

(8) In embodiment 1, the device control system 100 is configured such that the setting that the operation reception unit 320 receives may be that for a function associated with the first security level or a function associated with the second security level when a first security module 110 is attached to the operation terminal 130, whereas the function setting that the operation reception unit 320 receives is limited to that for a function associated with the second security level when a first security module 110 is not attached to the operation terminal 130.

However, such a configuration is not always necessary, as long as both functions associated with the first security level and functions associated with the second security level are made available for control to an operation terminal 130 having a first security module 110 attached thereto and only functions associated with the second security level are made available for control to an operation terminal 130 not having a first security module 110 attached thereto. For example, a modification may be made such that the setting that the operation reception unit 320 of the operation terminal 130 receives may be that for a function associated with the first security level or a function associated with the second security level when a first security module 110 regardless of whether or not a first security module 110 is attached to the operation terminal 130, and the command issuing unit 1760 (i) is capable of generating a command realizing the setting regardless of whether the setting is for a function associated with the first security level or a function associated with the second security level when the operation terminal 130 has a first security module 110 attached thereto, and (ii) is capable of generating a command realizing the setting provided that the setting is for a function associated with the second security level when the operation terminal 130 does not have a first security module 110 attached thereto.

(9) In embodiment 1, the device control system 100 is configured such that the operation terminal 130 is capable of controlling both functions associated with the first security level and functions associated with the second security level when the operation terminal 130 has a first security module 110 attached thereto, whereas the operation terminal 130 is capable of controlling only functions associated with the second security level when the operation terminal 130 does not have a first security module 110 attached thereto.

This configuration may be modified, such that the operation terminal 130 is capable of controlling both functions associated with the first security level and functions associated with the second security level when the operation terminal 130 has a first security module 110 attached thereto, and the operation terminal 130 is not capable of controlling any functions when the operation terminal 130 does not have a first security module 110 attached thereto. This is realized, for example, by modifying the processing in Step S2510 (illustrated in FIG. 25) in the device operation such that when it is determined that a first security module 110 is not attached to the operation terminal 130 (No in Step S2510), the device control system 100 terminates the device operation.

(10) In embodiment 1, the second security module 120 and the home gateway 150 communicate with one another directly by performing wireless connection, and the second security module 120 and the device 140 communicate with one another directly by performing wired communication.

However, communication need not be performed in such a manner, provided that the second security module 120, the home gateway 150, and the device 140 are able to communicate with one another, either directly or indirectly. For example, a modification may be made such that the device 140 and the home gateway 150 communicate with one another directly by performing wireless communication, and the second security module 120 and the device 140 communicate with one another directly by performing wired communication.

(11) In embodiment 1, the device control system 100 is a device control system where a device 140 located inside a house can be controlled by using an operation terminal 130 that is taken outside the house.

However, a control target device 140 need not be located inside the house, and an operation terminal 130 need not be taken and used outside the house.

For example, a control target device 140 may be located inside a non-residential space, such as inside a car, a train, an airplane, or an office. Alternatively, a control target device 140 located inside a house may be controlled by using an operation terminal 130 located in a different room inside the same house.

(12) In embodiment 2, the operation terminal 3330 includes the fingerprint recognition device 3360 for checking whether the user of the operation terminal 3330 is a predetermined person.

However, the fingerprint recognition device 3360 is not always necessary, as long as the operation terminal 3330 is capable of checking whether the user thereof is a predetermined person. For example, a modification may be made such that the operation terminal 3330 includes an iris recognition device that recognizes a person by using a pattern of the iris of the person. Alternatively, a modification may be made such that the operation terminal 3330 checks whether or not the user thereof is a predetermined person by receiving input of information that is known to only the predetermined person (i.e., a security code) from the user.

(13) In the modification, the second modified device control system is configured such that the additional user registration makes available for execution all device controls that are made available to a user using the operation terminal 4230 also to users other than such a user. (Note that in the following, description is provided referring to a user using the operation terminal 4230 as "user X" and referring to a user who is not user X as "user Y".)

This configuration may be modified, for example, such that among the device controls made available for execution by user X, only some device controls are made executable to user Y. This is realized, for example, by modifying the user information 4400 such that each model number 1860 is associated with a flag indicating either a logical value "0" or a logical value "1", and making available for execution to user Y only controls of devices of models indicated by model numbers 1860 associated with flags indicating the logical value "1".

(14) The embodiments and modifications described may be combined with one another.

(15) The following describes a device control method pertaining to one aspect of the present invention, as well as effects and modifications thereof. In addition, the following describes a structure of a device control system pertaining to another aspect of the present invention and effects thereof.

(a) One aspect of the present invention is a device control method in a device control system for controlling one or more devices by using one or more operation terminals, the device control method including: an operation receiving step of receiving a device control operation for controlling a given device, the device control operation performed by using a given operation terminal; a determining step of determining whether the given operation terminal is in a first state or a second state, the given operation terminal having higher authority of control when in the first state compared to when in the second state; a limiting step of, when determined in the determining step that the given operation terminal is in the second state, limiting a range of controls of the given device made available to the given operation terminal when in the second state so as to correspond to part of a range of controls of the given device made available to the given operation terminal when in the first state; and a device controlling step of controlling the given device based on the device control operation. In the device controlling step, when determined in the determining step that the given operation terminal is in the second state, the control of the given device is performed within the range of controls of the given device made available to the given operation terminal when in the second state.

The device control method pertaining to one aspect of the present invention limits the range of controls of a device that is made available for execution from an operation terminal according to the state of the operation terminal Due to this, the frequency at which unfavourable situations occur by the operation terminal in a state where a certain level of security is not ensured being operated can be reduced compared to in conventional technology.

(b) In the device control method pertaining to one aspect of the present invention, in the determining step, the given operation terminal may be determined as being in the first state when the given operation terminal has attached thereto a terminal module storing a terminal identifier identifying the terminal module, and as being in the second state when the given operation terminal does not have attached thereto a terminal module storing a terminal identifier identifying the terminal module.

According to this, an operation terminal can be put in the first state by attaching a terminal module storing a terminal identifier identifying the terminal module to the operation terminal.

(c) In the device control method pertaining to one aspect of the present invention, the device control system may include an identifier storage unit that stores a terminal identifier associated with the first state, the device control method may further include a terminal identifier acquiring step of, when the given operation terminal has attached thereto a terminal module storing a terminal identifier identifying the terminal module, acquiring the terminal identifier from the terminal module, and in the determining step, when the terminal identifier acquired in the terminal identifier acquiring step is stored in the identifier storage unit, the given operation terminal may be determined as being in the first state.

According to this, an operation terminal can be put in the first state by attaching a terminal module storing a terminal identifier associated with the first state to the operation terminal.

(d) In the device control method pertaining to one aspect of the present invention, the device control system may include a display unit that displays one or more device control operations, the device control method may further include: an operation information acquiring step of acquiring device control operation information associated with the range of controls of the given device made available to the given operation terminal when in the first state; and a displaying step of, when determined in the determining step that the given operation device is in the first state, causing the display unit to display one or more device control operations specified by the device control operation information acquired in the operation information acquiring step, and the limiting step, when determined in the determining step that the given operation device is in the first state, may limit the device control operation receivable in the operation receiving step to the device control operations specified by the device control operation information acquired in the operation information acquiring step, and in the device controlling step, the control of the given device may be performed within the range of controls of the given device, which is specified in the limiting step.

According to this, the display unit displays, to a user using an operation terminal in the first state, device control operations associated with controls of a device made available to the operation terminal when in the first state, and the user is able to control the device while viewing such device control operations.

(e) The device control method pertaining to one aspect of the present invention may further include a specific operation information acquiring step of acquiring device control operation information associated with the range of controls of the given device made available to the given operation terminal when in the second state; and a specific displaying step of, when determined in the determining step that the given operation device is in the second state, causing the display unit to display one or more device control operations specified by the device control operation information acquired in the specific operation information acquiring step, and the limiting step, when determined in the determining step that the given operation device is in the second state, may limit the device control operation receivable in the operation receiving step to the device control operations specified by the device control operation information acquired in the specific operation information acquiring step.

According to this, the display unit displays, to a user using an operation terminal in the second state, device control operations associated with controls of a device made available to the operation terminal when in the second state, and the user is able to control the device while viewing such device control operations.

(f) In the device control method pertaining to one aspect of the present invention, the device controlling step may include: a converting sub-step of converting the device control operation received in the operation receiving step into a device control command; and a controlling sub-step of controlling the given device by using the device control command.

According to this, a device may be controlled by using a command for controlling the device.

(g) In the device control method pertaining to one aspect of the present invention, in the device controlling step, the given device may be controlled only when the given device has attached thereto a device module storing a device identifier identifying the device module and the device identifier is associated with a terminal identifier stored in a terminal module inserted into the given operation terminal According to this, control target devices are limited to devices having attached thereto a device module storing a device identifier associated with a terminal identifier stored in a terminal module inserted into an operation terminal (h) The device control method pertaining to one aspect of the present invention may further include a terminal identifier adding step of, when determined in the determining step that the given operation device is in the first state and a terminal identifier specifying operation for specifying a terminal identifier is performed with respect to the given operation terminal, causing the identifier storage unit to store, in associated state with the terminal identifier associated with the first state, the terminal identifier specified by the terminal identifier specifying operation.

According to this, by using an operation device in the first state, a new terminal identifier associated with the first state can be added and stored in the identifier storage unit.

(i) In the device control method pertaining to one aspect of the present invention, the identifier storage unit may store, in associated state with the terminal identifier, one or more device identifiers each identifying a device module attached to a device that is controllable by using the given operation terminal, when determined in the determining step that the given operation terminal is in the first state, and in the device controlling step, the given device may be controlled only when the given device has attached thereto a device module storing a device identifier stored in the identifier storage unit.

According to this, devices controllable by using an operation terminal in the first state are limited to devices having attached thereto a device module storing a predetermined device identifier.

(j) In the device control method pertaining to one aspect of the present invention, the device control system may include a person specific information storage unit storing person specific information for specifying a predetermined person, the device control method may further include a user specific information receiving step of receiving, from a user of the given operation terminal, input of user specific information for specifying the user, and in the determining step, the given operation terminal may be determined as being in the first state when the user specified by the user specific information received in the user specific information receiving step corresponds to the predetermined person specified by the person specific information stored in the person specific information storage unit.

According to this, an operation terminal is put in the first state when the operation terminal is being used by a predetermined person.

(k) Another aspect of the present invention is a device control system for controlling one or more devices by using one or more operation terminals, the device control system including: an operation receiving unit that receives a device control operation for controlling a given device, the device control operation performed by using a given operation terminal; a determining unit that determines whether the given operation terminal is in a first state or a second state, the given operation terminal having higher authority of control when in the first state compared to when in the second state; a limiting unit that, when determined by the determining unit that the given operation terminal is in the second state, limits a range of controls of the given device made available to the given operation terminal when in the second state so as to correspond to part of a range of controls of the given device made available to the given operation terminal when in the first state; and a device controlling unit that controls the given device based on the device control operation. The device controlling unit, when determined by the determining unit that the given operation terminal is in the second state, controls the given device within the range of controls of the given device made available to the given operation terminal when in the second state.

The device control system pertaining to another aspect of the present invention limits the range of controls of a device that is made available for execution from an operation terminal according to the state of the operation terminal. Due to this, the frequency at which unfavourable situations occur by the operation terminal in a state where a certain level of security is not ensured being operated can be reduced compared to in conventional technology.

INDUSTRIAL APPLICABILITY

The device control method and the device control system pertaining to the present invention are widely applicable to systems for controlling devices.

REFERENCES SIGNS LIST 100 device control system
110 first security module
120A-120C second security module A—second security module C
130 operation terminal
140A-140C device A—device C
150 home gateway
160 server device
170 network
180 base station

The invention claimed is:

1. A device control method in a device control system for controlling one or more devices by using one or more operation terminals, wherein
the device control system includes the one or more devices, the one or more operation terminals, and a server device, and
the server device includes a processor and a non-transitory computer-readable recording medium having stored thereon executable instructions, which when executed by the processor, cause the server device to store user information, the user information capable of including an associated set of a terminal identifier and a device identifier, the device identifier in the associated set identifying a device module attached to a device controllable by using an operation terminal having attached thereto a terminal module identified by the terminal identifier,
the device control method comprising:
an operation receiving step of the server device receiving a device control operation for controlling a given device, the device control operation performed by using a given operation terminal;

a determining step of the server device determining whether the given operation terminal is in a first state or a second state, the given operation terminal having higher authority of control when in the first state compared to when in the second state;

a limiting step of, when determined in the determining step that the given operation terminal is in the second state, the server device limiting a range of controls of the given device made available to the given operation terminal when in the second state so as to correspond to part of a range of controls of the given device made available to the given operation terminal when in the first state;

a device controlling step of the server device controlling the given device based on the device control operation; and an updating step of, when a new device module is to be issued, the server device generating a device identifier identifying the new device module, and updating the user information by adding the device identifier identifying the new device module to the user information, wherein in the determining step, the server device receives a terminal identifier from the given operation terminal, and the given operation terminal is determined as being in the first state when the received terminal identifier matches the terminal identifier included in the user information, and as being in the second state when the received terminal identifier does not match the terminal identifier included in the user information, in the device controlling step, the given device is controlled when the given device has attached thereto a device module storing a device identifier identifying the device module, and when determined in the determining step that the given operation terminal is in the second state, the control of the given device is performed within the range of controls of the given device made available to the given operation terminal when in the second state, and in the updating step, the user information is updated so that the device identifier identifying the new device module is associated, in the user information, with a terminal identifier identifying a terminal module attached to an operation terminal possessed by a user who makes a request for issuance of the new device module.

2. The device control method of claim 1, wherein the request for issuance of the new device module is received in the operation receiving step, the request being made by using the given operation terminal, and in the limiting step, the issuance of the new device module is permitted when the given operation terminal is in the first state and is rejected when the given operation terminal is in the second state.

3. The device control method of claim 2, wherein in the updating step, the device identifier identifying the new device module is generated and the user information is updated by using the device identifier identifying the new device module when the issuance of the new device module is permitted in the limiting step.

4. The device control method of claim 1 further comprising a terminal identifier acquiring step of, when the given operation terminal has attached thereto a terminal module storing a terminal identifier identifying the terminal module, the server device acquiring the terminal identifier from the terminal module, wherein in the determining step, when the terminal identifier acquired in the terminal identifier acquiring step is included in the user information, the given operation terminal is determined as being in the first state.

5. The device control method of claim 4, wherein in the device controlling step, the given device is controlled only when the given device has attached thereto a device module storing a device identifier identifying the device module and the device identifier is associated with the terminal identifier acquired in the terminal identifier acquiring step in the user information.

6. A device control method in a device control system for controlling one or more devices by using one or more operation terminals, the device control system comprising:

the one or more devices;

the one or more operation terminals; and a server device, the server device comprising:

a processor; and a non-transitory computer-readable recording medium having stored thereon executable instructions, which when executed by the processor, cause the server device to:

store user information, the user information capable of including an associated set of a terminal identifier and a device identifier, the device identifier in the associated set identifying a device module attached to a device controllable by using an operation terminal having attached thereto a terminal module identified by the terminal identifier;

receive a device control operation for controlling a given device, the device control operation performed by using a given operation terminal;

determine whether the given operation terminal is in a first state or a second state, the given operation terminal having higher authority of control when in the first state compared to when in the second state;

limit, when the given operation terminal is determined to be in the second state, a range of controls of the given device made available to the given operation terminal when in the second state so as to correspond to part of a range of controls of the given device made available to the given operation terminal when in the first state;

control the given device based on the device control operation; and generate, when a new device module is to be issued, a device identifier identifying the new device module, and update the user information by adding the device identifier identifying the new device module to the user information, wherein the server device receives a terminal identifier from the given operation terminal, and the given operation terminal is determined as being in the first state when the received terminal identifier matches the terminal identifier included in the user information, and as being in the second state when the received terminal identifier does not match the terminal identifier included in the user information, the given device is controlled when the given device has attached thereto a device module storing a device identifier identifying the device module, and, when the given operation terminal is determined to be in the second state, the given device is controlled within the range of controls of the given device made available to the given operation terminal when in the second state, and the user information is updated so that the device identifier identifying the new device module is associated, in the user information, with a terminal identifier identifying a terminal module attached to an operation terminal possessed by a user who makes a request for issuance of the new device module.

7. The device control method of claim 1, wherein
the first state corresponds to a first security level,
the second state corresponds to a second security level different from the first security level,
when the given operation terminal has the first security level, the given operation terminal is capable of controlling the range of controls of the given device made available to the given operation terminal when the given operation terminal is in the first state and the range of controls of the given device made available to the given operation terminal when the given operation terminal is in the second state, and
when the given operation terminal has the second security level, the given operation terminal is capable of controlling only the range of controls of the given device made available to the given operation terminal when in the second state.

8. The device control method of claim 6, wherein
the first state corresponds to a first security level,
the second state corresponds to a second security level different from the first security level,
when the given operation terminal has the first security level, the given operation terminal is capable of controlling the range of controls of the given device made available to the given operation terminal when the given operation terminal is in the first state and the range of controls of the given device made available to the given operation terminal when the given operation terminal is in the second state, and
when the given operation terminal has the second security level, the given operation terminal is capable of controlling only the range of controls of the given device made available to the given operation terminal when in the second state.

* * * * *